US012675154B2

(12) United States Patent
Mori

(10) Patent No.: US 12,675,154 B2
(45) Date of Patent: Jul. 7, 2026

(54) METHOD AND SYSTEM

(71) Applicant: COVER Corp., Tokyo (JP)

(72) Inventor: Kohei Mori, Tokyo (JP)

(73) Assignee: COVER Corp., Tokyo (JP)

( * ) Notice: Subject to any disclaimer, the term of this patent is extended or adjusted under 35 U.S.C. 154(b) by 109 days.

(21) Appl. No.: 18/745,461

(22) Filed: Jun. 17, 2024

(65) Prior Publication Data

US 2024/0427414 A1     Dec. 26, 2024

(51) Int. Cl.
*G06T 11/00*        (2026.01)
*G06F 3/01*        (2006.01)

(52) U.S. Cl.
CPC .............. *G06F 3/011* (2013.01); *G06T 11/00* (2013.01)

(58) Field of Classification Search
CPC .................................. G06F 3/011; G06T 11/00
See application file for complete search history.

(56) References Cited

U.S. PATENT DOCUMENTS

| | | | |
|---|---|---|---|
| 2014/0357358 A1* | 12/2014 | Shikata .................... | A63F 13/00 463/31 |
| 2015/0288779 A1 | 10/2015 | Okumura | |
| 2016/0241498 A1* | 8/2016 | Senjo .................... | H04L 51/046 |
| 2016/0309120 A1* | 10/2016 | Kubota .................... | G09B 5/06 |
| 2019/0333261 A1 | 10/2019 | Nakajima | |
| 2021/0233286 A1 | 7/2021 | Yasukawa | |
| 2021/0235168 A1 | 7/2021 | Asada | |

| | | | |
|---|---|---|---|
| 2022/0095008 A1 | 3/2022 | Otsuka | |
| 2022/0137705 A1 | 5/2022 | Hashimoto | |
| 2022/0345782 A1 | 10/2022 | Kojima | |
| 2023/0156052 A1* | 5/2023 | Zhang .................... | H04L 65/403 709/205 |

(Continued)

FOREIGN PATENT DOCUMENTS

| | | |
|---|---|---|
| CN | 111182323 A | 5/2020 |
| JP | 2012-120098 A | 6/2012 |
| JP | 2019-139673 A | 8/2019 |

(Continued)

OTHER PUBLICATIONS

Office Action for JP Application No. 2023-100530 issued Jul. 2, 2024 (4 sheets, 6 sheets translation, 10 sheets total).

(Continued)

*Primary Examiner* — Jitesh Patel
(74) *Attorney, Agent, or Firm* — Yokoi & Co., U.S.A.; Toshiyuki Yokoi

(57) ABSTRACT

Provided are a method and a system that are capable of increasing the interest in live event gradually. A computer is configured to provide a virtual space to a user. The computer causes to display an image in a generated virtual space, the image being in accordance with an operation by the user; and to generate an event in the virtual space, and to provide event content in a predetermined type of virtual space of the virtual space on a scheduled date. Also during a period before the scheduled date, an image in the predetermined type of virtual space may be displayed in response to an operation by the user, and an event may be generated in the predetermined type of virtual space, and a display mode in the predetermined type of virtual space may change in accordance with the event that occurs in the predetermined type of virtual space in the period before the scheduled date.

19 Claims, 39 Drawing Sheets

(56)  References Cited

U.S. PATENT DOCUMENTS

2023/0215090  A1*    7/2023  Ye ........................ G06F 3/04847
                                                    345/419

FOREIGN PATENT DOCUMENTS

| | | | |
|---|---|---|---|
| JP | 2019-192175 | A | 10/2019 |
| JP | 2020-004284 | A | 1/2020 |
| JP | 2020-107264 | A | 7/2020 |
| JP | 2021-099784 | A | 7/2021 |
| JP | 2021-117990 | A | 8/2021 |
| JP | 2021-118539 | A | 8/2021 |
| JP | 2022-122109 | A | 8/2022 |
| JP | 7391950 | B2 | 12/2023 |
| WO | 2014/073277 | A1 | 5/2014 |
| WO | 2019/067112 | A1 | 4/2019 |

OTHER PUBLICATIONS

Office Action for JP Application No. 2023-100531 issued Jul. 2, 2024 (4 sheets, 5 sheets translation, 9 sheets total).
Office Action of Japanese Patent Application No. 2023-100532 issued Jun. 4, 2024 (3 sheets, 3 sheets translation).

* cited by examiner

*FIG.7*

EVENT DATA

| EVENT ID | EVENT NAME | TS DATA | PERFORMER | MUSIC LIST | PARTICIPANT GROUP A | PARTICIPANT GROUP B | · · · |
|---|---|---|---|---|---|---|---|
| IV-1 | xxxx.xx ANNIVERSARY LIVE | tslstxx-1 | TID-0001 | mslstxx01 | 1.malist | 1.mblist** | · · · |
| IV-**2 | *** DEBUT LIVE | tslst***-1 | TID-0077 | mslst***02 | 2.malist | 2.mblist | · · · |
| ⋮ | ⋮ | ⋮ | ⋮ | ⋮ | ⋮ | ⋮ | ⋮ |

*TS DATA (TIME SCHEDULE DATA)

*FIG.8*

PERFORMER USER DATA

| PERFORMER USER ID | ACCOUNT | NAME | AUTHENTICATIO N INFORMATION | AVATAR DATA | OWNED ITEMS | ... |
|---|---|---|---|---|---|---|
| TID-0001 | xxxx.xx@··· | xxxx.xx | s.sdatxxxxx | AID-xxxx-01 | xxxx.mylst** | ··· |
| TID-0002 | *.az@··· | * | s.sdat* | AID-*-01 | *1.mylst | ··· |
| ⋮ | ⋮ | ⋮ | ⋮ | ⋮ | ⋮ | ⋮ |

*FIG.9*

VIEWER USER DATA

| VIEWER USER ID | ACCOUNT | AUTHENTICATION INFORMATION | AVATAR DATA | POINT BALANCE | PURCHASED ITEMS | NAME | ・・・ |
|---|---|---|---|---|---|---|---|
| MID-00001 | **1xyz@・・・ | s.sdat・・・・・ | MID-xxxx-01 | nnn | bitmlst.・・・ | ・・・・ | ・・・ |
| MID-00002 | xx.bbb@・・・ | s.sdat・・・・・ | MID-***-01 | ppp | bitmlst.・・・ | ・・・・ | ・・・ |
| ⋮ | ⋮ | ⋮ | ⋮ | ⋮ | ⋮ | ⋮ | ⋮ |

PERFORMER USER

*FIG.14*
IMAGES ON PC AS VIEWER TERMINAL
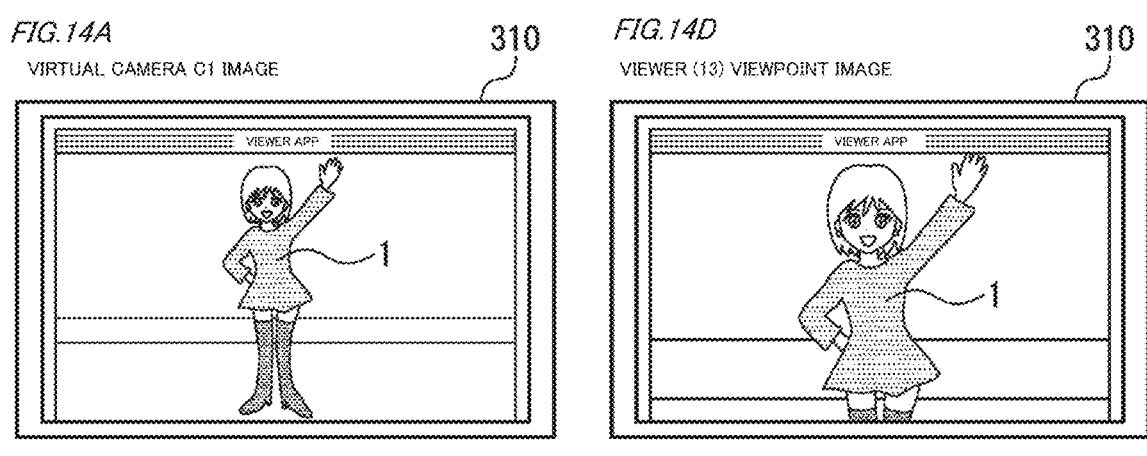
*FIG.14A*
VIRTUAL CAMERA C1 IMAGE     310
*FIG.14D*
VIEWER (13) VIEWPOINT IMAGE     310
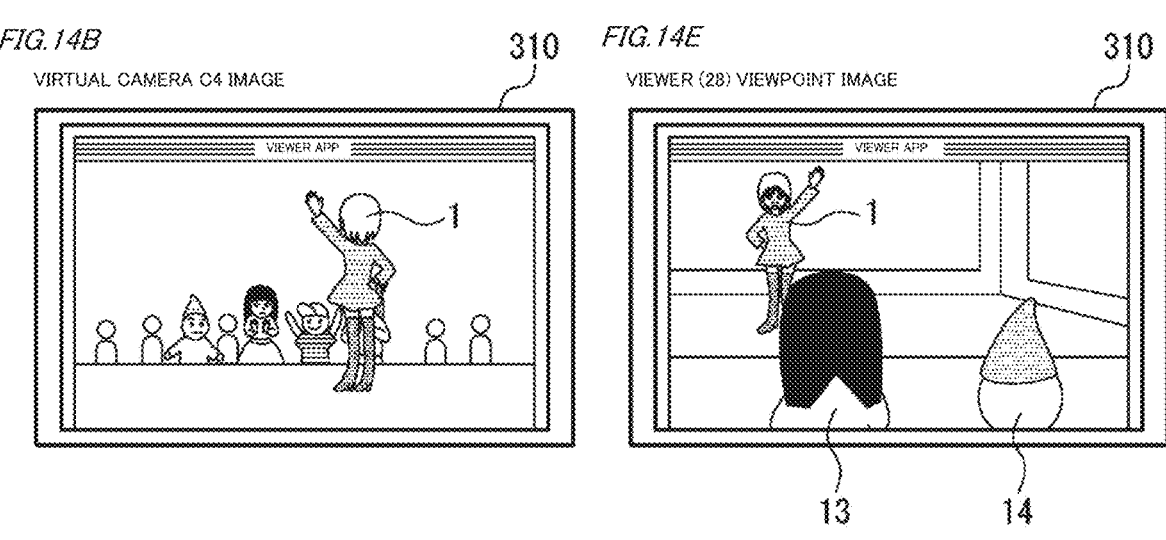
*FIG.14B*
VIRTUAL CAMERA C4 IMAGE     310
*FIG.14E*
VIEWER (28) VIEWPOINT IMAGE     310
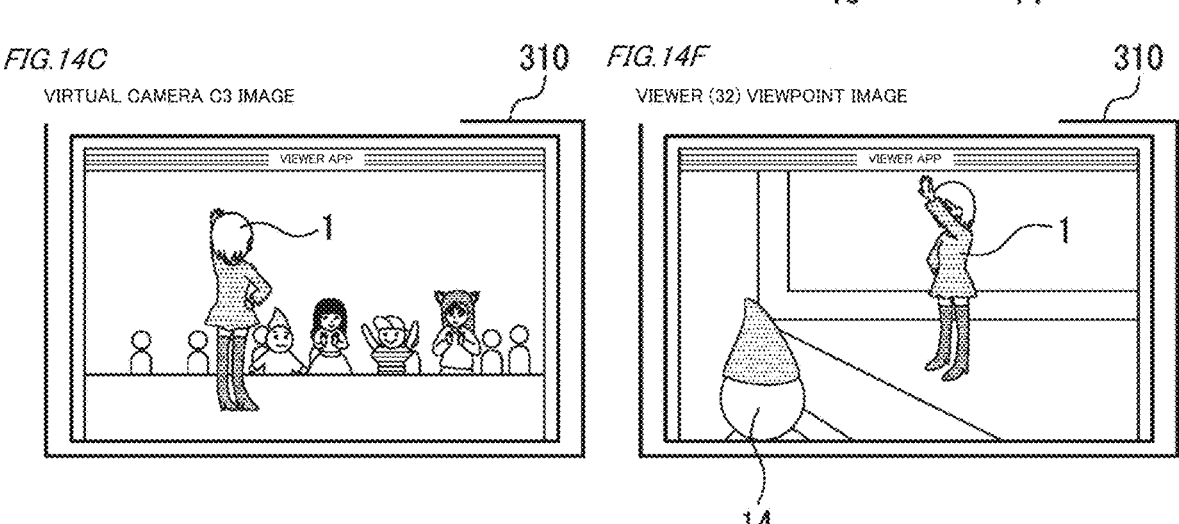
*FIG.14C*
VIRTUAL CAMERA C3 IMAGE     310
*FIG.14F*
VIEWER (32) VIEWPOINT IMAGE     310

*FIG.15*
IMAGES ON SMARTPHONE AS VIEWER TERMINAL
*FIG.15A*
VIRTUAL CAMERA C1 IMAGE
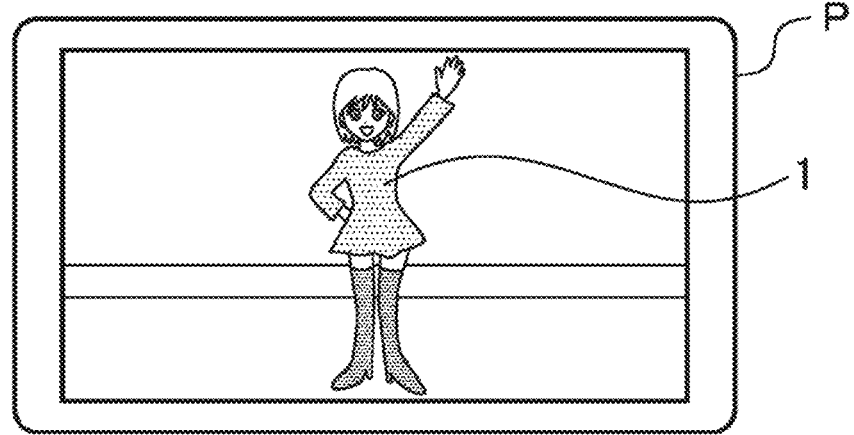
*FIG.15B*
VIEWER (13) VIEWPOINT IMAGE
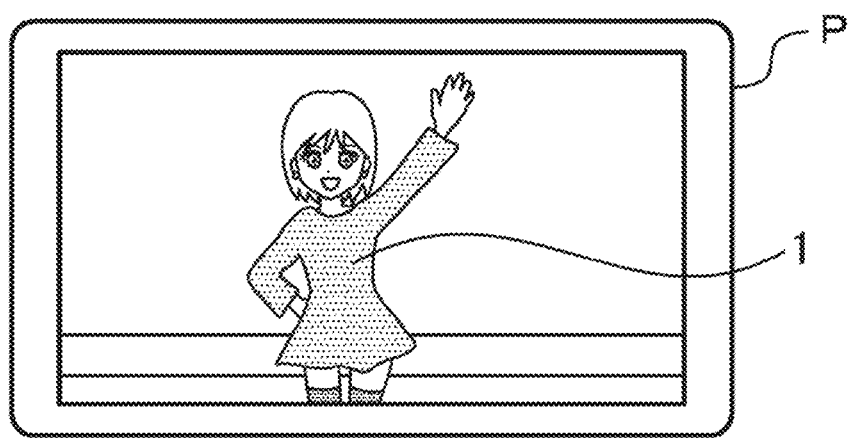

FIG.20

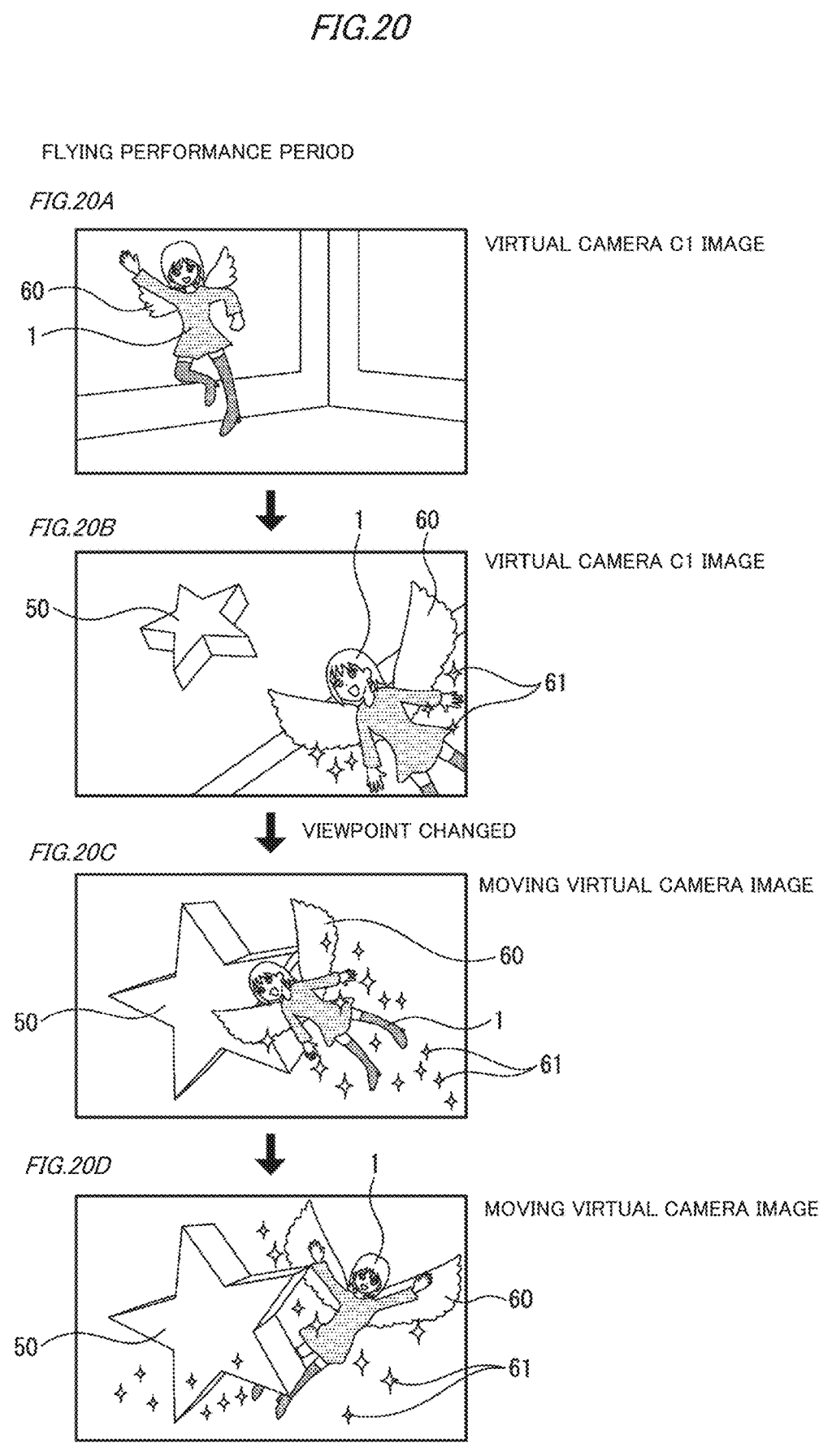

FLYING PERFORMANCE PERIOD

FIG.20A

VIRTUAL CAMERA C1 IMAGE

FIG.20B

VIRTUAL CAMERA C1 IMAGE

VIEWPOINT CHANGED

FIG.20C

MOVING VIRTUAL CAMERA IMAGE

FIG.20D

MOVING VIRTUAL CAMERA IMAGE

UNTIL SPECIFIC PERIOD BEFORE SCHEDULED DATE

FROM SPECIFIC PERIOD BEFORE

FIG.26
FIG.26A
FS PURCHASE SCREEN
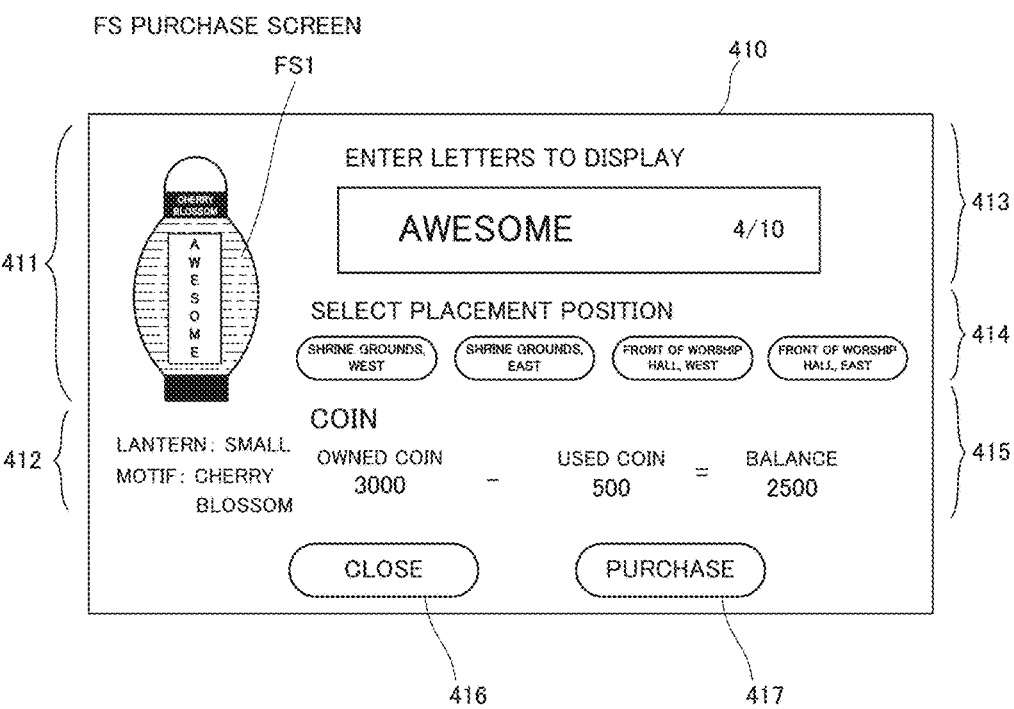
FIG.26B
DISPLAYED SCREEN AFTER FS PURCHASE
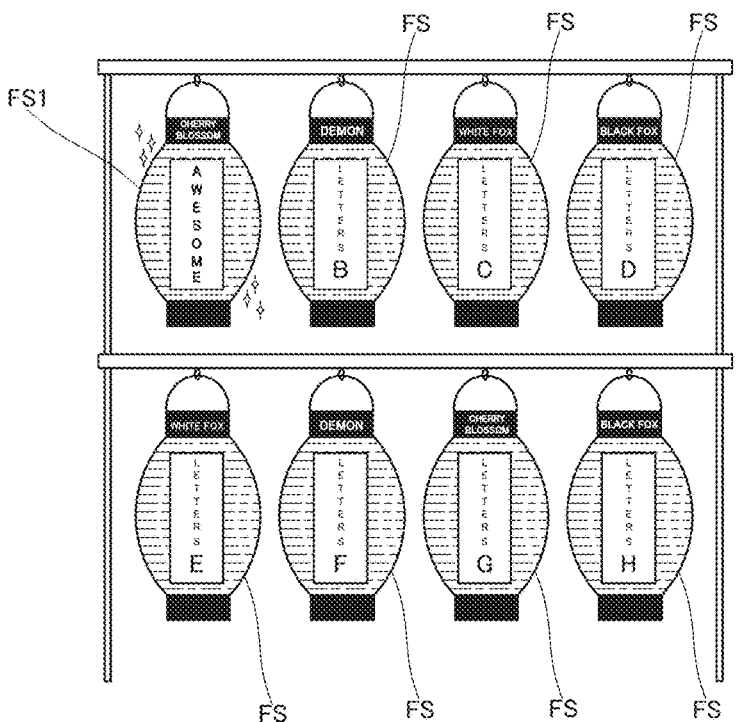

TABLE FOR ATTRIBUTES

| MOTIF (ATTRIBUTE) | MOTIF COLOR | PRICE (COIN) | |
|---|---|---|---|
| PLAIN | PLAIN | SMALL | 500 COIN |
| CHERRY BLOSSOM | PINK/WHITE | LARGE | 2500 COIN |
| | | SMALL | 500 COIN |
| DEMON | RED/BLACK | LARGE | 2500 COIN |
| | | SMALL | 500 COIN |
| WHITE FOX | WHITE/LIGHT BLUE | LARGE | 2500 COIN |
| | | SMALL | 500 COIN |
| BLACK FOX | BLACK/RED | LARGE | 2500 COIN |
| | | SMALL | 500 COIN |
| GORGEOUS | GOLD | LARGE | 5000 COIN |

FIG.27B

TABLE FOR SIZES

| SIZE | FONT TYPES | FONT COLORS | UPPER LIMIT FOR LETTERS | PLACEMENT AREA |
|---|---|---|---|---|
| LARGE | FONT A | BLACK | 15LETTER + 15LETTER | MAIN STREET (WEST) |
| | | | | MAIN STREET (EAST) |
| | FONT B | RED | | BIG SHRINE GATE |
| SMALL | FONT A | BLACK | 10LETTER | SHRINE GROUNDS (WEST) |
| | | | | SHRINE GROUNDS (EAST) |
| | FONT B | RED | | FRONT OF WORSHIP HALL (WEST) |
| | | | | FRONT OF WORSHIP HALL (EAST) |

FIG.27C

USER RELATED INFORMATION(RELATED TO PURCHASED FS)

| USER ID | FS ID | PURCHASED FS | LETTERS | USER DESIGNATED AREA | POSITION | PURCHASED DATE AND TIME |
|---|---|---|---|---|---|---|
| 1 | a3 | CHERRY BLOSSOM, SMALL | AWESOME | A | A1 | 2023/6/3 1:00 |
| | b3 | GORGEOUS | GREAT | B | B7 | 2023/6/3 16:30 |
| | c3 | GORGEOUS | CONGRATS! | B | B4 | 2023/6/5 15:00 |
| 2 | d3 | WHITE FOX, SMALL | LETTERS D3 | C | C5 | 2023/6/1 0:15 |
| 3 | e3 | CHERRY BLOSSOM, SMALL | LETTERS E3 | A | A1 | 2023/6/1 20:30 |
| | f3 | BLACK FOX, LARGE | LETTERS F3 | D | D2 | 2023/6/6 21:03 |
| 4 | g3 | DEMON, LARGE | LETTERS G3 | D | D6 | 2023/6/2 9:21 |
| ... | ... | ... | ... | ... | ... | ... |

EXHIBITION AREA A FOR USER 2

INITIAL POSITION (MIDNIGHT)

WHEN USER 1 NEWLY PURCHASES FS1

SWITCHING CONDITION MET (2AM)

SWITCHING CONDITION MET (4AM)

DEFAULT FS PLACEMENT INFORMATION FOR EXHIBITION AREA A (SMALL FS PLACEABLE AREA)

| LOCATIONS | FS ID | LETTERS |
|-----------|-------|---------|
| A1 | a1 | LETTERS A |
| A2 | b1 | LETTERS B |
| A3 | c1 | LETTERS C |
| A4 | d1 | LETTERS D |
| ... | ... | ... |

*FIG.31B*

DEFAULT FS PLACEMENT INFORMATION FOR EXHIBITION AREA B (LARGE FS PLACEABLE AREA)

| LOCATIONS | FS ID | LETTERS |
|-----------|-------|---------|
| B1 | a2 | LETTERS A2 |
| B2 | b2 | LETTERS B2 |
| B3 | c2 | LETTERS C2 |
| B4 | d2 | LETTERS D2 |
| ... | ... | ... |

DEFAULT EVENT FS INFORMATION

| MOTIF (ATTRIBUTE) | | FS ID | LETTERS |
|---|---|---|---|
| CHERRY BLOSSOM | LARGE | a4 | LETTERS A4 |
| | SMALL | b4 | LETTERS B4 |
| DEMON | LARGE | c4 | LETTERS C4 |
| | SMALL | d4 | LETTERS D4 |
| WHITE FOX | LARGE | e4 | LETTERS E4 |
| | SMALL | f4 | LETTERS F4 |
| BLACK FOX | LARGE | g4 | LETTERS G4 |
| | SMALL | h4 | LETTERS H4 |
| GORGEOUS | LARGE | i4 | LETTERS I4 |

*FIG.35B*

EVENT FS INFORMATION ON USER 1 TERMINAL

| MOTIF (ATTRIBUTE) | | FS ID | LETTERS |
|---|---|---|---|
| CHERRY BLOSSOM | LARGE | a4 | LETTERS A4 |
| | SMALL | a3 | AWESOME |
| DEMON | LARGE | c4 | LETTERS C4 |
| | SMALL | d4 | LETTERS D4 |
| WHITE FOX | LARGE | e4 | LETTERS E4 |
| | SMALL | f4 | LETTERS F4 |
| BLACK FOX | LARGE | g4 | LETTERS G4 |
| | SMALL | h4 | LETTERS H4 |
| GORGEOUS | LARGE | c3 | CONGRATS ! |

FIG.36

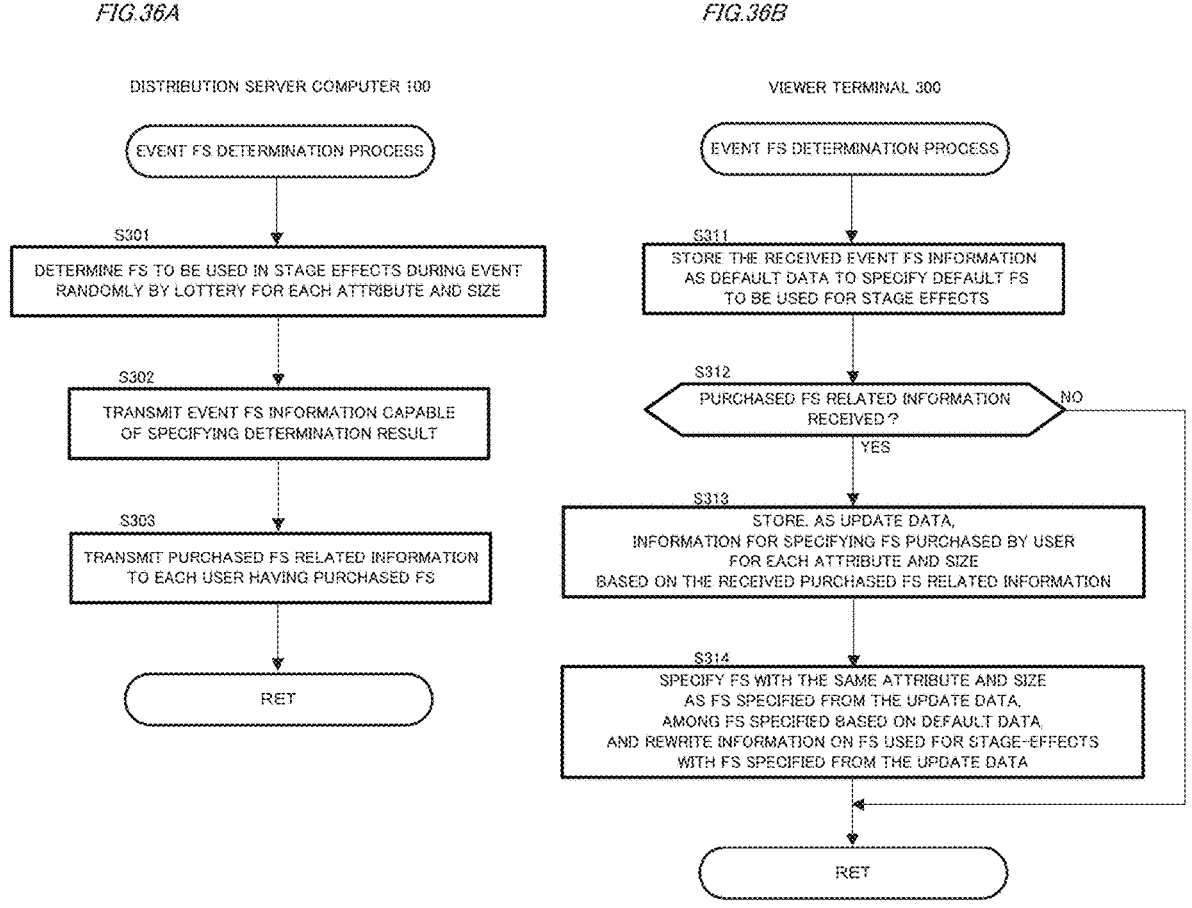

FIG.36A

DISTRIBUTION SERVER COMPUTER 100

EVENT FS DETERMINATION PROCESS

S301
DETERMINE FS TO BE USED IN STAGE EFFECTS DURING EVENT RANDOMLY BY LOTTERY FOR EACH ATTRIBUTE AND SIZE

S302
TRANSMIT EVENT FS INFORMATION CAPABLE OF SPECIFYING DETERMINATION RESULT

S303
TRANSMIT PURCHASED FS RELATED INFORMATION TO EACH USER HAVING PURCHASED FS

RET

FIG.36B

VIEWER TERMINAL 300

EVENT FS DETERMINATION PROCESS

S311
STORE THE RECEIVED EVENT FS INFORMATION AS DEFAULT DATA TO SPECIFY DEFAULT FS TO BE USED FOR STAGE EFFECTS

S312
PURCHASED FS RELATED INFORMATION RECEIVED?          NO

YES

S313
STORE, AS UPDATE DATA, INFORMATION FOR SPECIFYING FS PURCHASED BY USER FOR EACH ATTRIBUTE AND SIZE BASED ON THE RECEIVED PURCHASED FS RELATED INFORMATION

S314
SPECIFY FS WITH THE SAME ATTRIBUTE AND SIZE AS FS SPECIFIED FROM THE UPDATE DATA, AMONG FS SPECIFIED BASED ON DEFAULT DATA, AND REWRITE INFORMATION ON FS USED FOR STAGE-EFFECTS WITH FS SPECIFIED FROM THE UPDATE DATA

RET

FIG.37

| NUMBER OF ENTERING TIMES | ITEMS | STAGE EFFECTS |
|---|---|---|
| 1 | LIMITED CRACKER A | NORMAL |
| 2 | LIMITED CRACKER B | NORMAL |
| 3 | LIMITED CRACKER C | NORMAL |
| 4 | LIMITED FIREWORKS | SPECIAL ROOM A |
| 5 | LIMITED GLOW STICK | SPECIAL ROOM B |
| 6 | LIMITED STAMP | SPECIAL ROOM S |
| 7 | LIMITED ITEM SET | SECRET COSTUM |

METHOD AND SYSTEM

BACKGROUND

1. Technical Field

The present invention relates to methods and systems.

2. Description of the Background

A system that distributes content via a network has been known. For instance, Patent Literature 1 discloses a distribution system that allows a performer to hold a live event such as a live performance in a virtual space on the web, while allowing a viewer to operate a viewer avatar (to move, give gifts, perform social tipping, and perform other actions) so that the viewer is able to participate in the live event.

CITATION LIST

Patent Literature

Patent Literature 1: JP 2012-120098 A

BRIEF SUMMARY

The distribution system described in Patent Literature 1 is configured to allow performers and viewers to generate an event (hereinafter the event refers to something that happens) while the live event is being held, thus livening up the live event and raising the participant's awareness of the participation. This enhances their interest in the live event. This system, however, does not take measures to enhance the viewers' interest in the live event before it begins. This has resulted in problems such as the inability to gradually increase the interest in live event and other activities.

In view of the above, the present invention provides a method and a system that are capable of increasing the interest in live event gradually.

(1) A computer control method according to one aspect of the present invention controls a computer (e.g., distribution server computer 100 and viewer terminal 300) that is configured to provide a virtual space to a user, and the method includes:

a displaying step of displaying an image in a generated virtual space, the image being in accordance with an operation by the user (e.g., a virtual space update data distribution process, a viewer's viewpoint image output process);

a generating step of generating an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and a providing step of providing event content (this refers to content of a live performance (live event), for example) in a predetermined type of virtual space (e.g., in spatial area ER5) of the virtual space on a scheduled date (e.g., virtual space update data distribution process using event data 111, viewer's viewpoint image output process), wherein also during a period before the scheduled date (e.g., the period up to the day before the scheduled date of the live event (this may be called a "scheduled event date")), the displaying step displays an image in the predetermined type of virtual space in response to an operation by the user (e.g., the user is allowed to enter the spatial area ER5 and view a displayed image in spatial area ER5), and the generating step generates an event in the predetermined type of virtual space (e.g., placing a flower stand FS purchased by the user in spatial area ER5 before the scheduled date of the live event in steps S107 to S109 of FIG. 28, choosing a flower stand FS by lottery to be exhibited in spatial area ER5 in step S203 of FIG. 32, changing settings performed in response to an operation by the administrator), and the displaying step changes a display mode in the predetermined type of virtual space in accordance with the event that occurs in the predetermined type of virtual space in the period before the scheduled date (e.g., placing and displaying the flower stand FS purchased by the user in the exhibition area in steps S107 to S109 in FIG. 28, choosing flower stands FS by lottery to be placed in the exhibition area in spatial area ER5 in step S203 in FIG. 32 and placing and displaying the flower stands FS in the exhibition area, and displaying the flower stand FS purchased before the scheduled live event date in spatial area ER5 during the live event in steps S205 and S207).

This configuration shares and provides a user with the predetermined type of virtual space in which event content is to be provided and an event that can change the display mode in the predetermined type of virtual space during the period before the scheduled date, thereby gradually increasing the interest in the event content before the event content is provided.

(2) In (1), the displaying step changes the display mode in the predetermined type of virtual space from the occurrence of the event until the end of the period before the scheduled date in accordance with the event (e.g., the user's purchasing of the flower stand FS in FIG. 27C) that occurs in the period before the scheduled date. For instance, the flower stand FS to be displayed in spatial area ER5 will change until the day before the scheduled event date.

This configuration draws the user's attention to whether an event occurs in the period before the scheduled date or how the display mode changes in the predetermined type of virtual space.

(3) In (2), the display mode in the predetermined type of virtual space that is changeable in the period before the scheduled date may be different from the display mode for another user in accordance with an event that occurs in the period before the scheduled date (e.g., the user 1's purchased flower stand FS1 will be displayed at the predetermined position A1 in the predetermined exhibition area A in the spatial area ER5 on the viewer terminal 300 of user 1 as in FIG. 29B through FIG. 29D. Meanwhile, viewer terminal 300 of user 2 does not display the flower stand FS1 purchased by user 1 at the predetermined position A1 in the predetermined display area A, as shown in FIG. 30B and FIG. 30C.)

This configuration enables customization of the display mode for each user in the predetermined type of virtual space during the period before the scheduled date, thus giving each user a special feeling.

(4) In (1), the displaying step changes the display mode (e.g., the display mode of the flower stand FS that is used for stage effects of the live event shown in FIG. 34) in the predetermined type of virtual space during provision of the event content in accordance with an event that occurs in the period before the scheduled date (e.g., step S303 in FIG. 36A, step S313 and step S314 in FIG. 36B).

This configuration draws the user's attention to whether an event occurs in the period before the scheduled date or how the display mode changes in the predetermined type of virtual space during provision of the event content.

(5) In (4), the display mode (e.g., the display mode of a flower stand FS used for stage effects of the live event shown in FIG. 34) in the predetermined type of virtual space that is changeable during provision of the event content may be different from the display mode for another user in accordance with an event that occurs in the period before the scheduled date (e.g., flower stands FS to be used for stage effects can be default flower stands FS in FIG. 35A or they can be flower stands in FIG. 35B in accordance with the user related information in FIG. 27C).

This configuration enables customization of the display mode for each user in the predetermined type of virtual space during the provision of event content, thus giving each user a special feeling.

(6) In (1), an event that changes the display mode in the predetermined type of virtual space includes an action in response to an operation by the user (e.g., an operation by the user to purchase a flower stand FS in step S107 of FIG. 28), the action being reflected in the predetermined type of virtual space (e.g., the flower stand is placed in a predetermined exhibition area A of the spatial area ER5 in step S109 of FIG. 28).

This configuration generates an event that changes the display mode in the predetermined type of virtual space in response to the user's operation, thereby encouraging the user to operate and improving the user's awareness of participation.

(7) In (6), an event that changes the display mode in the predetermined type of virtual space includes an action in response to an operation by another user (e.g., for user 2, the purchase operation of flower stand FS1 by another user, user 1), the action being reflected in the predetermined type of virtual space (e.g., as shown in FIG. 30D, the display device 310 of user 2 may display the flower stand FS1 purchased by another user 1 in a predetermined exhibition area A. If user 1 had not purchased it, the flower stand FS1 could not have been placed and displayed.)

This configuration allows the display mode in the predetermined type of virtual space to change also in response to another user's operation. This adds the interest to a change in display mode, and thus enhances the interest of the user.

(8) In (1), the displaying step keeps a display mode associated with a special type of user (e.g., sponsor user, performer user, special user) in the predetermined type of virtual space even if an event (e.g., user's purchase operation, the switching condition is met in step S202 in FIG. 32) that changes the display mode in the predetermined type of virtual space occurs. For instance, the display position of the flower stand FS is selected by lottery in response to a purchase operation from positions other than the display position of the flower stand FST of the special user. As shown in FIG. 33, the flower stand FST associated with a special type of user will be continuously displayed as shown in FIG. 33A through FIG. 33D).

This configuration allows the display mode related to the special user to continue without change, thereby improving the convenience of the special user.

(9) In (1), the predetermined type of virtual space has a first area (e.g., sub-area ER53' in FIG. 24 that is a second virtual space) that is used to provide event content on the scheduled date and a second area (e.g., sub-area ER53 that is a part of a first virtual space and has a common display mode with sub-area ER53') that has a common display mode with the first area, and the displaying step is such that, until an open condition is met during the period before the scheduled date (e.g., when it's the day before the scheduled date of the live event), entry into the first area is restricted (e.g., the user avatar U is not allowed to enter sub-area ER53' in FIG. 24), while entry into the second area is allowed and an image of the second area is displayed in response to an operation by the user (e.g., the user avatar U is allowed to enter sub-area ER53), and after the open condition is met, entry into the second area is restricted, while entry into the first area is allowed and an image of the first area is displayed in response to an operation by the user (e.g., the user avatar U is not allowed to enter sub-area ER53 but is allowed to enter sub-area ER53').

This allows the area used to be switched depending on whether the open condition is met; at least after the open condition is met, it provides a virtual space that is an area suitable to provide the event content.

(10) In (9), the predetermined type of virtual space has a third area (e.g., sub-areas ER51 and ER52, which are part of the first virtual space), and the second area and third area are connected to enable seamless entrance (e.g., a user avatar is allowed to seamlessly move back and forth between sub-areas ER51, ER52, and ER53 of FIG. 24A that is in the first virtual space), and the first area and the third area are separate from each other (e.g., the areas in different virtual space) and are allowed to be entered from one area to another via display of a predetermined screen (e.g., as shown in FIG. 24B, the user avatar is allowed to move back and forth between the first and second virtual spaces via the portals P in the sub-region ER53' and ER52).

This configuration improves the convenience of traffic between the second area and the third area before the open condition is met, and after the open condition is met, a predetermined screen is displayed before the avatar moves to the first area, thus giving the user a special feeling or a feeling of tension, and increasing the user's interest.

(11) In (9), the open condition may be met on a specific period before the scheduled date of the event content to be provided (e.g., the day before the scheduled event date).

This configuration forms a period before the open condition is met, a period after the open condition is met but before the event content is provided, and a period during which the event content is being provided, thereby enhancing the user's interest more gradually.

(12) In (1), the display mode in the predetermined type of virtual space to be changed by the displaying step includes the display mode of a specific object placed in the predetermined type of virtual space (e.g., a flower stand FS placed in the exhibition area in spatial area ER5), and an event that changes the display mode in the predetermined type of virtual space includes an event that places the specific object in a designated area in the predetermined type of virtual space during the period before the scheduled date, the specific object being associated with the user (e.g., an event that places the flower stand FS purchased by the user in the predetermined exhibition area A as shown in FIG. 29B, where the information on the flower stand FS purchased by the user is associated with the user as user related information in FIG. 27C).

This configuration places a specific object associated with the user in the area designated by the user during the period before the scheduled date, and thus changes the display mode in the predetermined type of virtual space, thereby increasing the user's interest.

(13) In (12), an event that changes the display mode in the predetermined type of virtual space includes an event that generates a display mode of the specific object in response to an operation by the user when placing the specific object (e.g., when or after purchasing a flower stand FS by the user, decorations such as letters are added by an operation with the letter input section 413 of FIG. 26A, and then the flower stand FS is placed in the spatial area ER5).

This configuration allows each user to change the display mode of the specific object to be placed in their own original way, thus increasing the user's interest.

(14) In (1), the display mode in the predetermined type of virtual space that is changed by the displaying step includes the display mode of a specific object (e.g., flower stands FS held by performer avatars 1a to 1d in FIG. 34 and an operator avatar) that is displayed corresponding to a facilitator character (e.g., performer avatars 1a to 1d in FIG. 34), the facilitator character facilitating the event content and being displayed and acting in the predetermined type of virtual space while the event content is being provided.

This configuration allows the display mode of a specific object, which can be displayed corresponding to the facilitator character, to change in accordance with the event that occurs during the period before the scheduled date, thus increasing the user's interest due to such an event.

(15) The method in (1) includes a storing step of storing information that enables the event content provided by the providing step to be provided again (e.g., storing, in storage 103, event data 111 that enables the event provided on the scheduled date to be replayed), wherein the providing step provides the event content provided on the scheduled date based on the information stored by the storing step in response to a request from the user, even after the event content has been provided (e.g., even on a date after the scheduled date) (e.g., distributing replay data of the event content to a user when the user purchases replay data of the event content), and the display mode of the event content provided by the providing step after the event content has been provided differs with an event that occurs during the period before the scheduled date (e.g., the display mode of the flower stand FS that may be displayed in the replay data will differ for each user or for each piece of event content depending on the flower stand FS purchased during the period before the scheduled date). (See (Replay data) in (Modified Examples)).

This configuration allows the event content to be provided in the display mode that corresponds to the event that occurs in the period before the scheduled date, even after the provision of the event content on the scheduled date, thereby increasing user's convenience and interest.

(16) In (1), the displaying step further changes (e.g., changes the stage effect in FIG. 37, step S403 in FIG. 38) the display mode in the predetermined type of virtual space in accordance with a degree (e.g., the number of entering times into spatial area ER5 (e.g., number of days) or the duration of stay) to which an image in the predetermined type of virtual space is displayed during the period before the scheduled date.

This configuration changes the display mode in the predetermined type of virtual space in accordance with the degree to which an image in the predetermined type of virtual space is displayed during the period before the scheduled date, thereby improving and encouraging the user's motivation to display images in the predetermined type of virtual space during the period before the scheduled date.

(17) In (1), the providing step provides the event content on the scheduled date to a user who meets a predetermined condition (e.g., purchasing a ticket to participate in the event content), and the displaying step allows a user who meets the predetermined condition to view a displayed image in the predetermined type of virtual space during the period before the scheduled date (e.g., a user who has purchased a ticket to participate in the event content is allowed to enter spatial area ER5).

This configuration improves user's motivation and encourages the user to meet the predetermined condition.

(18) In (1), the providing step provides the event content on the scheduled date to a user who meets a predetermined condition (e.g., purchasing a ticket to participate in the event content), and the displaying step allows a user, regardless of whether the user meets the predetermined condition, to view a displayed image in the predetermined type of virtual space during the period before the scheduled date (e.g., a user is allowed to enter spatial area ER5, regardless of whether the user has purchased a ticket to participate in the event content. See (Right to enter spatial area ER5) in (Modified Examples)).

This configuration allows a user who does not meet the predetermined condition also to view a displayed image in the predetermined type of virtual space. This increases interest in the event content when the user views images in the predetermined type of virtual space, thereby improving the user's motivation to meet the predetermined condition.

(19) A system (virtual space content distribution system) according to one aspect of the present invention includes a computer (e.g., distribution server computer 100 and viewer terminal 300) that is configured to perform a process of providing a virtual space to a user, and the system includes: the computer including a processor and a memory, wherein the processor causes to:

display an image in a generated virtual space, the image being in accordance with an operation by the user (e.g., a virtual space update data distribution process, a viewer's viewpoint image output process);

generate an event in the virtual space (e.g., a process of placing an object purchased in response to a purchase operation by a user in the virtual space (a virtual space update data generation process), a process of placing and updating the purchased object in the virtual space based on the virtual space update data (a virtual space update process)); and provide event content in a predetermined type of virtual space (e.g., in spatial area ER5) of the virtual space on a scheduled date (e.g., virtual space update data distribution process using event data 111, viewer's viewpoint image output process), wherein also during a period before the scheduled date (e.g., the period up to the day before the scheduled date of the live event), the processor causes to display an image in the predetermined type of virtual space in response to an operation by the user (e.g., the user is allowed to enter the spatial area ER5 and view a displayed image in spatial area ER5), and causes to generate an event in the predetermined type of virtual space (e.g., placing a flower stand FS purchased by the user in spatial area ER5 before the scheduled date of the live event in steps S107 to S109 of FIG. 28, choosing a flower stand FS by lottery to be exhibited in spatial area ER5 in step S203 of FIG. 32, changing settings performed in response to an operation by the administrator), and the processor causes to change a display mode in the predetermined type of virtual space in accordance with the event that occurs in the predetermined type of virtual space in the period before the scheduled date (e.g., placing and displaying the flower stand FS purchased by the user in the exhibition area in steps S107 to S109 in FIG. 28, choosing flower stands FS by lottery to be placed in the exhibition area in spatial area ER5 in step S203 in FIG. 32 and placing and displaying the flower stands FS in the exhibition area, and displaying the flower stand FS purchased before the scheduled live event date in spatial area ER5 during the live event in steps S205 and S207).

This configuration shares and provides a user with the predetermined type of virtual space in which event content is to be provided and an event that can change the display mode in the predetermined type of virtual space during the period before the scheduled date, thereby gradually increasing the interest in the event content before the event content is provided.

BRIEF DESCRIPTION OF DRAWINGS

FIG. 7 shows an example configuration of event data in the virtual space content distribution system according to one embodiment of the present invention.

FIG. 8 shows an example configuration of performer user data in the virtual space content distribution system according to one embodiment of the present invention.

FIG. 9 shows an example configuration of viewer user data in the virtual space content distribution system according to one embodiment of the present invention.

FIG. 14 shows an example display on a viewer terminal that makes up the virtual space content distribution system according to one embodiment of the present invention.

FIG. 15 shows an example display on a viewer terminal that makes up the virtual space content distribution system according to one embodiment of the present invention.

FIG. 20 shows an example display during a flying performance period on a viewer terminal that makes up the virtual space content distribution system according to one embodiment of the present invention.

FIG. 26 shows an example display mode during a purchase process for an object displayed in a virtual space according to one embodiment of the present invention.

FIG. 27 shows an example table of object types used in the purchase process of objects displayed in the virtual space and user related information according to one embodiment of the present invention.

FIG. 31 is a table showing an example of the relationship between objects displayed in a predetermined type of virtual space and the predetermined areas according to one embodiment of the present invention.

FIG. 35 shows an example table about objects displayed in the event content provided in a predetermined type of virtual space according to one embodiment of the present invention.

FIG. 36 is a flowchart showing an example of the determination process of objects to be displayed in the event content provided in a predetermined type of virtual space according to one embodiment of the present invention.

FIG. 37 shows an example table used for the process related to the event content provided in a predetermined type of virtual space according to one embodiment of the present invention.

DETAILED DESCRIPTION

Figure 1:
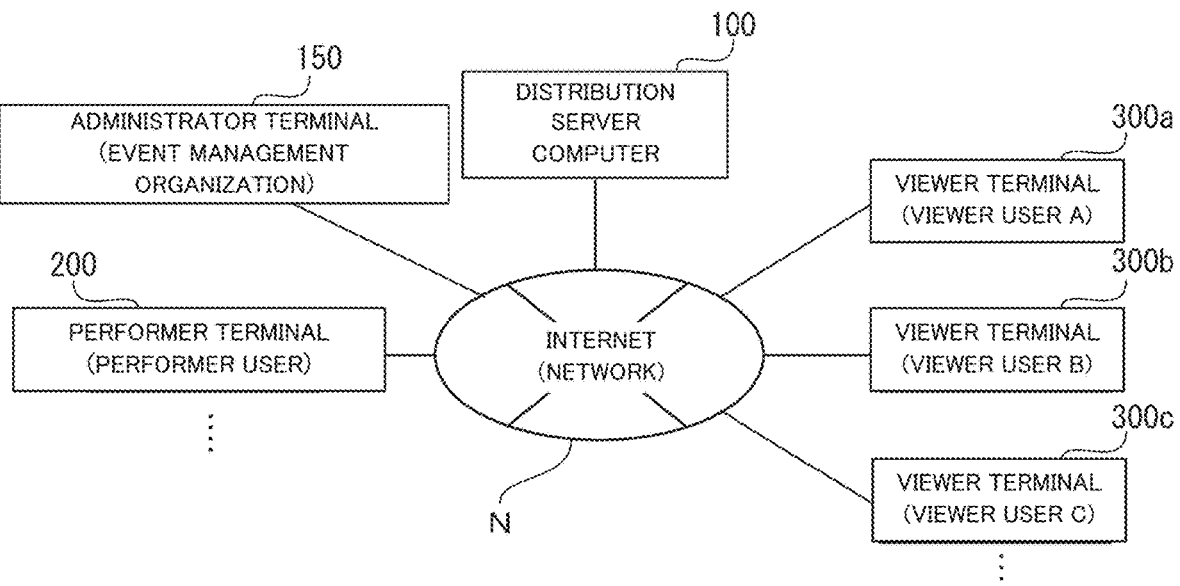
FIG. 1 is a block diagram of an example of the system configuration of a virtual space content distribution system according to one embodiment of the present invention.

Referring to the drawings, the following describes embodiments of the present invention that are a virtual space content distribution system configured to distribute various types of content in a virtual space, by way of examples. In the drawings, like numbers indicate like components to avoid redundant explanations. A distribution program executed in the virtual space content distribution system according to the present invention may be a program running in the entire system made up of a server computer and terminals, which will be described later and constitute the virtual space content distribution system. The program may be one that runs in only a part of the devices making up the virtual space content distribution system, just running in a server computer or each of the terminals, for example.

Example 1

FIG. 1 is a block diagram showing an example system configuration of a virtual space content distribution system in one embodiment of the present invention. This system shown in FIG. 1 distributes a virtual-space content that is a live event in a virtual space performed by a performer avatar 1 corresponding to a performer user. The live event includes live performance, games, social events, and movie watching parties in the virtual space.

As shown in FIG. 1, the virtual space content distribution system of the present embodiment mainly includes: a distribution server computer 100 capable of executing various processes related to the virtual space and various processes related to the provision and distribution of the virtual space; an administrator terminal 150 used by an event administrator K of an event management organization that manages and administers a live event in the virtual space to manage the distribution of the live event in the virtual space; a performer terminal 200 used by a performer user; and a viewer terminal 300 that a viewer user is allowed to use to enter and participate in the virtual space (e.g., by logging into the virtual space) and view the event content in the virtual space. The distribution server computer 100, the administrator terminal 150, the performer terminal 200, and the viewer terminal 300 are connected to each other for data communication via the internet network N, an open computer network.

The following describes an example of the present embodiment where the administrator terminal 150 and the performer terminal 200 are connected to the distribution server computer 100 via the internet network N, and the present invention is not limited to this. For instance, assume the case where an event management organization provides a studio to performer users, and the distribution server computer 100 is installed in this studio. In this case, the administrator terminal 150 and performer terminal 200 may be connected locally to this distribution server computer 100 for data communication, or they may be connected for communication via a local area network LAN within the studio facility.

As shown in FIG. 1, there are multiple viewer users such as viewer user A, viewer user B, and viewer user C, and the viewer terminals 300 may include a viewer terminal 300*a*, a viewer terminal 300*b*, a viewer terminal 300*c* . . . that the viewer user A, the viewer user B, the viewer user C . . . can use, respectively. Note that there is typically a plurality of viewer users, but they may be one user or four or more. The number of viewer users may be determined as appropriate depending on the type of event content provided in the virtual space. Hereinafter, these viewer user A, viewer user B, viewer user C . . . may be collectively called a viewer user, and the viewer terminal 300*a*, viewer terminal 300*b*, viewer terminal 300*c* . . . may be collectively called a viewer terminal 300.

The following describes an example of the present embodiment for a single performer user, and the present invention is not limited to this example. The event content provided in the virtual space may be a joint event in which multiple performer users who are working independently participate for performance, or a group event in which a group of multiple performer users who are working together participates. In this way, when multiple performers perform the live event, the performer terminal 200*a*, performer terminal 200*b*, performer terminal 200*c* . . . may be provided for each performer user, or when a group of multiple performers performs the event, they may share a single performer terminal 200. Note that a performer user (also referred to as a talent user) serves as a speaker, host/facilitator, lead role, and others in the event content. Then, event content is facilitated by an avatar that acts as a facilitator, such as a performer avatar that corresponds to the actions of a performer user, and a management avatar that corresponds to the operations of the event manager (also called a management user).

FIG. 1 shows the distribution server computer 100 that is a single unit, and the present invention is not limited to this. This distribution server computer 100 may be configured with a plurality of server computers including a first server computer that mainly performs virtual space processing and a second server computer that mainly performs distribution processing. It may be configured with a cloud server, for example, and the number of server computers may be changed as appropriate depending on the scale of the live event, the number of viewer users participating in the live event, and other factors.

Similarly, FIG. 1 shows the administrator terminal 150 that is a single unit, and the present invention is not limited to this. This administrator terminal 150 may include a plurality of terminals depending on the number of performer users and viewer users who participate in the event content such as a live performance, and the other factors.

<Distribution Server Computer>

Figure 2:
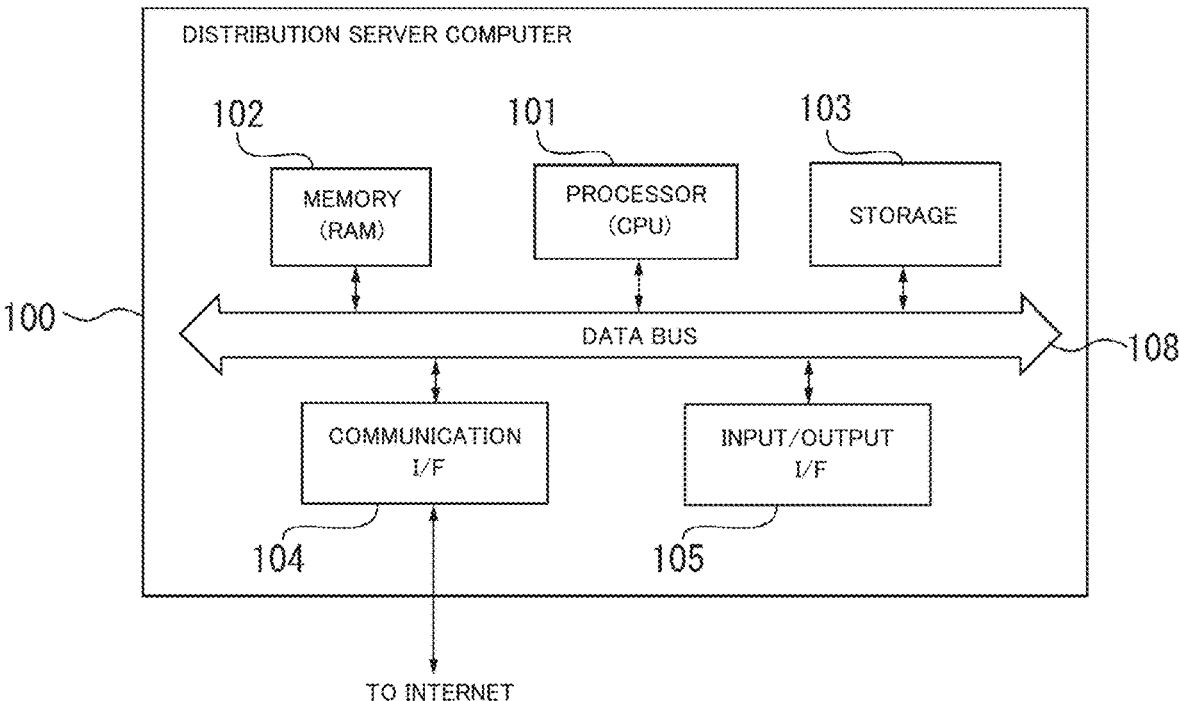
FIG. 2 shows an example configuration of a distribution server computer in the virtual space content distribution system according to one embodiment of the present invention.

FIG. 2 shows the configuration of the distribution server computer 100 used in the present embodiment. The distribution server computer 100 used in this embodiment is a typical server computer with relatively high processing power, installed in a studio operated by an event management organization, as described above. As shown in FIG. 2, the distribution server computer 100 includes a processor (CPU) 101, a memory (RAM) 102, a storage 103 such as a hard disk, a communication interface (I/F) 104 that enables bidirectional communications using TCP/IP protocols via the internet, an open computer network, and an input/output interface (I/F) 105 that enables connection with an input device such as a keyboard. These components are connected to a data bus 108.

This embodiment includes the input/output interface (I/F) 105 to enable local operation. Another embodiment may not include the input/output interface (I/F) 105 if remote operation is possible via the communication interface (I/F) 104.

Figure 3:
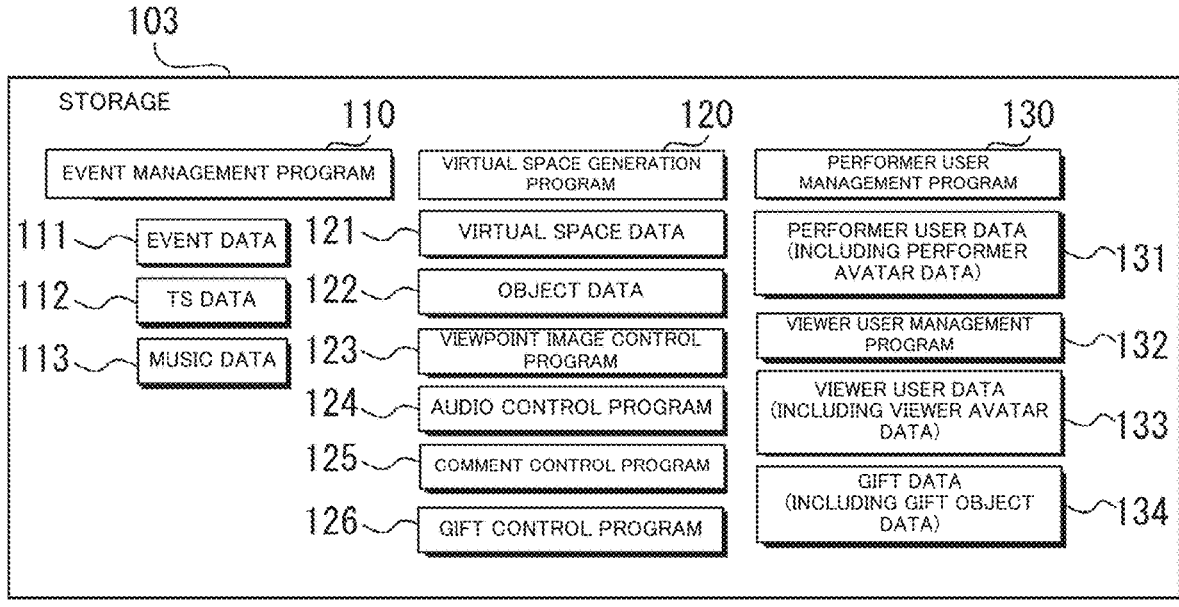
FIG. 3 shows various data stored in the storage of the distribution server computer according to one embodiment of the present invention.

The storage 103 of the distribution server computer 100 stores various data and programs, as shown in FIG. 3, in addition to an operation system (server OS) that provides server functions (not shown). Specifically, the storage 103 mainly stores: an event management program 110 that provides an event management function to manage various live events; a virtual space generation program 120 that provides a virtual space of an event venue; a performer user management program 130 that provides a performer user management function to manage a performer user; and a viewer user management program 132 that provides a viewer user management function to manage a viewer user.

The event management program 110 manages a live event held at the event venue in cooperation with the administrator terminal 150. The event management program 110 stored in the storage 103 is configured to manage the progress of the live event, using event data 111 (see FIG. 7), time schedule data (TS data) 112, music data 113, and other data also stored in the storage 103.

FIG. 7 shows an example of the event data 111 used in this embodiment. The event data 111 stores information associated with the event ID assigned uniquely to a live event, the information including the event name, the file name of the time schedule (TS) data, a performer ID uniquely assigned to a performer user who is a performer, the file name of a music list, the file name of a participating viewer list in which information on special viewer users is registered (the special viewer users are permitted to participate virtually in a third area of the virtual audience area described below), and the file name of a participating viewer list in which information on viewer users is registered (the participating users have reserved virtual participation in a fourth area of the virtual audience area described below). The event data also includes information that specifies the date and time when the live event is held, so that the event content will be distributed at the date and time. The event data also includes information that specifies the date and time of opening the virtual space for content. For the content, the virtual space where the live event will be held is opened before the scheduled date of the event, so that a user is allowed to enter the virtual space.

The time schedule data (TS data) 112 describes the progression order and the list of program (e.g., music) for the virtual space live event to be held in chronological order. The virtual space live event will be managed to proceed in accordance with the time schedule described in this time schedule data (TS data) 112. These time schedule data (TS data) 112, event data 111, and other data may be changed, updated, or added by the event administrator K operating the administrator terminal 150.

The music data 113 is data on a performance part (or karaoke) of each song, with which the performer user sings. The music data 113 is transmitted to the performer terminal 200 and viewer terminal 300 by an audio control program 124 described later in accordance with the time schedule data (TS data) 112 (see FIG. 11).

The virtual space generation program 120 provides an event venue that is a virtual space. The virtual space generation program 120 has the function of providing an event venue in which a performer avatar and a viewer avatar are virtually participating, using various data stored in the storage 103, including virtual space data 121 describing the structure of the event venue, object data 122 to place various objects in the event venue (the objects including star decorations 43 on the stage and star objects 50 to 52 in the sky) within the virtual space, and performer avatar data included in performer user data 131 and viewer avatar data included in viewer user data 133 described later.

Figure 13:
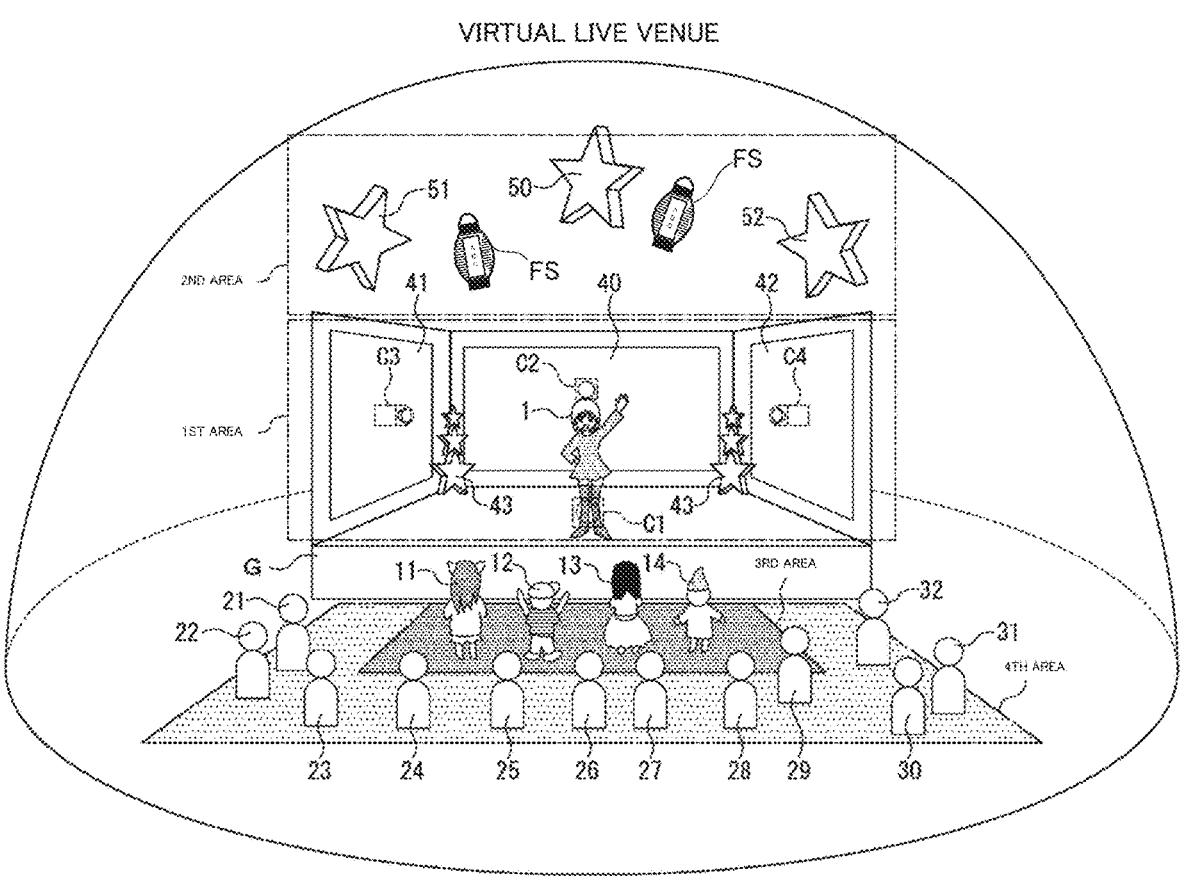
FIG. 13 shows a virtual live venue that is a virtual space used in the virtual space content distribution system according to one embodiment of the present invention.

The viewpoint image control program 123 provides a function of generating viewpoint images from virtual cameras C1 to C4 and from an aerial moving virtual camera (not shown). These virtual cameras are virtually set at the event venue as shown in FIG. 13, for example. The viewpoint image control program 123 also provides a function of displaying, on the performer terminal 200, images from the viewpoints of viewer avatars 11 to 14 who are participating virtually in the third area of the event venue and of viewer avatars 21 to 32 who are virtually participating in the fourth area of the event venue, in cooperation with the viewer terminals 300. The virtual camera C2 is set to obtain an image from the viewpoint of the performer avatar 1 who is on the stage of the event venue, and the viewpoint image from this virtual camera C2 is projected onto a screen S in the studio by the projector 211 (described below) that is connected to the performer terminal 200.

The audio control program 124 controls the audio (including music) distributed at a live event in the virtual space. Specifically, the audio control program 124 provides a reproduction function of the music data 113 and a function of combining the sound that the performer user issues with the reproduced music and distribute it to the administrator terminal 150 and the viewer terminal 300.

The comment control program 125 provides a function of, cooperating with a viewer comment control program (described below) stored in the viewer terminal 300, displaying various comments, which are entered by each viewer user with their viewer terminal 300 during the live event in the virtual space, on the performer terminal 200 and viewer terminal 300 in chronological order.

The gift control program 126 controls a gift that a viewer user gives to the performer user, in cooperation with a program for viewer (described later) stored in the viewer terminal 300. Specifically, the gift control program 126 provides a function of allowing a viewer user to purchase a gift (e.g., purchase an object) based on the information on the unit purchase price set for various gifts stored in the gift data 134, a processing function of allowing a viewer user to give the gift purchased using the object data of the gift included in the gift data 134 to the performer user (including the processing for stage effects to give the gift), and a processing function of changing the owner of the gift that has been given from the viewer user to the performer user.

The performer user management program 130 provides a management function and an authentication function for information relating to the performer user, based on the performer user data 131 shown in FIG. 8, which is stored in the storage 103 together with the performer user management program 130.

FIG. 8 shows an example of the performer user data 131 used in this embodiment. The performer user data 131 stores various information, such as the account (e-mail address), name, and authentication information of the performer user, the file name of the avatar data of the avatar used in the virtual space, and the file name of the item list in which the items owned by the performer user are registered, and these pieces of information are in association with the performer user ID that is uniquely assigned to a performer user. Although not shown in FIG. 8, the performer user data 131 may also store information on the virtual value such as points owned by each performer user.

Checking of the performer user ID, account, and authentication information allows the authentication of each performer user, and checking of the item list allows specification of the items (gifts), which the performer user have received from viewers to own.

The viewer user management program 132 provides a management function and an authentication function for information relating to a viewer user, based on the viewer user data 133 shown in FIG. 9, which is stored in the storage 103 together with the viewer user management program 132.

FIG. 9 shows an example of the viewer user data 133 used in this embodiment. The viewer user data 133 stores various information, such as the account (e-mail address) and authentication information of a viewer user, the file name of the avatar data of the avatar used in the virtual space, point balance that is the points owned that can be used in the virtual space, the file name of the item list in which items (gifts) purchased using points are registered, and personal information such as name, date of birth, and telephone number. These pieces of information are in association with the viewer user ID that is uniquely assigned to a viewer user. Although not shown in FIG. 9, the nickname (comment name) displayed together with a comment is also registered in the viewer user data 133, and this nickname (comment name) is displayed together with the comment. The viewer user is allowed to increase their points by purchasing them from a specified management company, for example.

<Performer Terminal>

Figure 4:
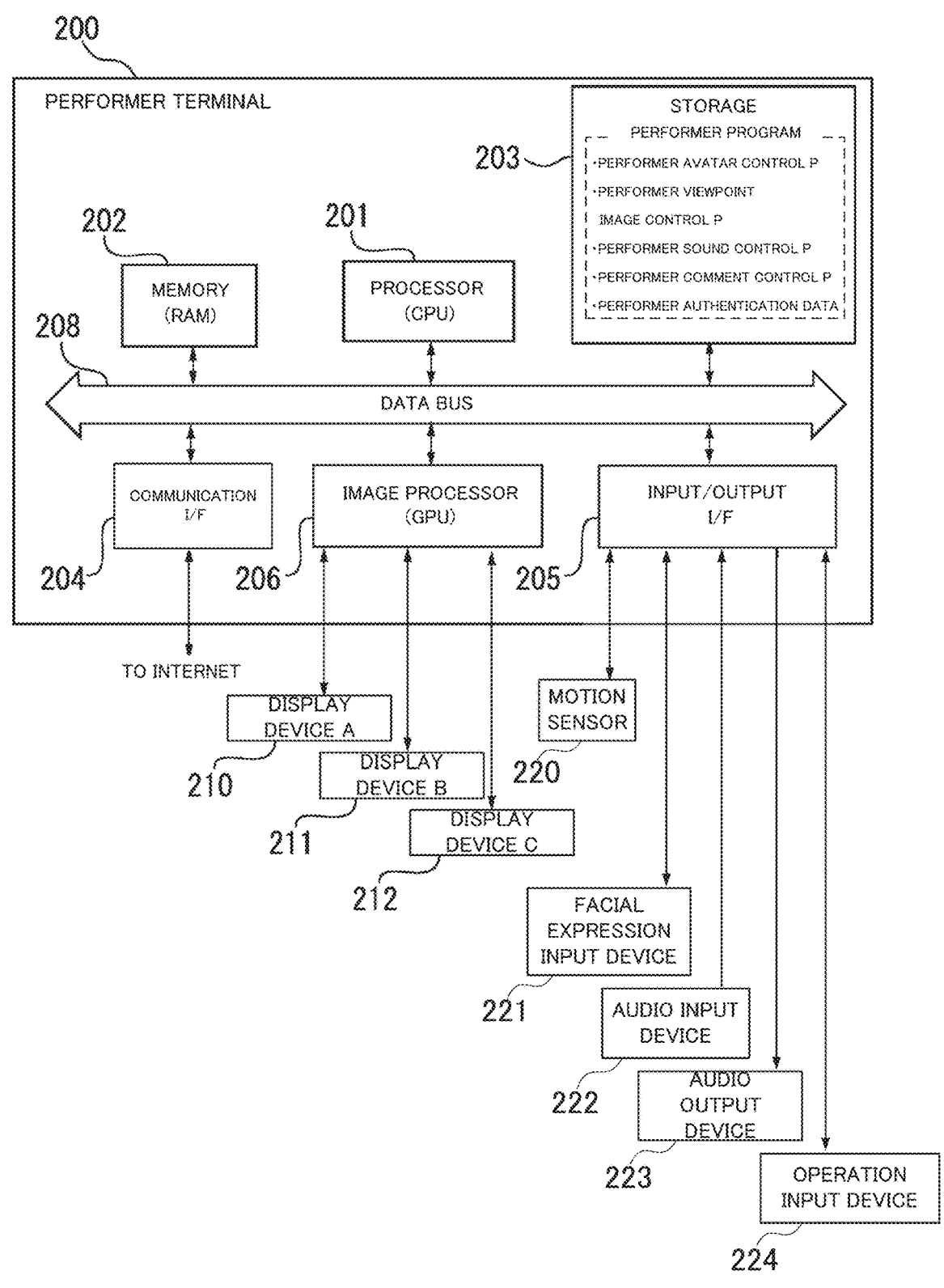
FIG. 4 shows an example configuration of a performer terminal in the virtual space content distribution system according to one embodiment of the present invention.
Figure 11:
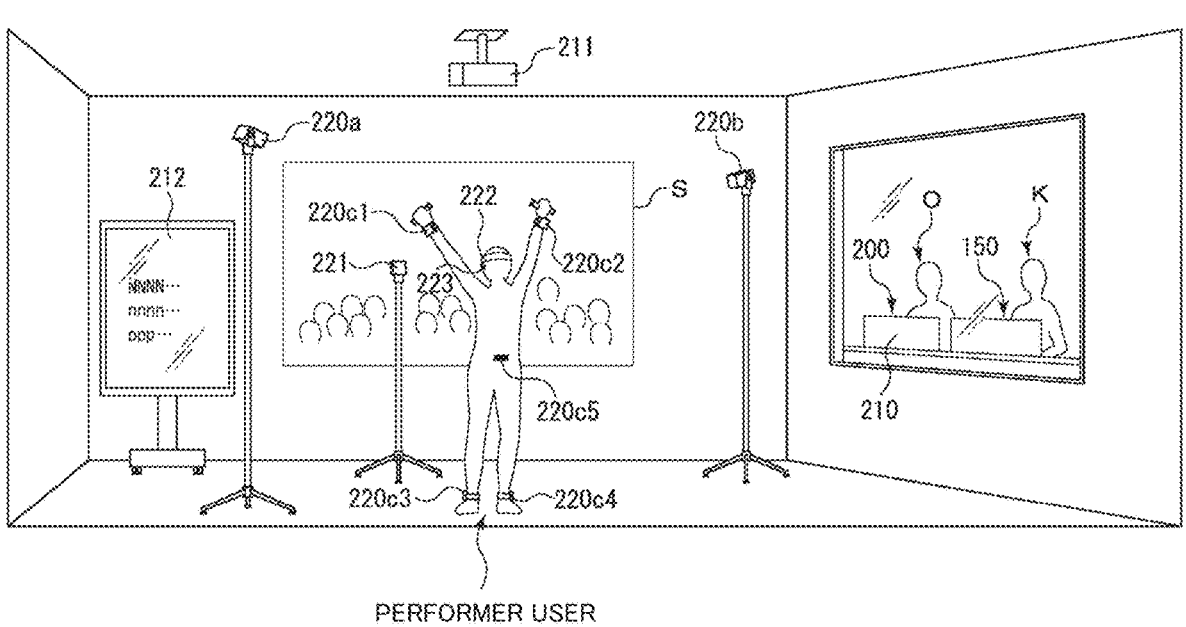
FIG. 11 is a schematic diagram showing the studio equipment used by a performer user in the virtual space content distribution system according to one embodiment of the present invention.

FIG. 4 shows an example configuration of the performer terminal 200 in the virtual space content distribution system in the present embodiment. As shown in FIG. 11, the performer terminal 200 in this embodiment is located in a control room adjacent to the studio where the performer user performs their acting motions, and includes a typical computer with relatively high processing power. As shown in FIG. 4, the performer terminal 200 includes a processor (CPU) 201, a memory (RAM) 202, a storage 203 such as a hard disk, a communication interface (I/F) 204 enabling bidirectional communications using the TCP/IP protocol via the internet, an open computer network, an image processor 206 including a graphics processing unit (GPU) to which display devices A210 to C212 are connected, and an input/output interface (I/F) 205 to which various input/output devices are connected, and these components are connected to a data bus 208.

The input/output interface (I/F) 205 is connected to input devices, and the input devices include: a motion sensor 220 including multiple wearable sensors 220C1 to 220C5 (see FIG. 11) worn by the performer user on the left and right limbs and waist; a facial expression input device 221 made up of an imaging camera to input the performer's facial expressions; an audio input device 222 made up of a sound-collecting microphone worn by the performer user on the head; and an operation input device 224 such as a keyboard or a touch panel that is operable by an assistant operator O who assists the performer user. These input devices may include a controller that can be grasped by the performer user to perform various operations so that the performer is able to perform various operations without the help of an assistant operator O.

In this embodiment, the performer user performs actions (music actions) with the music. This embodiment is therefore configured so that an assistant operator O assists with operations during the performance. It is also possible to have multiple assistant operators O, or to set the operation content in a sequence program, for example, in advance with the performer terminal 200, thereby eliminating the need for an assistant operator O.

The input/output interface (I/F) 205 is connected to an audio output device 223 that is an output device, and the audio output device 223 includes a sophisticated earphone (in-ear monitor) worn by the performer user and a speaker located in the control room. This outputs the sound of the played music transmitted from the distribution server computer 100 to the performer user via the sophisticated earphone (in-ear monitor), and also outputs the music sound along with the performer's sound from the speaker. This therefore allows the assistant operator O and others to check the status of the music, including the sound issued by the performer user, in the control room.

In this embodiment, the sophisticated earphone (in-ear monitor) is used to avoid the inconvenience caused by the played music sound being input from the sound collection microphone worn by the performer user. The present invention is not limited to this, and the music sound may be output from a speaker in the studio, for example, as long as the inconvenience caused by the input of the music sound can be avoided.

This embodiment describes an example of the sound collecting microphone that is worn by the performer user. This sound collecting microphone may be mounted to the floor, wall, or ceiling of the studio.

The following describes the motion sensor 220 used in the performer terminal 200 of this embodiment. Any type of motion sensor may be used for the motion sensor 220 as long as it enables appropriate detection (measurement) of the body movements (actions) of the performer user. This embodiment uses a plurality of wearable sensors 220C1 to 220C5, which are worn by the performer user on the body, to detect the actions of the performer more accurately and in a shorter cycle. The motion sensor 220 may be of a type that does not require the performer to wear any equipment. An example includes a LiDAR, which uses laser light.

This embodiment is configured to reduce the burden on the performer user when they act, particularly the head actions, caused by wearing sensors when they perform actions. To this end, this embodiment describes an example where the head actions of the performer user are detected by image recognition using an image captured by an imaging camera making up the facial expression input device 221, as described below, and the actions of the performer user other than the head are detected by the five wearing sensors 220C1 to 220C5. For instance, the performer user may wear a wearable sensor also on the head, for example. For the detection of more detailed actions, they may wear more (seven or more) wearable sensors.

As shown in FIG. 11, the wearable sensors 220C1 to 220C5 detect their own positions and directions in cooperation with base stations 220a and 220b installed in the studio room that is separated from the adjacent control room by a glass window.

In one example, these base station 220a and base station 220b may include a multi-axis laser emitter. The base station 220a emits a flashing light for synchronization and then scans a laser beam around a vertical axis, for example. The base station 220b scans a laser beam around a horizontal axis, for example.

Each of the wearable sensors 220C1 to 220C5 may include a plurality of optical sensors that detect the incidence of flashing light and laser beams from the base station 220a and the base station 220b.

Each of the wearable sensors 220C1 to 220C5 is capable of detecting its own position and direction based on the time difference between the incidence timing of the flashing light and the incidence timing of the laser beams, the light reception time at each optical sensor, the incidence angle of the laser beam detected by each optical sensor, and other information as necessary. For instance, the ViveTracker and a base station provided by HTC CORPORATION may be used.

These base station 220a and base station 220b emit flashing light and scan laser beams at regular intervals, meaning that the detection information by each wearable sensor 220C1 to 220C5 is updated at each such interval. Then, detection information indicating the position and direction of each motion sensor, which is calculated by each of these wearable sensors 220C1 to 220C5, is input to the performer terminal 200 via short-range wireless communication. The detection information is then transmitted, together with the facial motion information, to the distribution server computer 100 as performer avatar information (see FIG. 10).

Although this embodiment describes an example including two base stations, the base station 220a and base station 220b, the invention is not limited to this. It may include three or more of these base stations.

The motion sensor 220 may be configured such that each of the motion sensors worn by the performer user is equipped with a number of infrared LEDs or visible light LEDs, and the light from these LEDs is detected with an infrared camera installed on the floor or wall of the studio, thereby detecting the position and direction of each of the motion sensors.

To reduce the burden on the performer user, the motion sensor 220 may include a motion sensor with a lightweight reflective marker, instead of the wearable sensors 220C1 to 220C5. In other words, reflective markers attached to various parts of the performer user's body with adhesive tape or other means may be photographed to generate data, and this data may be image-processed to detect the position and direction of the reflective markers, thereby detecting the performer user's actions. In this case, a camera operator may be in the studio to photograph the performer user, and the camera operator may photograph the performer user from a direction suitable for detection, allowing the performer user's actions to be detected well.

The motion sensor 220 may be a suit with a built-in inertial sensor, such as a suit with a built-in inertial sensor for the MVN motion capture system marketed by Xsens-.com, and the sensor signal output from this inertial sensor may be analyzed to detect the actions of the performer user.

Figure 10:
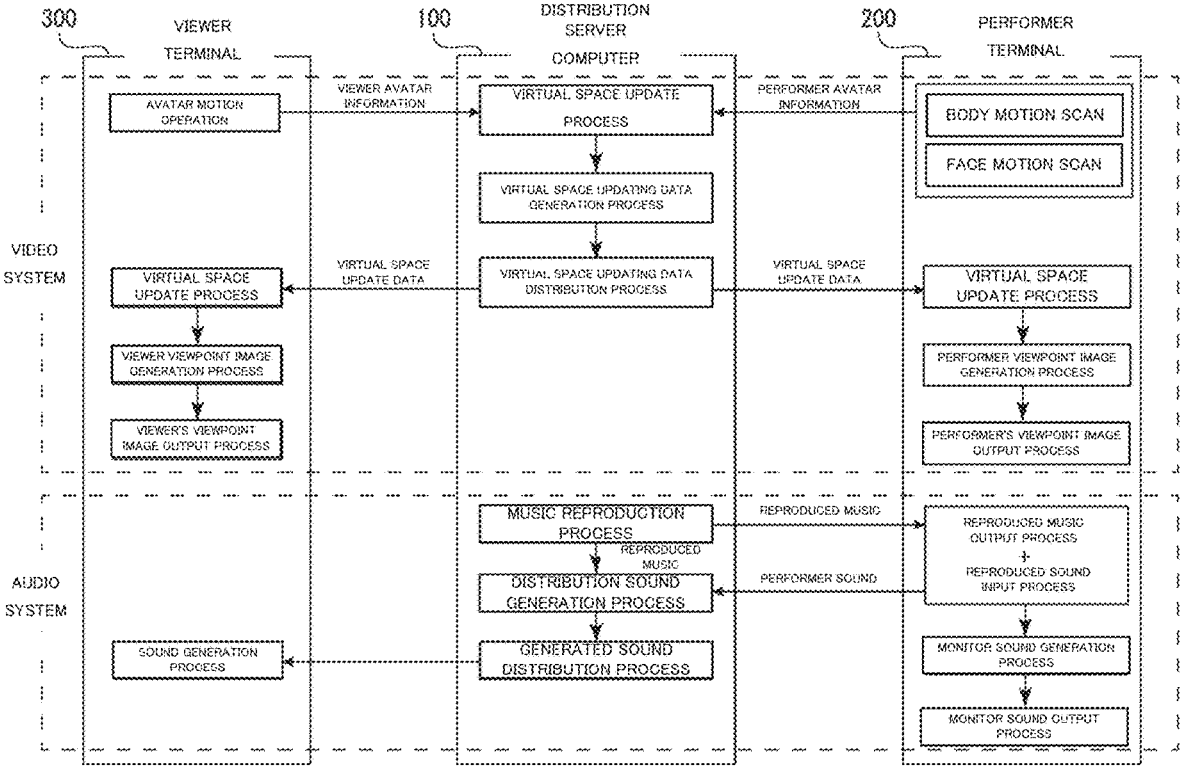
FIG. 10 explains data exchanged between the terminals and the server computer that make up the virtual space content distribution system according to one embodiment of the present invention.

Any type of device may be used for the facial expression input device 221 as long as it enables appropriate detection of the head (including the face) motions of the performer user. Specifically, the facial expression input device 221 in this embodiment includes an imaging camera (digital camera) positioned so that it can continuously capture images of the head including the face of the performer user. The images of the head movements and facial movements (expressions) of the performer user captured by this imaging camera are detected by image recognition, and the face motion information, which is the detected head movements and facial movements (expressions), is transmitted to the distribution server computer 100 as the performer avatar information together with the body motion information as shown in FIG. 10.

The facial expression input device 221 is not limited to the imaging camera (digital camera) used in this embodiment. For instance, the facial expression input device 221 may be a 3D camera capable of detecting the depth of a person's face, or a mobile terminal such as a smartphone equipped with a LiDER device may be used, for example. In this case, the performer user may wear such a mobile terminal.

As described above, the performer terminal 200 of this embodiment has three display devices A210 to C212. The display device A210 is an LCD monitor, for example, installed in the control room as shown in FIG. 11. The display device B211 is a projector that projects images onto a screen S installed in the studio. The display device C212 is a large vertical display installed adjacent to the screen S in the studio.

The display device A210, which is placed in the control room of the studio, displays images from each viewpoint of the virtual cameras C1 to C4, viewpoint images from an aerial moving virtual camera during the flying performance period described below, the content of comments, and a message input window, into which the assistant operator O inputs any message they wish to convey to the performer user.

Figure 16:
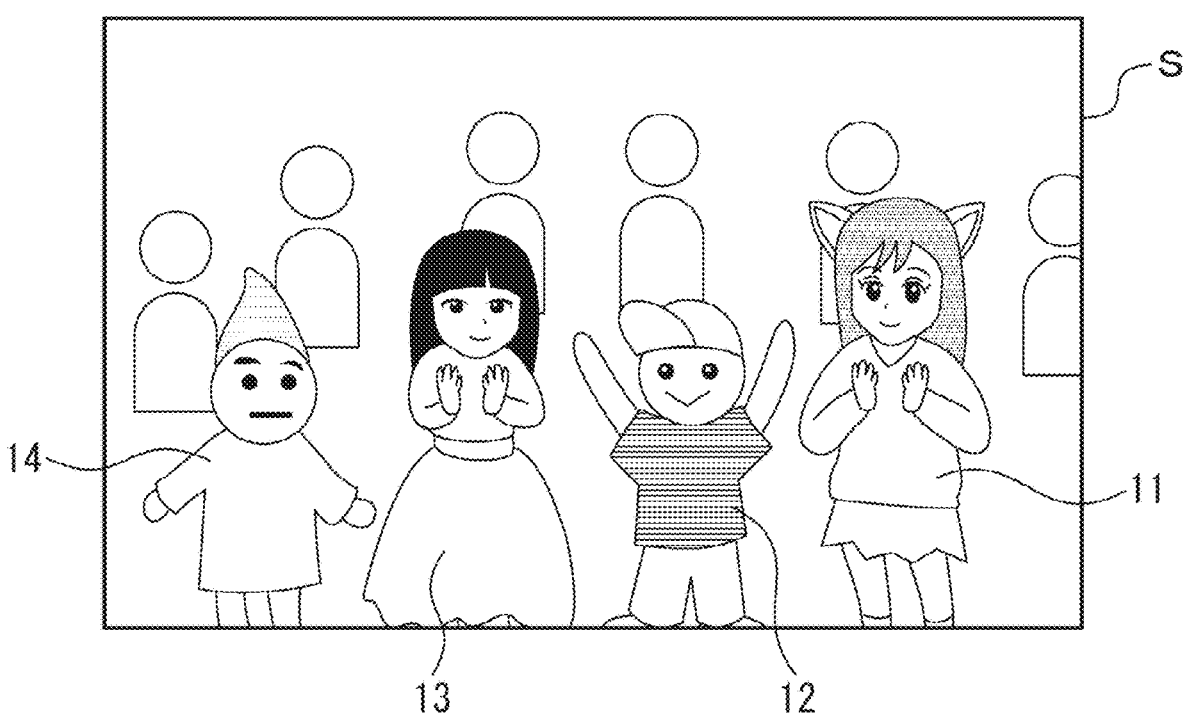
FIG. 16 shows an example display on a performer terminal that makes up the virtual space content distribution system according to one embodiment of the present invention.

On the screen S, an image is projected from the projector that is the display device B211 installed in the studio. The screen S displays an image from the viewpoint of the virtual camera C2 (see FIG. 13) that is the performer's viewpoint. For instance, the screen S displays an image, as shown in FIG. 16, including avatars of viewers who are virtually participating in the live performance in the third and fourth areas. This allows the performer user to check the status of the viewer users who are virtually participating in the virtual space live performance through the image.

The display unit C212 placed in the studio displays the comments of the viewer users and the comments and messages entered by the assistant operator O. This allows the performer user to check the comments of the viewer users and messages from the assistant operator O also during the performance.

The storage 203 stores a performer program, in addition to the operation system (OS) that makes the computer that is the performer terminal 200 work. The performer program is executed by the processor (CPU) 201 and other components to provide various functions in corporation with the distribution server computer 100. The functions include a function of allowing the performer user to control the movement of the performer avatar 1 in the virtual space live performance, which is the virtual space content.

As shown in FIG. 4, the performer program includes a performer avatar control program, a performer viewpoint image control program, a performer sound control program, a performer comment control program, and performer authentication data.

The performer avatar control program mainly provides the function of scanning the body motion of the performer user using the motion sensor 220 and scanning the facial motion (facial expressions) of the performer user using the facial expression input device 221, thus generating performer avatar information to make the performer avatar move, and the function of transmitting it to the distribution server computer 100.

The performer viewpoint image control program provides a function of generating and outputting an image from the viewpoint of the virtual camera C2, which is the performer's viewpoint, based on the virtual space update data distributed from the distribution server computer 100.

The performer sound control program provides a function of outputting the playback sound of music based on the playback music data distributed from the distribution server computer 100 via the audio output device 223, converting the sound input from the audio input device 222 into data and transmitting it to the distribution server computer 100 as performer audio data, and generating and outputting monitor audio made up of the playback sound of the music and the performer's sound.

The performer comment control program provides a function of displaying each comment by a viewer user, the comment being distributed from the distribution server computer 100.

The performer authentication data is to authenticate the identity of the performer user in a communication connection with the distribution server computer 100.

The performer avatar control program includes: a motion parameter generation program that is capable of generating parameter information on the position and rotation angle of the bones that make up the rig data (this may be called "skeleton data") indicating the skeleton of the performer avatar included in the performer avatar data; and an image recognition processing program that recognizes the position of the performer user's head and facial expressions from images captured by the imaging camera.

This embodiment describes an example of the performer terminal 200 that is a computer installed in the studio operated by an event management organization and used jointly by multiple performer users to hold a live event, where each performer user is allowed to use the performer terminal 200 by inputting data for performer authentication. The present invention is not limited to this. For instance, a performer user may appear in a virtual space live performance from their home, and the performer terminal 200 may be a personal computer installed in the performer user's home and used only by the performer user. In this case, storage of the data for performer authentication is not necessarily required.

In this way, a performer user and others use the performer terminal 200 that constitutes the virtual space content distribution system of this embodiment, whereby the performer user moves the performer avatar 1 placed on the virtual stage G at the event venue in conjunction with their movements, reflects their own facial expressions on the facial expressions of the performer avatar 1, and also distributes their own voice as the voice of the performer avatar 1 to viewers via the distribution server computer 100.

<Viewer Terminal>

Figure 5:
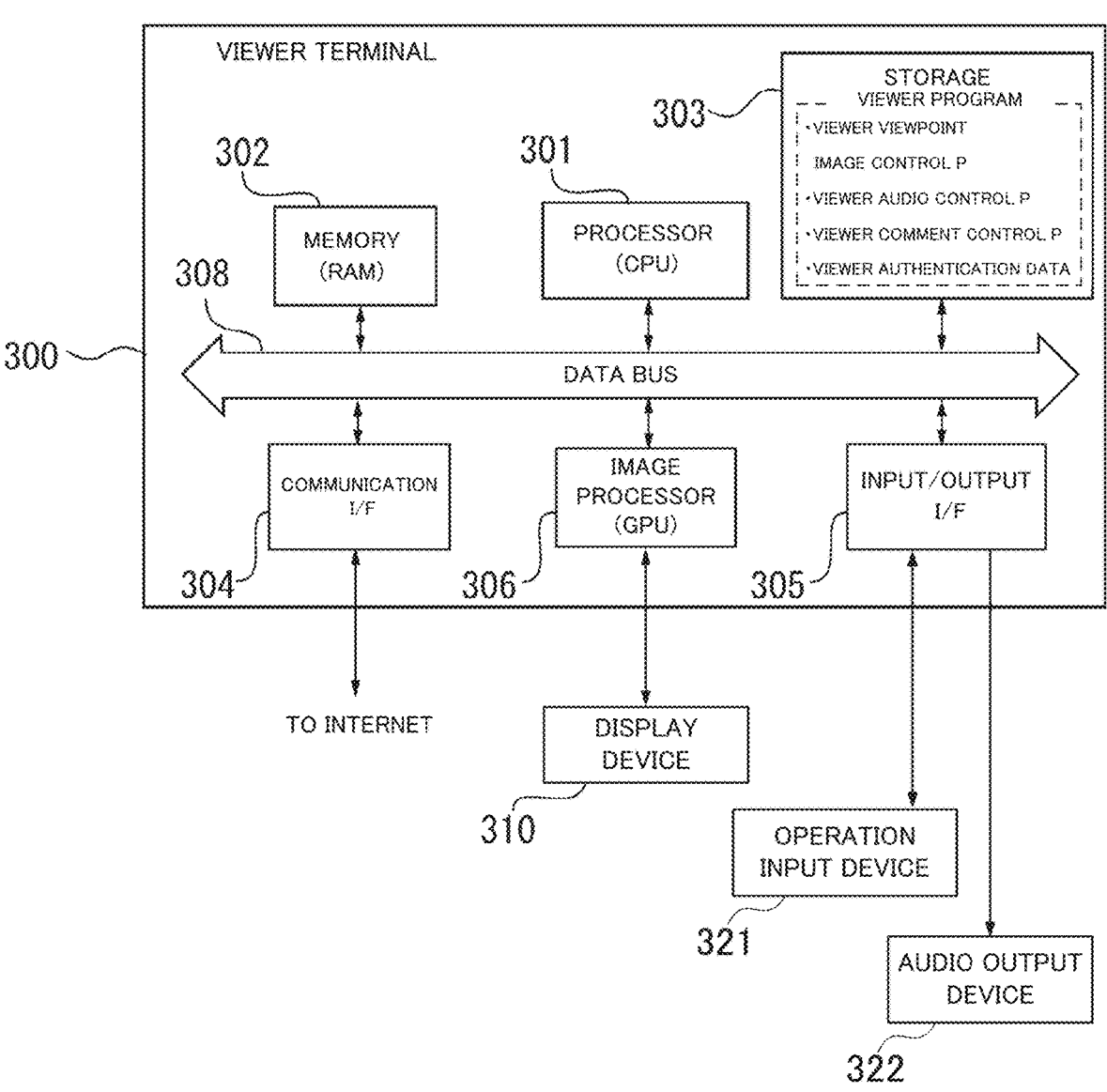
FIG. 5 shows an example configuration of a viewer terminal in the virtual space content distribution system according to one embodiment of the present invention.

FIG. 5 shows an example configuration of the viewer terminal 300 in the virtual space content distribution system in the present embodiment. The viewer terminal 300 in this embodiment is a smartphone P carried by a viewer user or a typical stationary computer (PC) installed in the viewer user's home or other locations. As shown in FIG. 5, the viewer terminal 300 includes a processor (CPU) 301, a memory (RAM) 302, a storage 303 such as a hard disk or a nonvolatile memory, a communication interface (I/F) 304 enabling bidirectional communications using the TCP/IP protocol via the internet, an open computer network, an image processor 306 including a graphics processing unit (GPU) to which a display device 310 is connected, and an input/output interface (I/F) 305 to which various input/output devices are connected, and these devices are connected to a data bus 308.

The display device 310 may be any device, which is capable of displaying the viewpoint images that are generated in accordance with the viewpoint image control program for viewer included in the viewer program stored in the storage 303, as described later, and are generated based on the virtual space data of the event venue, which is a virtual space updated by the virtual space update data (see FIG. 10) distributed from the distribution server computer 100, and displaying the flying viewpoint image distributed from the distribution server computer 100 during the flying performed period described later. When the viewer terminal 300 is a smartphone P, the display of the smartphone P corresponds to the display device 310. When the viewer terminal 300 is a typical computer (PC), the stationary display that makes up the computer (PC) corresponds to the display device 310. The display is not limited to those that display flat images (2D images), which may also be capable of displaying stereoscopic images (3D images) by displaying right-eye and left-eye images, as in a head-mounted display (HMD) that is wearable by the viewer, for example.

The input/output interface (I/F) 305 is connected to an input device that is an operation input device 321 made up of one or more devices that enable the viewer to perform various operations, and to an audio output device 322 such as an earphone, or speaker that is capable of outputting live audio, for example, distributed from the distribution server computer 100.

Needless to say, the audio output device 322 may not be a stand-alone device, but may be integrated with the display device 310 as in the head mounted display (HMD) described above.

The operation input device 321 may be any device that enables the viewer to perform various operations such as movement operations including moving the viewer avatar, zoom operations, operations related to comments, operations related to gifts, and other operations. For instance, it may include at least one of a transparent touch panel formed on the display surface of a smart phone, a keyboard constituting a computer, and a game controller.

In this embodiment, as shown in FIG. 13, for example, the virtual audience area for viewers at the event venue is sectioned into a third area near the virtual stage G in which only viewer users who are specially authorized by the performer user are allowed to virtually participate, and a fourth area around the third area in which ordinary viewer users virtually participate, as described later. As described above, a viewer user virtually participating in the fourth area may have an operation input device 321 such as a touch panel, keyboard, or game controller, and a viewer user virtually participating in the third area may have an operation input device 321 such as an MVN motion capture suit equipped with a built-in inertial sensor as described above, and thus the viewer user in the third area is able to precisely control their viewer avatar through their own movements, just like the performer user.

Note that the viewer users who are permitted to virtually participate in the third area are not allowed change the facial expressions of the viewer avatars, but the present invention is not limited to this. The facial expressions of these viewer avatars may be changed by the viewer users using the camera function of a smartphone or a camera connected to a computer to have the viewer user's facial expression recognized, so that the viewer users are allowed to change the facial expression, where a level of the change may be different from the level of change made by the performer user.

These various input/output devices connected to the input/output interface (I/F) 305 may be built-in or external, and in the case of external devices, they may be connected in either a wired or wireless manner.

The storage 303 stores programs for viewer in the form of viewer apps, in addition to the operation system (OS) that makes the smartphone or computer that is the viewer terminal 300 work. The programs for viewer are executed by the processor (CPU) 301 and other components to provide various functions in corporation with the distribution server computer 100, the functions including a live performance viewing function related to the viewer users in the virtual space live performance that is virtual space content.

As shown in FIG. 5, the programs for viewer include: a viewpoint image control program for viewer that provides a function of generating each viewpoint image of the virtual space live performance to be displayed on the display device 310; an audio control program for viewer that provides a function of outputting, from the audio output device 322, live sound based on the live sound (data) in the virtual space live performance distributed from the distribution server computer 100; a comment control program for viewer that displays comments based on comment data distributed from the distribution server computer 100 and provides a function related to comments, such as sending comments input by viewers to the distribution server computer 100; and viewer authentication data to authenticate the identity of a viewer user in a communication connection with the distribution server computer 100.

Figure 22:
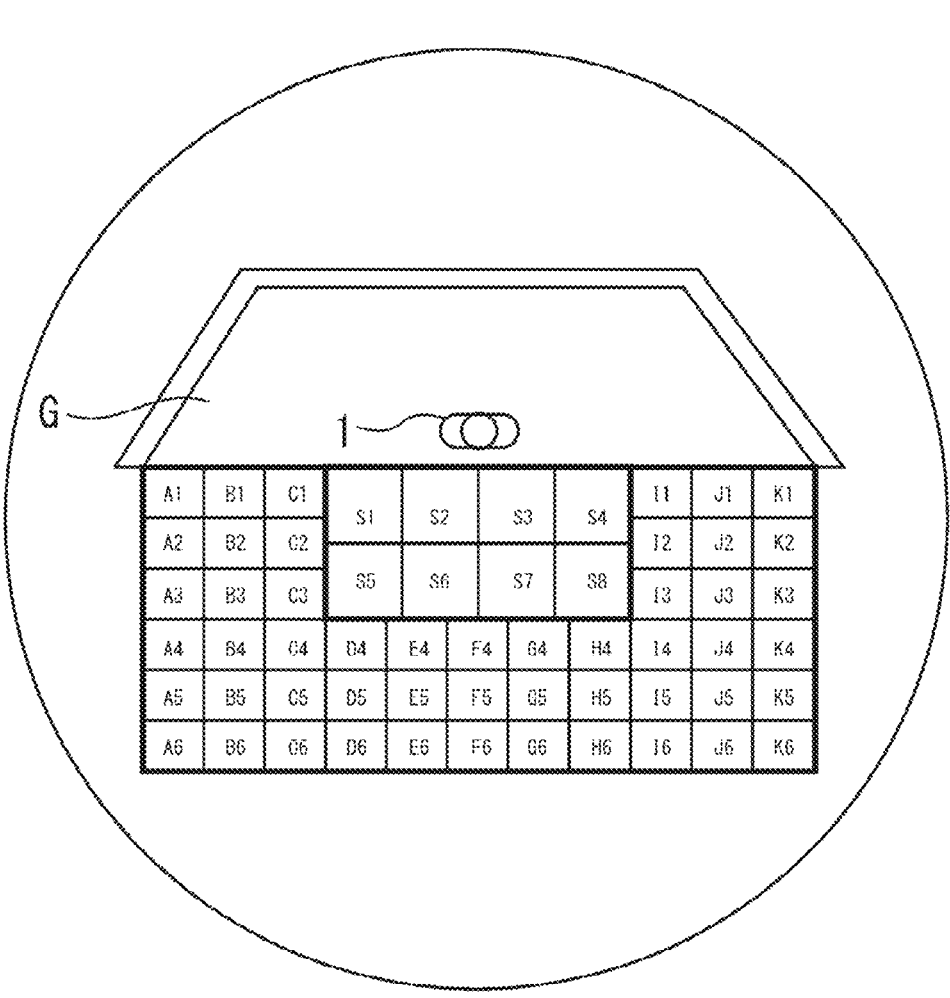
FIG. 22 shows a virtual live venue in a modified example.
Figure 23:
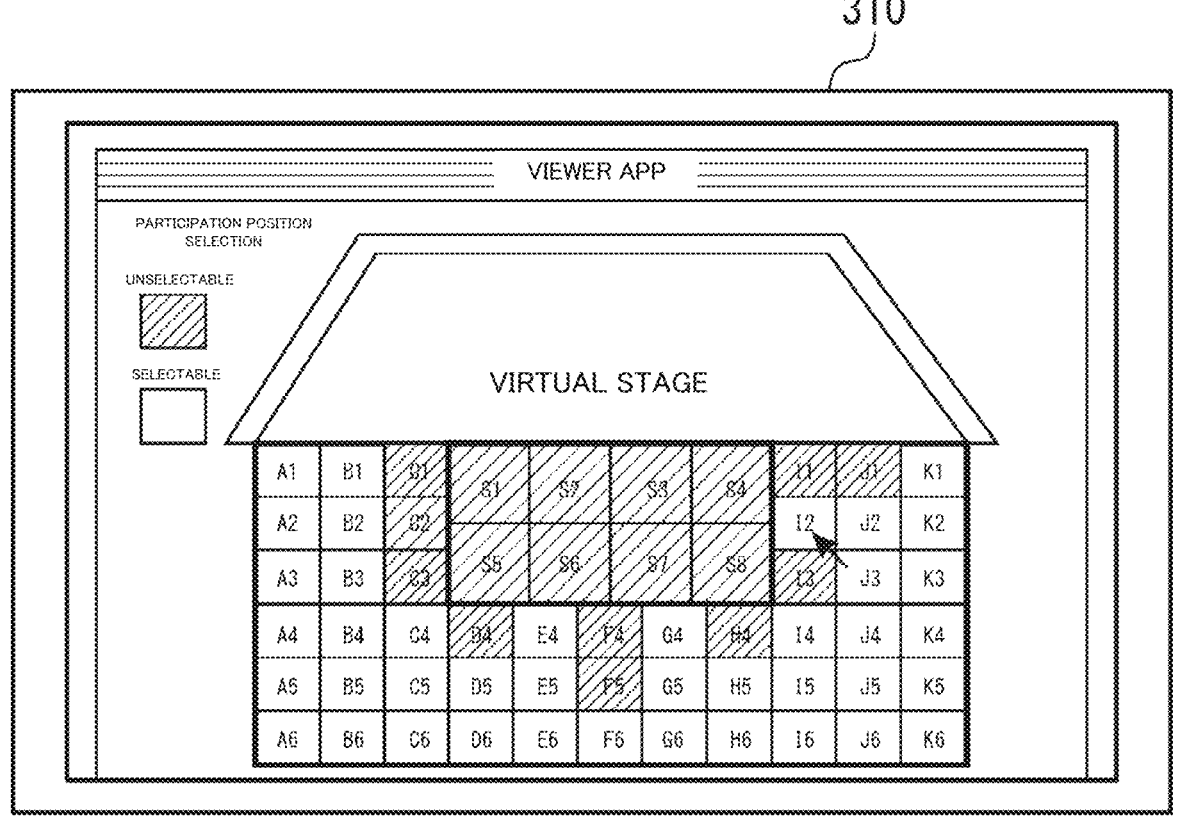
FIG. 23 shows a participation position selection screen for a virtual live venue in a modified example.

Although not shown in FIG. 5, the program for viewer may include other programs, in addition to the above programs, such as a gift control program that controls gifts and object placement in the virtual space, a program to purchase tickets for virtual participation by viewer avatars in the live event, and an area designation program that enables reservation of an area (position) for virtual participation by viewer avatars at the event venue before the start of the live event, as shown in FIG. 22 and FIG. 23. The program for viewer may include still other programs.

In this embodiment, the comments entered by the viewers are short messages in text format, but are not limited to these short messages in text format. For instance, the comments may be messages in a still image format, messages in a video format, or electronic messages in any other format. The comments are displayed on the display device 310 so as to be superimposed on each viewpoint image.

In this way, a viewer user uses the viewer terminal 300 that makes up the virtual space content distribution system of this embodiment. This moves and operates the viewer avatar that is virtually participating in the event venue, and changes the viewpoint of the viewer avatar, thus changing the viewpoint image displayed on the display device 310. This also changes the zoom state (viewpoint state), allowing the viewer user to operate the viewer avatar and cheer on the performer avatar 1.

It should be noted that a viewer avatar virtually participating in the third area is only allowed to move within the third area and not allowed to move to the fourth area. A viewer avatar virtually participating in the fourth area is only allowed to move within the fourth area and not allowed to move to the third area. The present invention is not limited to this, and it may be configured so that a viewer avatar virtually participating in the third area is allowed to move to the fourth area. Note that, naturally, the viewer avatar is not allowed to move onto the virtual stage G. Thus, the visibility of the performer avatar 1 is not obstructed by a viewer avatar moving onto the virtual stage G.

The viewpoint images are displayed on these display devices 310 and the live sound is output. This allows a viewer user to enjoy the virtual space live performance with the feeling as if they were actually present at the event venue.

Although detailed explanations are omitted, the comment function provided by the comment control program for viewer allows a viewer to enjoy the virtual space live performance while checking comments entered by themselves and other viewer users, and the gift function provided by the gift control program allows a viewer to liven up the virtual space live performance by giving items they own to the performer avatar 1.

<Administrator Terminal>

Figure 6:
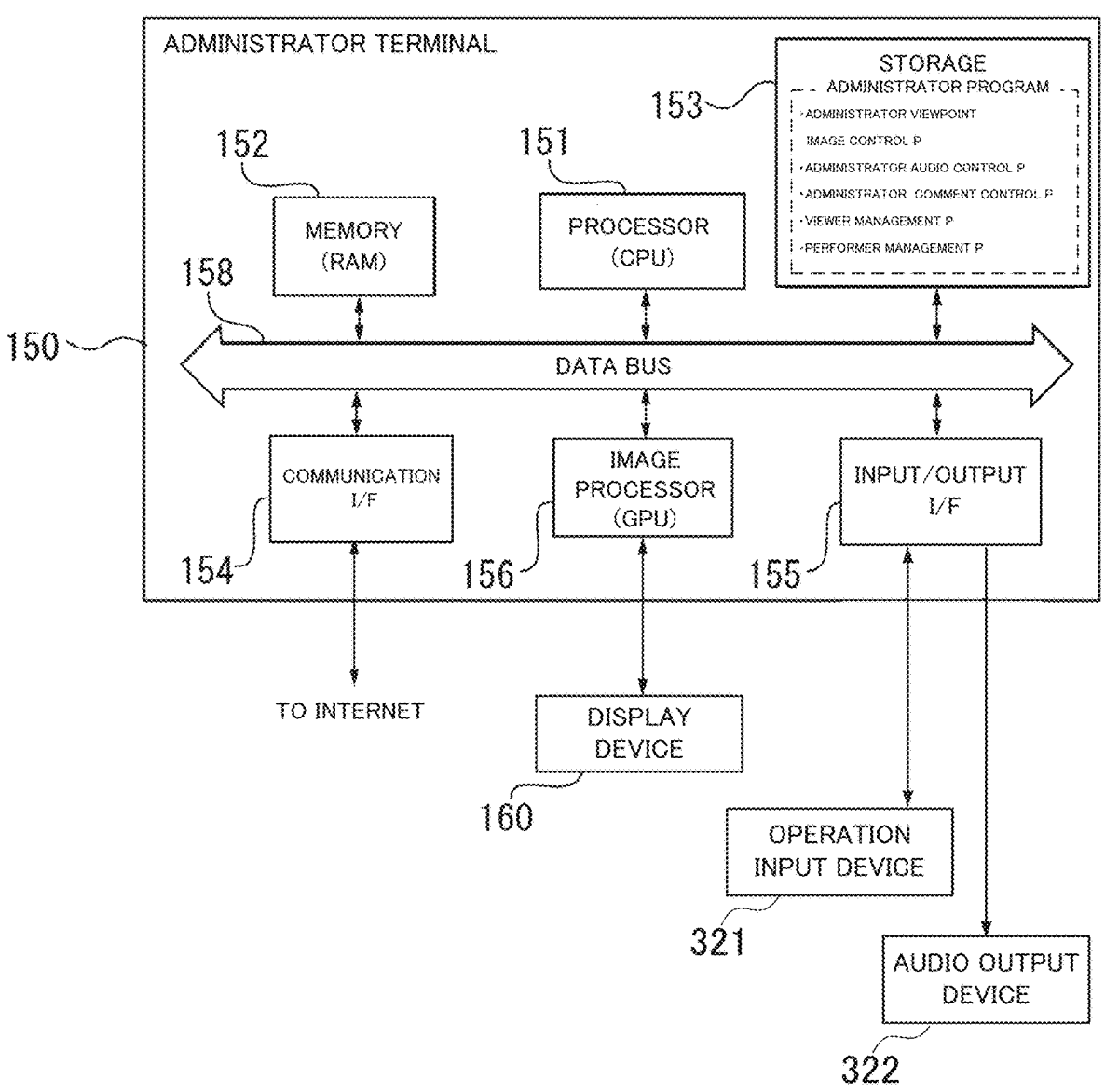
FIG. 6 shows an example configuration of an administrator terminal in the virtual space content distribution system according to one embodiment of the present invention.

FIG. 6 shows an example configuration of the administrator terminal 150 in the virtual space content distribution system in the present embodiment. The administrator terminal 150 in this embodiment uses, together with the performer terminal 200, a typical computer placed in the control room adjacent to the studio. As shown in FIG. 6, the administrator terminal 150 includes a processor (CPU) 151, a memory (RAM) 152, a storage 153 such as a hard disk, a communication interface (I/F) 154 enabling bidirectional communications using the TCP/IP protocol via the internet, an open computer network, an image processor 156 including a graphics processing unit (GPU) to which a display device 160 is connected, and an input/output interface (I/F) 155 to which various input/output devices are connected, and these devices are connected to a data bus 158.

The display device 150 may be any device, which is capable of individually displaying the viewpoint images of the virtual cameras C1 to C4 and the aerial moving virtual camera during the flying performance period described later. These viewpoint images are generated in accordance with the administrator viewpoint image control program included in the program for administrator stored in the storage 153, as described later, and are generated based on the virtual space data of the event venue, which is a virtual space updated by the virtual space update data (see FIG. 10) distributed from the distribution server computer 100. The display device 150 also is capable of displaying comments based on the comment data distributed from distribution server computer 100, and is configured with one or more stationary displays.

The input/output interface (I/F) 155 is connected to an input device that is an operation input device 161 made up of one or more devices that enable the administrator K to perform various operations, and to an audio output device 162 such as an earphone, headphone, or speaker that is capable of outputting live audio, for example, distributed from the distribution server computer 100.

The operation input device 161 may be any device that allows the administrator K to execute various operations such as inputting and settings related to the virtual space live event. For instance, it may include at least one of a keyboard making up a computer, a transparent touch panel formed on the surface of a display, and a viewpoint switching controller.

The various input/output devices connected to the input/output interface (I/F) 155 may be connected in either a wired or wireless manner.

The storage 153 stores programs for administrator, in addition to the operation system (OS) that makes the computer that is the administrator terminal 150 work. The programs for administrator are executed by the processor (CPU) 151 and other components to provide various functions in corporation with the distribution server computer 100, the functions including a distribution management function related to the distribution of a virtual space live performance that is virtual space content.

As shown in FIG. 6, the programs for administrator include a viewpoint image control program for administrator, an audio control program for administrator, a comment control program for administrator, a viewer management program, and a performer management program.

The viewpoint image control program for administrator provides a function of generating viewpoint images from each virtual camera to be displayed on the display unit 160, as well as a function of changing and switching the viewpoints.

The audio control program for administrator provides a function of outputting live audio from the audio output device 162 based on the audio data of the virtual space live performance distributed from the distribution server computer 100.

The comment control program for administrator displays comments based on comment data distributed from the distribution server computer 100 and provides a function related to comments, such as selecting comments and viewers, so as not to distribute the comments and viewers that are prohibited for distribution.

The viewer management program manages viewer users who participate virtually in a virtual space live performance, and the performer management program manages performer users who participate virtually in a virtual space live performance.

Although not shown in FIG. 6, the program for administrator may include an authentication program to authenticate personal identification of the operator, that is, the administrator, and a schedule program to edit the time schedule and the music order of the virtual space live performance. The program may also include other programs.

In this way, the administrator K operates the administrator terminal 150 that makes up the virtual space content distribution system of this embodiment, whereby they are allowed to configure various settings for executing the live event, such as settings related to the program, order of songs, and stage effects, as well as the time schedule and the trajectory of the aerial moving virtual camera during the flying performance period, so that the virtual space live performance is managed based on these settings.

<Overall Image of Virtual Space>

Figure 12:
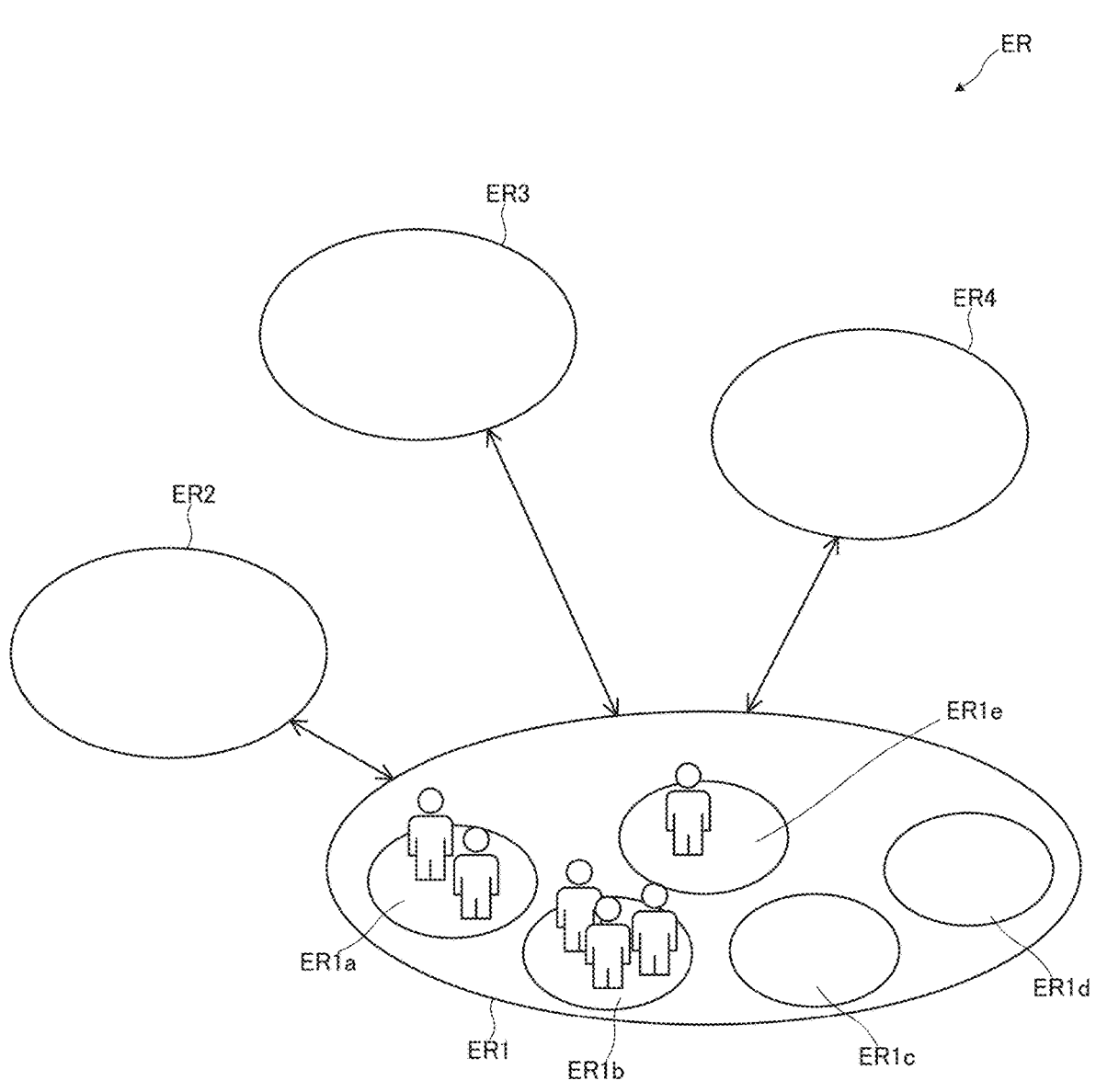
FIG. 12 shows an overall image of a virtual space according to one embodiment of the present invention.
Figures 24, 24A, 24B:
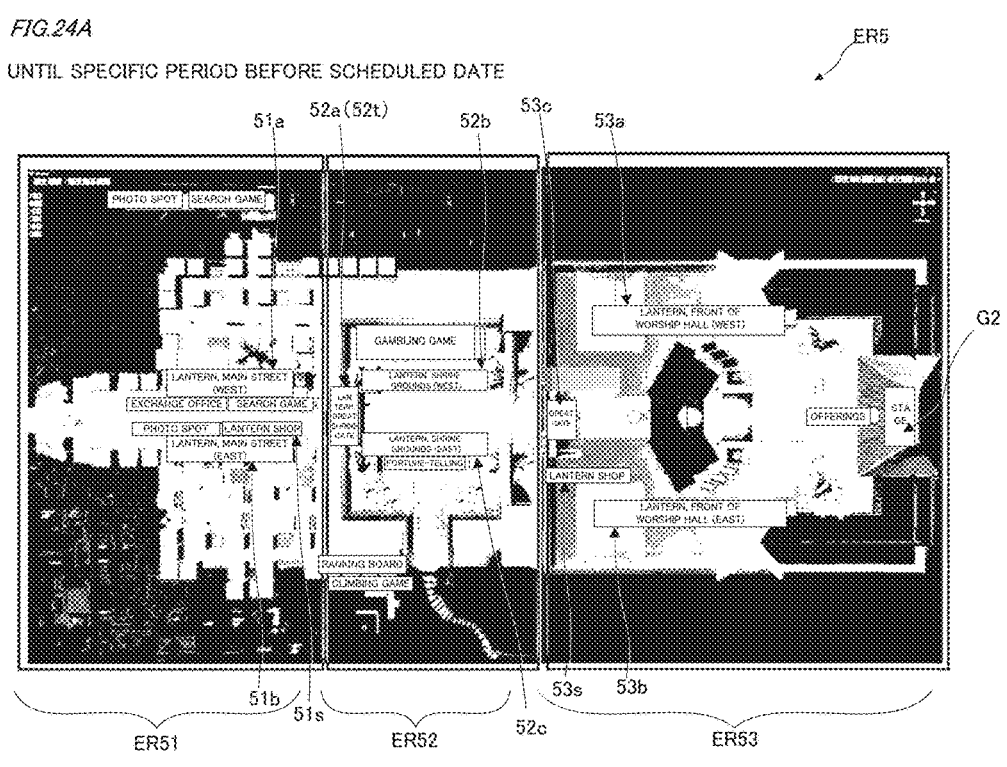
FIG. 24 shows an example of an overhead view of a predetermined type of virtual space according to one embodiment of the present invention.
Figure 25:
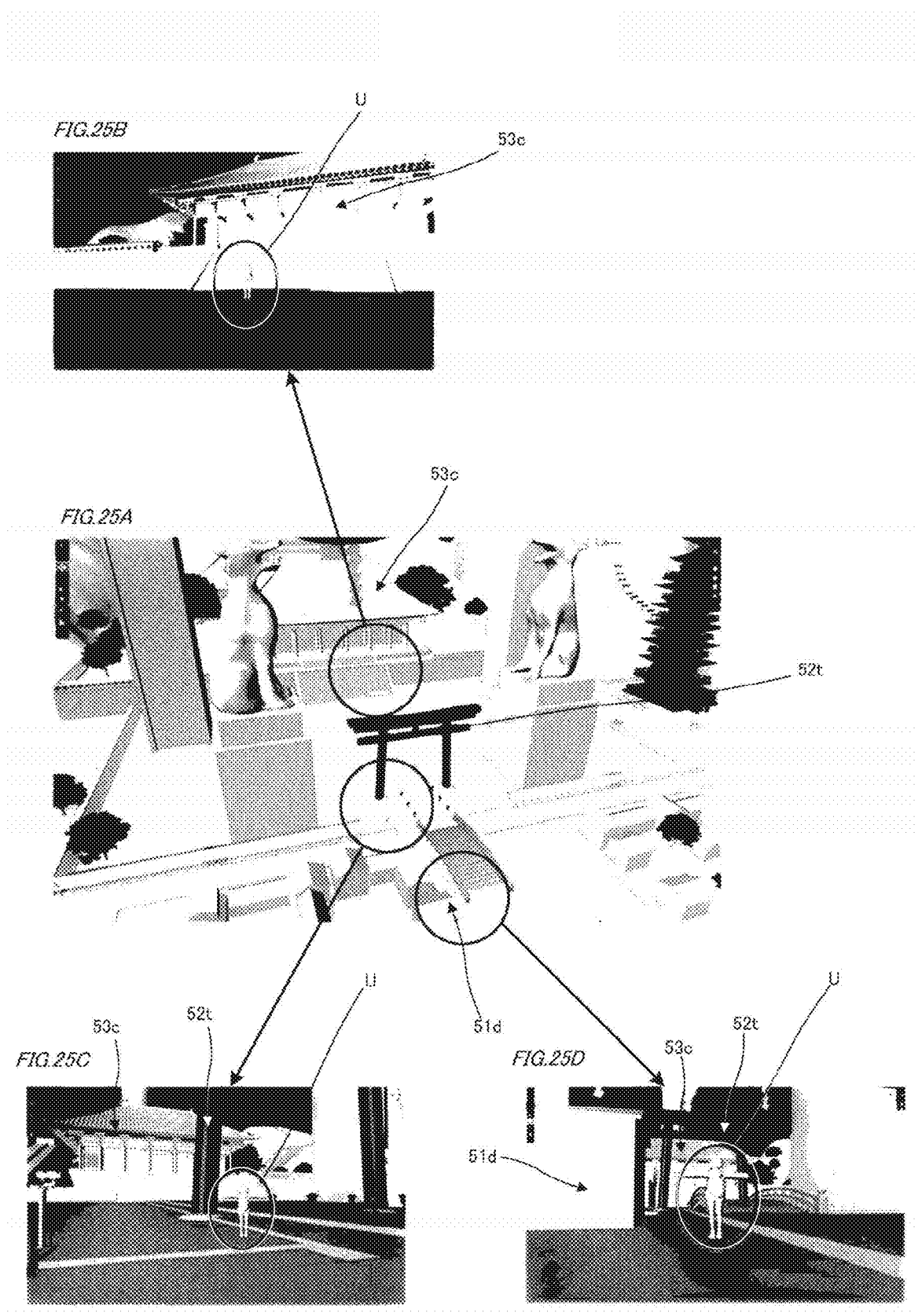
FIG. 25 shows an example display mode in a predetermined type of virtual space according to one embodiment of the present invention.

The following describes an example of content that is a live event held by a performer in a virtual live venue. FIG. 12 shows an overall image of the virtual space provided by the system of this embodiment. The virtual space ER in this embodiment includes a plurality of types of spatial areas ER (spatial area ER1, spatial area ER2, . . . ). In each spatial area ER, content of different genres and types may be provided. These different types of spatial areas ER include an entrance that functions as a lobby when a user logs into the virtual space ER, and areas corresponding to various types of content, such as live performance venues, game content, and exhibition halls. An event venue, which will be described later with reference to FIG. 13, FIG. 24, and FIG. 25, is constructed in the entirety of a predetermined spatial area ER, or in a part of the predetermined spatial area ER.

Once a user logs into the virtual space, they may be required to enter a spatial area ER first defined as an area (e.g., entrance) that provides special content, and only after that, they may move from one spatial area to another spatial area. Alternatively, they may be allowed to move back and forth between spatial areas ER without entering the defined spatial area. For instance, a user may not be allowed to move from spatial area ER2 to spatial area ER3 without passing through spatial area ER1, or they may be allowed to move directly between spatial area ER2 and spatial area ER3 without passing through spatial area ER1. When moving between spatial areas ER, a switching effect may be performed. For instance, when moving to another spatial area ER, the display screen may be switched to a darkened screen (e.g., displaying a black screen with a message such as "Loading . . . "). For user access to each spatial area ER, the user may be required to first enter the entrance area after logging in, or the user may be able to select and enter the spatial area ER of their choice without passing through the entrance area, or the user may transition to a spatial area ER that is randomly determined by lottery. For each room, the user may choose a room of their choice to enter, or they may enter a room randomly determined by lottery.

<Virtual Live Venue>

FIG. 13 shows a virtual live venue, which is the virtual space used in this embodiment. The virtual live venue shown in FIG. 13 is configured in a predetermined spatial area ER among the spatial areas ER shown in FIG. 12. As shown in FIG. 13, the virtual live venue is similar to a live venue in real space, and is a virtual space having a virtual stage G where a performer user appears as their performer avatar 1, and a virtual audience area where viewer users who are audience participate virtually as viewer avatars.

As shown in FIG. 13, the virtual stage G has a trapezoidal floor surface with a relatively large area, and the performer avatar 1 is movable on the virtual stage G in the same way as in a live venue in real space. As shown in FIG. 13, the virtual live venue has a virtual stage wall on the opposite side of the virtual stage G from the virtual audience seats, and the virtual stage wall is divided into three parts: the center, the right, and the left. These three parts of the virtual stage wall have the front surfaces, on which virtual displays 40, 41, and 42 are provided, and these virtual displays 40, 41, 42 virtually display images and videos for stage effects.

As shown in FIG. 13, virtual star objects 43 related to the performer user are placed between the virtual displays 40, 41, 42, and large aerial virtual star objects 50 to 52 are placed in a second area, which is an area on the virtual stage G above a first area surrounded by the virtual stage walls. The aerial virtual objects 50 to 52 are movable within the second area.

The venue has a virtual audience area in front of the virtual stage G, where viewer users are able to virtually participate in the virtual live venue as viewer avatars. As shown in FIG. 13, this virtual audience area is divided into a third area and a fourth area. The third area is a special area close to the center of the virtual stage G where the performer avatar 1 appears, and the fourth area is formed to surround the third area and is at a greater distance from the center of the virtual stage G than the third area.

In this third area, special viewer users within a predetermined upper limit in number are allowed to participate virtually. In this embodiment, as shown in FIG. 13, viewer avatars 11 to 14 are placed, corresponding to four viewer users who meet the predetermined virtual participation achievements and are allowed by the performer user to participate virtually.

In the fourth area, viewer avatars 21 to 32 are placed, corresponding to general viewer users who have reserved virtual participation prior to the start of the virtual space live. In FIG. 13, viewer avatars 21 to 32 are the same avatars as viewer avatars 11 to 14, although they are simplified for convenience.

Viewer avatar 11 to 14 placed in the third area are movable within the third area, in response to the operation by the viewer users with their viewer terminals. Viewer avatar 21 to 32 placed in the fourth area also are movable within the fourth area, in response to the operation by the viewer users with their viewer terminals.

As shown in FIG. 13, four virtual cameras C1 to C4 are virtually placed (set) in the virtual live venue. Virtual camera C1 is virtually positioned in front of the performer avatar 1 so as to face the performer avatar 1, and the viewpoint image captured by virtual camera C1 is a viewpoint image viewed from a position near the front of the performer avatar 1, as shown in FIG. 14A.

Virtual camera C2 is virtually positioned (set) above the head of the performer avatar 1, and the viewpoint image captured by virtual camera C2 is a performer viewpoint image of the virtual audience area viewed from the performer avatar 1, as shown in FIG. 16

Virtual camera C3 is virtually positioned on the virtual display 41 diagonally behind the performer avatar 1, and the viewpoint image captured by virtual camera C3 is a viewpoint image of the virtual audience area viewed from diagonally behind the performer avatar 1, as shown in FIG. 14C.

Virtual camera C4 is virtually positioned on the virtual display 42 diagonally behind the performer avatar 1, and the viewpoint image captured by virtual camera C4 is a viewpoint image of the virtual audience area viewed from diagonally behind the performer avatar 1, as shown in FIG. 14B.

In this embodiment, an aerial moving virtual camera (not shown) is virtually placed, in addition to these virtual cameras C1 to C4 that are fixedly placed (set). The aerial moving virtual camera is set to be movable in the air within the space of the virtual live venue, which is a virtual space. The aerial trajectory and the viewpoint directions (angles) at each position on the aerial trajectory of this aerial moving virtual camera are preset by the administrator terminal 150, and during the flying performance period described below, the performer avatar 1 virtually flies to follow the aerial trajectory of the aerial moving virtual camera, thereby generating a viewpoint image in which the virtually flying performer avatar 1 is captured by the aerial moving virtual camera.

As shown in FIG. 13, this embodiment shows an example of the four virtual cameras C1 to C4 that are virtually placed as fixedly placed (set) virtual cameras, and the present invention is not limited to this. The number of these fixedly placed virtual cameras may be five or more. Conversely, no fixedly placed virtual cameras are placed, and only the viewpoint images viewed from the viewpoints corresponding to the avatars virtually participating in the virtual live venue may be displayed on the performer terminal 200 and the viewer terminals 300.

This embodiment illustrates an example of one aerial moving virtual camera, and the present invention is not limited to this. In another embodiment, there may be a plurality of aerial moving virtual cameras, or conversely, no aerial moving virtual cameras are placed virtually.

<Studio>

FIG. 11 shows a studio used in this embodiment. As mentioned above, the studio is adjacent to a control room separated by a glass window. In the studio, a performer user performs various actions along with singing, while an assistant operator O assists with the operation of the performer terminal 200 installed in the control room. The base stations 220a and 220b are mounted on the stands around the performer user wearing the wearing sensors 220C1 to 220C5, and the imaging camera that makes up the facial expression input device 221 is mounted on the stand substantially in front of the performer user.

A screen S is provided on the wall facing the performer user in the studio, and the viewpoint image of virtual camera C2 is projected onto the screen S from the projector (display device B211) on the ceiling of the studio. Thus, as shown in FIG. 16, the viewpoint image from the performer avatar 1 viewing the virtual audience area is displayed on the screen S. With this configuration, the performer user is allowed to proceed with the live performance while constantly checking the status of the virtual avatars (viewer's reactions to the live performance) who virtually participate in the virtual audience area.

A large vertical display as the display device C212 is placed lateral of the screen S. This large display displays the viewer's comments and messages that the auxiliary operator O wants to convey to the performer user. The display device C212 may be configured to display information (performer support information) such as the lyrics of the music sung by the performer and the words to be delivered during the live performance.

<Operation of Virtual Space Content Distribution System>

FIG. 10 explains the operation of the virtual space content distribution system of this embodiment, and specifically explains the flow of distributing video and audio of a virtual live performance.

Firstly the following describes a video system. As described above, the distribution server computer 100 is capable of providing a virtual space of a virtual live venue based on the virtual space generation program 120 and avatar data of performer users and viewer users. The virtual space data describing the state of the virtual space is updated by the performer avatar information transmitted from the performer terminal 200 and the viewer avatar information transmitted from the viewer terminal 300, so that the movements of the performer user are reflected on the performer avatar 1, and the movements (operation) of the viewer user are reflected on the viewer avatar.

Although not shown in FIG. 10, in response to a connection for communication of the performer terminal 200 and the viewer terminal 300 with the distribution server computer 100 to let the performer and viewer virtually participate in the virtually space live performance, these terminals receive the virtual space data of the virtual live venue that is distributed from the distribution server computer 100 in advance, and store the data. The virtual space data stored in advance in this way is sequentially updated by the virtual space update data sequentially distributed from the distribution server computer 100, as described below. This allows the performer and the viewer to confirm the latest state of the virtual live venue with the performer terminal 200 and the viewer terminal 300.

Specifically, the movements and facial expressions of the performer user in the studio described above are scanned at predetermined time intervals by the body motion scanning and face motion scanning functions of the performer avatar control program as described above. This generates performer avatar information, which is then transmitted to the distribution server computer 100.

A viewer user who is allowed to participate in the third area uses a motion sensor, similar to the performer. Such a viewer user therefore is scanned at predetermined time intervals by the body motion scanning and face motion scanning functions. This generates viewer avatar information, which is then transmitted to the distribution server computer 100.

A viewer user who is allowed to virtually participate in the fourth area uses the touch panel, keyboard, or controller of the viewer terminal 300. When such a viewer user performs various operations such as moving, changing the viewpoint direction, changing the viewpoint situation (zoom), raising a hand, clapping hands, and jumping, this may cause the viewer avatar to perform the corresponding action. Then, viewer avatar information is generated based on an operation related to the movement of the viewer avatar among these operations, and is transmitted to the distribution server computer 100.

Based on the performer avatar information transmitted from the performer terminal 200 and the viewer avatar information transmitted from the viewer terminal 300, the distribution server computer 100 executes virtual space updating process to update the virtual space data, so as to reflect the motions of the performer terminal and the motions (operations) of the viewer user on their corresponding avatars participating virtually in the virtual live venue.

The distribution server computer 100 then executes virtual space updating data generation process to generate virtual space updating data based on the virtual space data before the update and the virtual space data after the update, and then distributes the generated virtual space updating data to the performer terminal 200 and the viewer terminal 300.

Receiving the virtual space updating data, the performer terminal 200 and viewer terminal 300 update the virtual space data stored beforehand based on the distributed virtual space updating data, as shown in FIG. 10. The performer terminal 200 and viewer terminal 300 also execute performer viewpoint image generation process and viewer viewpoint image generation process, respectively, using the updated virtual space data. This generates a performer's viewpoint image and viewer's viewpoint image based on the updated virtual space data, and the performer terminal 200 and viewer terminal 300 display the generated performer's viewpoint image and viewer's viewpoint image, respectively (viewer's viewpoint image output process).

In this way, this embodiment is configured so that a viewpoint image of each viewer user virtually participating in the virtual live venue using a viewer avatar is generated and displayed with the viewer terminal 300 of the viewer user. This avoids the situation where the distribution server computer 100 generates viewer's avatar viewpoint images of the viewer users and thus the processing load on the distribution server computer 100 becomes extremely large, which may prevent many viewer users from participating in the virtual space live performance, and also avoids the situation where the increased processing load makes it difficult to distribute the images.

In this embodiment, the viewer avatar 13 of a viewer user is virtually participating in the third area close to the performer avatar 1 on the virtual stage G, and the viewer user has the viewer terminal 300 with the display device 310. As shown in FIG. 14D, the display device 310 generates and displays a viewpoint image in which the performer avatar 1 is displayed large, and the viewpoint image is a substantially frontal view of the performer avatar 1 that is viewed from the viewer avatar 13 close to the performer avatar 1. The viewer avatar 28 of a viewer user is virtually participating in the fourth area away from the performer avatar 1 on the virtual stage G (e.g., behind the viewer avatar 13), and the viewer user has the viewer terminal 300 with the display device 310. As shown in FIG. 14E, the display device 310 generates and displays a viewpoint image in which the performer avatar 1 is relatively displayed small, and the viewpoint image is a substantially frontal view of the performer avatar 1 that is viewed from the viewer avatar 28 away from the performer avatar 1 with the viewer avatars 13 and 14 virtually participating in the third area in between.

The viewer avatar 32 of a viewer user is virtually participating near the edge position of the virtual stage G in the fourth area that has a U-shape viewed from the above, and the viewer user has the viewer terminal 300 with the display device 310. As shown in FIG. 14F, the display device 310 displays a viewpoint image in which the performer avatar 1 is relatively displayed small, and the viewpoint image is viewed from the viewer avatar 32 obliquely in front of the performer avatar 1 with the viewer avatar 14 virtually participating in the third area in between.

Note that all of the display examples in FIG. 14 show the case where the viewer terminal 300 is a stationary computer (PC) and the display device 310 is a stationary display. For instance, the viewer terminal 300 may be a smartphone P or a tablet. In this case, the viewpoint image of virtual camera C1 is displayed as shown in FIG. 15A. When the viewer terminal 300 is for the viewer avatar 13, the image is displayed as shown in FIG. 15B.

Next, the following describes the audio system. The distribution server computer 100 reproduces music data 113 by the audio control program 124 in accordance with the time schedule data (TS data) 112, and transmits the music data 113 as the reproduced music (data) to the performer terminal 200 (music reproduction process).

Receiving the reproduced music (data) from the distribution server computer 100, the performer terminal 200 outputs the data to the performer user via the sophisticated earphone (in-ear monitor) worn by the performer user (reproduced music output process). When the performer user sings along with the output reproduced music, the performer terminal 200 converts the performer sound input from the sound collection microphone (voice input device 222) into data, and transmits the performer's sound (the data) to the distribution server computer 100.

The distribution server computer 100 generates distribution sound (data) from the performer sound (data) received from the performer terminal 200 and the reproduced music reproduced in the music reproduction process described above (distribution sound generation process), and distributes the generated distribution sound (data) to the viewer terminal 300 (generated sound distribution process).

The viewer terminal 300 receives the distribution sound (data) distributed from the distribution server computer 100 and outputs it from the audio output device 322 such as an earphone or speaker. This allows the viewer to listen to the live sound as if the performer avatar 1 were singing in the virtual live venue.

The performer terminal 200 transmits the performer sound (data) to the distribution server computer 100 as described above, and also executes monitor sound generation process and monitor sound output process, as shown in FIG. 10. This allows the loudspeaker placed in the control room to output the music sound and the performer sound of the reproduced music, and thus allows the assistant operator O and others to check the status of singing by the performer user, for example, in the control room.

<Viewer's Viewpoint Image Control Process>

Figure 21:
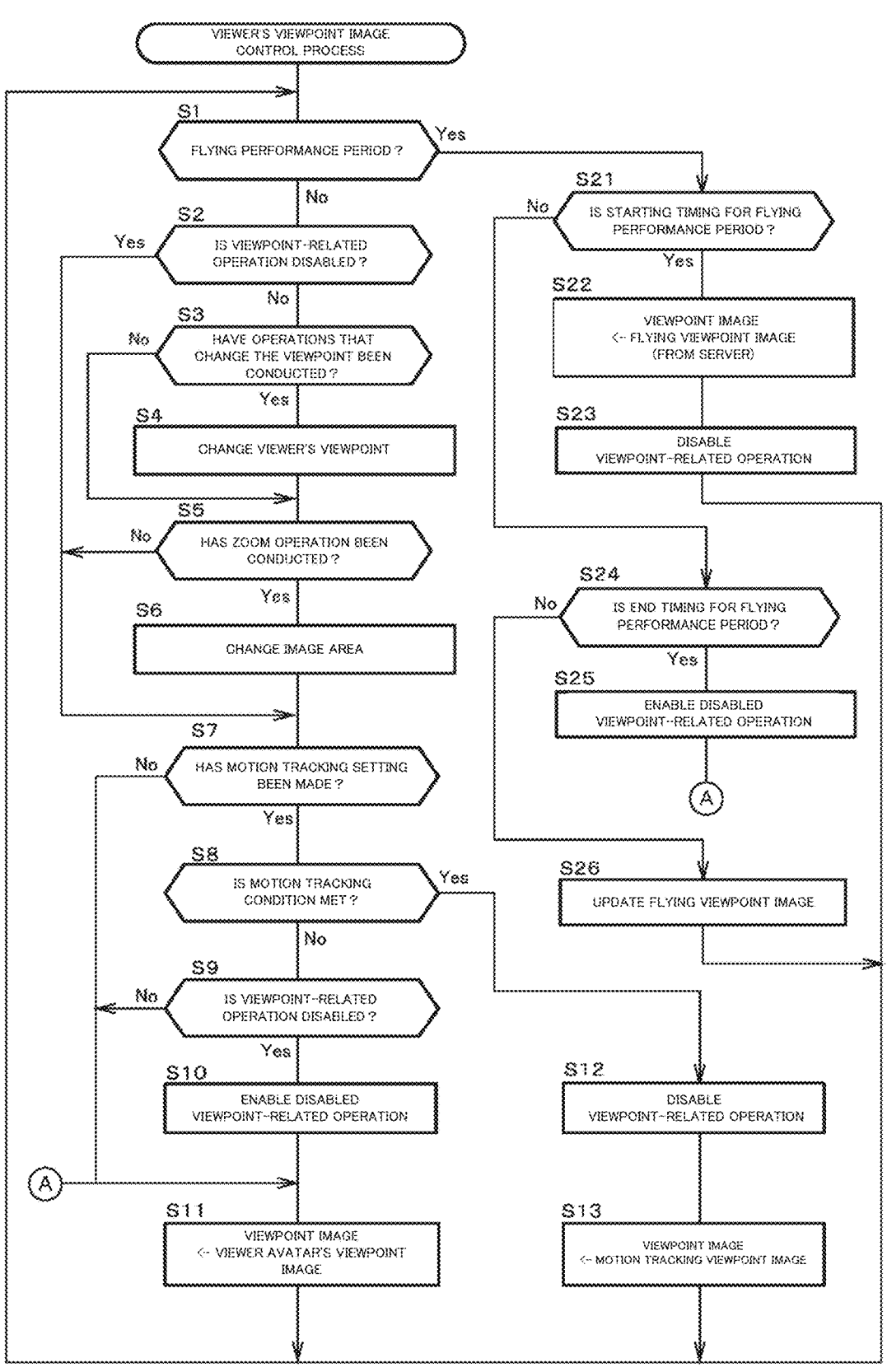
FIG. 21 is a flowchart showing an example of a viewer's viewpoint image control process executed by a viewer terminal that makes up the virtual space content distribution system according to one embodiment of the present invention.

Referring next to FIG. 21, the following describes viewer's viewpoint image control process that is executed with the viewer terminal 300 in accordance with the viewpoint image control program for viewer included in the program for viewer.

This viewer's viewpoint image control process starts with a determination whether or not the performer avatar 1 is in a flying performance period, in which the performer avatar 1 is virtually flying, as shown in FIG. 20 (step S1). Whether or not the flying performance period is in progress may be specified using the stage-effects status data from the distribution server computer 100, where the stage-effects status data indicates that the flying performance period is in progress. When it is the time for flying performance period in accordance with the time schedule data, the distribution server computer 100 transmits, to the viewer terminal 300, the stage-effects status data indicating that the flying performance period is in progress.

If the flying performance period is in progress (Y in step S1), the process proceeds to step S21. If the flying performance period is not in progress (N in step S1), the process determines whether viewpoint-related operations including viewpoint movement operations (including changing the viewpoint by avatar movement operations and motion operations) and zoom operations are disabled (step S2).

If the viewpoint-related operation is disabled (Y in step S2), the process proceeds to step S7. If the viewpoint-related operation is not disabled (N in step S2), the process determines whether operations that change the viewpoint, such as avatar movement or motion operations are conducted (step S3). If such an operation is conducted (Y in step S3), the viewer's viewpoint is changed according to the operation. If such an operation is not conducted (N in step S3), the process proceeds to step S5 to determine whether or not a zoom operation is conducted (step S5).

If a zoom operation is conducted (Y in step S5), the image area displayed on the display device 310 is changed to an image area according to the operation. If no zoom operation is conducted (N in step S5), the process determines whether or not a motion tracking setting has been made (step S7).

For this motion tracking setting, the viewer user is allowed to set as they like with the viewer terminal 300 before the start of a live performance or during a live performance, for example, depending on the type of device they use for operation and their level of proficiency in operation. Specifically, a user may not be accustomed to the operation with the operation input device 321 such as a touch panel, keyboard, or game controller, or may not be accustomed to the change of viewpoint by the avatar's movement operation or motion operation. In this case, this motion tracking setting may be made to deal with a failure of the viewer user in changing the viewpoint in response to the movement and motion of the performer avatar 1. For instance, if the virtual participation position of their viewer avatar is far from the performer avatar 1, and thus the performer avatar is expanded in display by zooming-in, an even small motion of the performer avatar 1 may cause improper displaying of the performer avatar 1.

If no motion tracking setting is made (N in step S7), the process proceeds to step S11. If the a motion tracking setting has been made (Y in step S7), the process further determines whether the motion tracking condition is met (step S8).

In this embodiment, the motion tracking condition is that the performer avatar 1 almost certainly fails to be displayed favorably on the display device 310. Specifically, if the head (or face) of the performer avatar 1 is within a predetermined range around the display area of the display device 310, it is highly likely that the movement or motion of the performer avatar 1 will cause the head (face) to move outside the display area, causing the head (face) to no longer be displayed favorably. It is therefore determined that the motion tracking condition is met in this case.

In this way, the present embodiment is configured to determine that the motion tracking condition is met before the head (face) of the performer avatar 1 disappears from the display area. This makes it possible to significantly reduce the disappearance of the head (face) of the performer avatar 1 from the display area. The present invention is not limited to this, and this motion tracking condition may be that the head (face) has moved outside the display area, or other conditions may be used as the motion tracking condition. In other words, any condition may be used as the movement tracking condition as long as it can prevent the performer avatar 1 from being no longer favorably displayed in the display area.

If the motion tracking condition is met (Y in step S8), the process disables viewpoint-related operations (step S12). After this step, the viewpoint is automatically changed to a motion tracking viewpoint, and a viewpoint image viewed from this motion-tracking viewpoint will be displayed on the display area of the display device 310 (step S13).

If the motion tracking condition is not met (N in step S8), the process further determines whether the viewpoint-related operations are disabled (step S9). If the viewpoint-related operations are disabled (Y in step S9), the process enables the disabled viewpoint-related operations (step S10) and then proceeds to step S11. If the viewpoint-related operations are not disabled (N in step S9), the process proceeds to step S11 without going through step S10.

In step 11, the motion tracking setting is not set or the motion tracking condition is not met. Then, the process continuously displays the viewpoint image of the viewer avatar in the display area of display device 310 (step S11).

As described above, if it is the time for the flying performance period, in which the performer avatar 1 is virtually flying in the live performance, the process determines Y at step S1 and proceeds to S21, where the process determines whether it is the start timing of the flying performance period (step S21).

If it is the start timing of the flying performance period (Y in step S21), the process displays a flying viewpoint image distributed from the distribution server computer 100 (step S22) in place of the viewer avatar's viewpoint image or motion-tracking viewpoint image that was displayed in the display area of the display device 310 before the start of the flying performance period, and then disables viewpoint-related operations (step S23). Then, the process returns to step S1.

In this embodiment, the same flying viewpoint image is displayed on the viewer terminals 300 of all viewer users during the flying production period. This flying viewpoint image is generated by the distribution server computer 100 and not by each viewer terminal 300 that generates a viewer avatar's viewpoint image that is different between the viewer users, and is distributed to the viewer terminals 300. Thus, the viewer terminals 300 with low processing power are able to favorably display the flying viewpoint image, which has a large rendering load for the viewpoint image because it involves the aerial movement of viewpoint. The present invention is not limited to this, and each viewer terminal 300 may generate this flying viewpoint image, similarly to the viewer avatar's viewpoint image.

If it is not the start time for the flying performance period (N in step S21), the process further determines whether it is the end timing of the flying performance period (step S24). Whether it is the end timing of the flying performance period may be specified based on data indicating the end included in the data of the flying viewpoint image transmitted from the distribution server computer 100, or it may be specified by the stage-effects status data mentioned above, which is different from the flying viewpoint image.

If it is not the end timing for the flying performance period (N in step S24), i.e., it is in the flying performance period, the process proceeds to step S26 to update the flying viewpoint image, and then returns to step S1. If it is the end timing of the flying performance period (Y in step S24), the process enables the viewpoint-related operations (step S25). Then, the process proceeds to step S11, where it displays the viewpoint image of the viewer avatar instead of the flying viewpoint image that was displayed on the display area of the display unit 310 during the flying production period. After this, the process returns to step S1.

In this way, the viewer terminal 300 of this embodiment executes the viewer's viewpoint image control process shown in FIG. 21 to display the viewpoint image on the viewer terminal 300. Referring now to FIG. 17 to FIG. 20, the following describes the viewpoint images.

Figure 17:
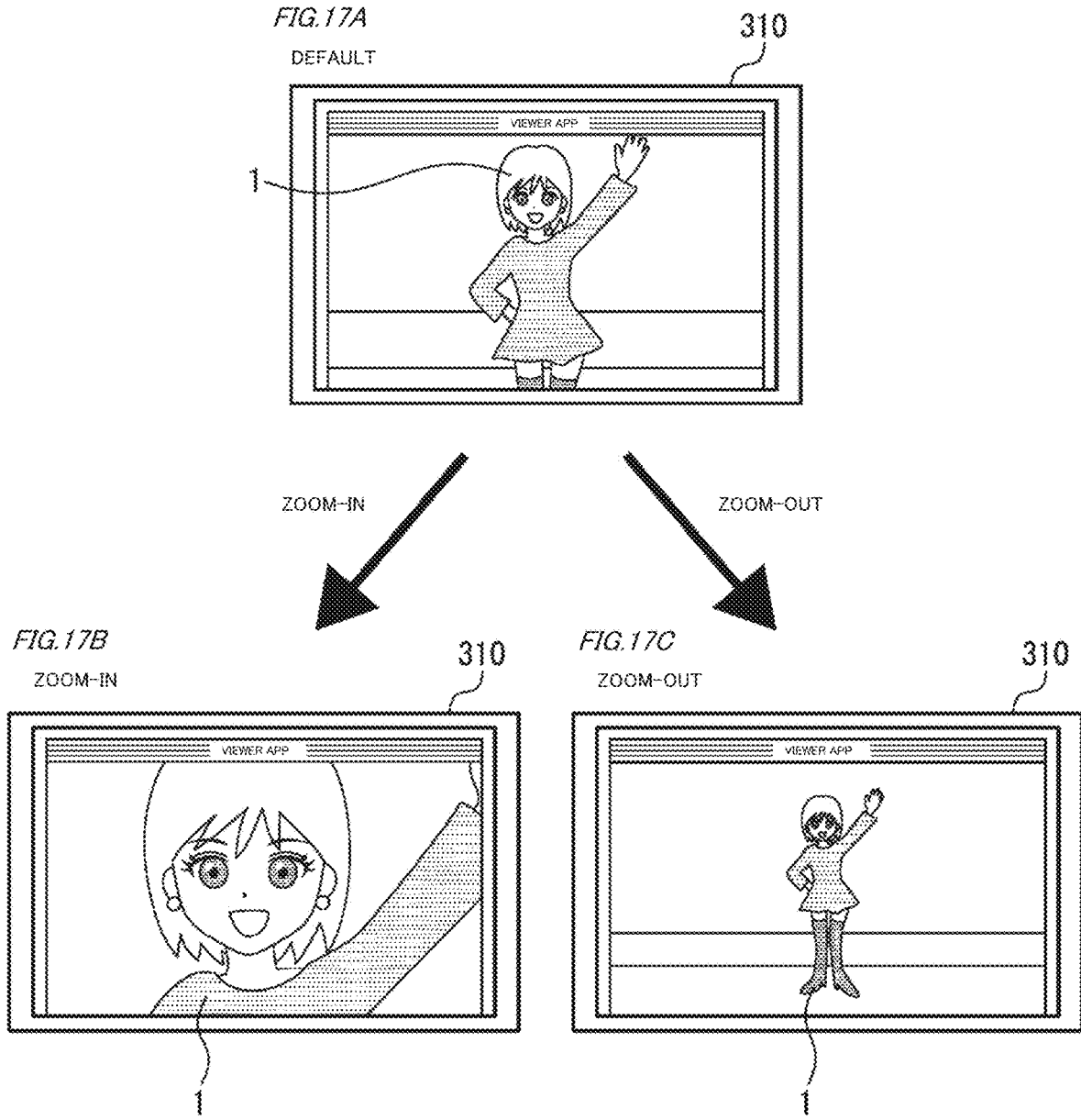
FIG. 17 shows an example display by zoom operation on a viewer terminal that makes up the virtual space content distribution system according to one embodiment of the present invention.

FIG. 17 shows the display content of the display device 310 when a zoom operation is performed with the viewer terminal 300 of this embodiment. In the default state where no zoom operation is performed, the viewpoint image of the image area centered on the upper body of the performer avatar 1 is displayed, as shown in FIG. 17A. In this default state, the viewer user performs a zoom-in operation of the viewer terminal 300: for a smartphone P, they touch the "+" on the display (not shown), and for a computer (PC), operate the "+" key on the keyboard. Then, the viewer terminal 300 displays a viewpoint image of the image area centered on the head (face) of the performer avatar 1, as shown in FIG. 17B, for example.

The viewer user performs a zoom-out operation of the viewer terminal 300: for a smartphone P, they touch the "−" on the display (not shown), and for a computer (PC), operate the "−" key on the keyboard. Then, the viewer terminal 300 displays a viewpoint image of the image area including the entire body of the performer avatar 1, as shown in FIG. 17C, for example.

Figure 18:
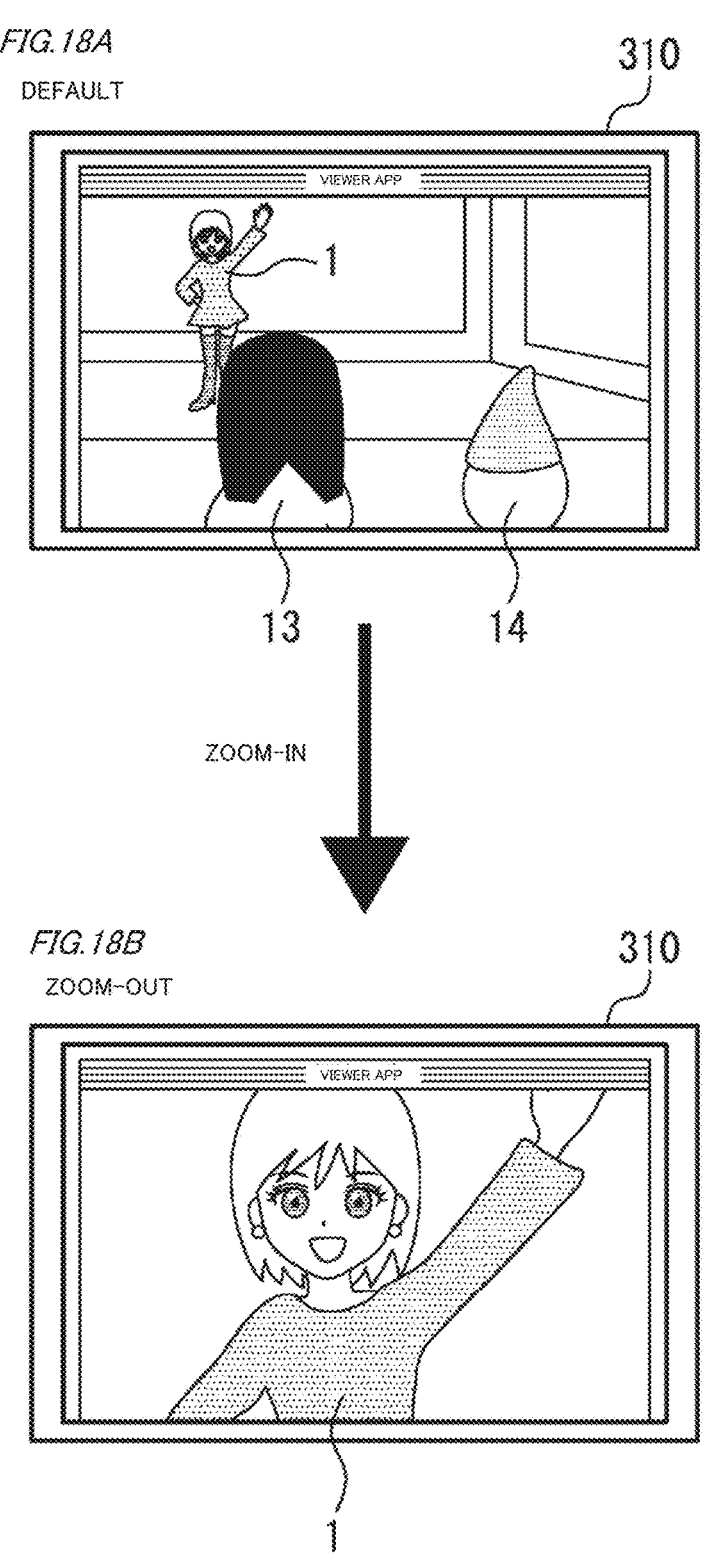
FIG. 18 shows an example display by zoom operation on a viewer terminal that makes up the virtual space content distribution system according to one embodiment of the present invention.
Figure 19:
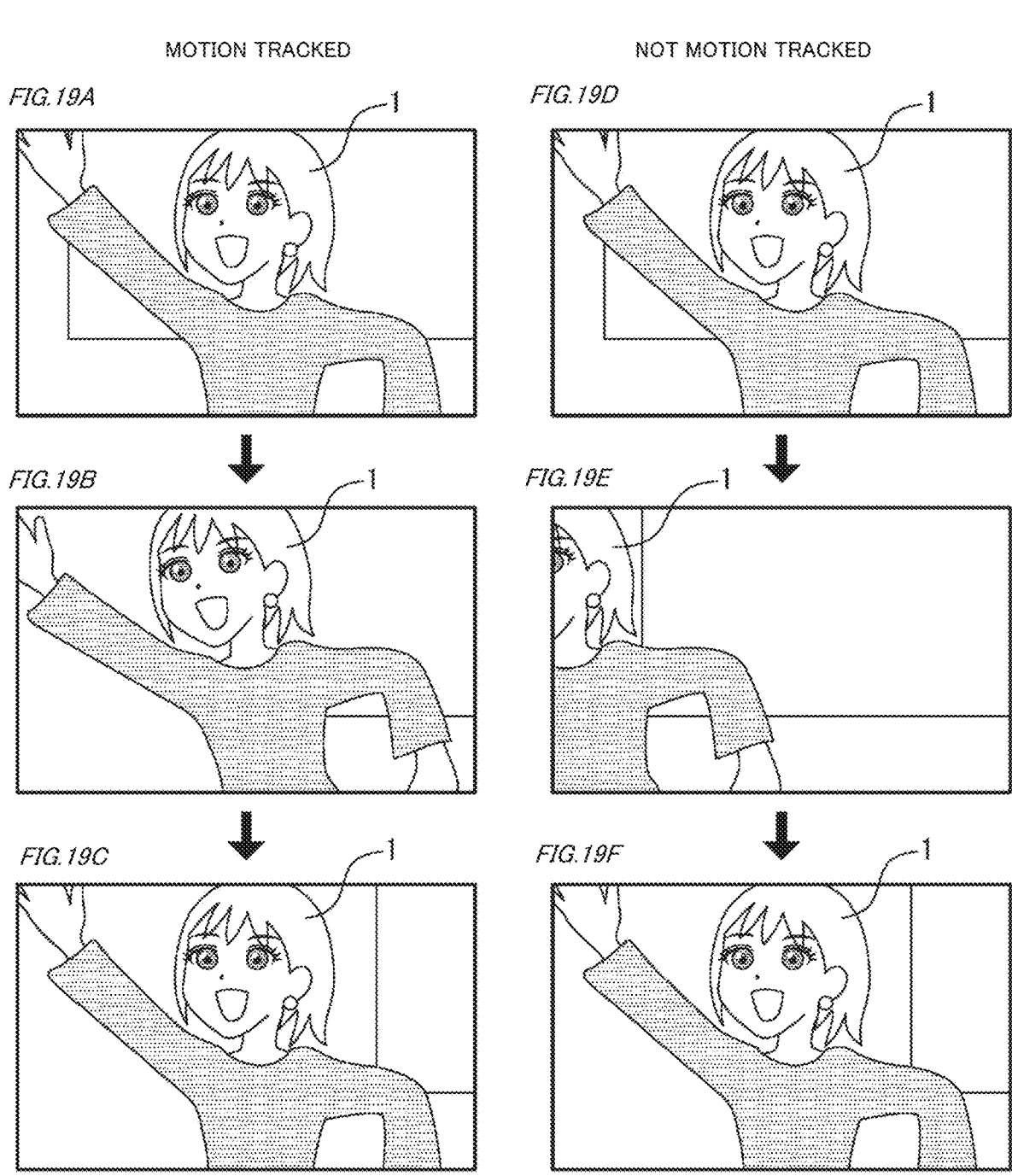
FIG. 19 shows an example display on a viewer terminal that makes up the virtual space content distribution system according to one embodiment of the present invention.

For easy understanding of the zoom function, FIG. 17 describes the function using the viewpoint image of virtual camera C1 instead of the viewpoint of the viewer avatar. As shown in FIG. 18, zooming in and out may be performed for the viewpoint of the viewer avatar as well.

Although not described in detail in the viewer's viewpoint image control process of FIG. 21, when a live performance starts and the performer avatar 1 appears on the virtual stage G for the first time, the viewpoint of the viewer avatar may not be directed toward the performer avatar 1. In this case, it is likely that the performer avatar 1 will not be displayed on the viewer terminal 300 for a long period of time. In this way, the period during which the performer avatar 1 first appears is designated as an appearance period, and during this period, the viewpoint image displayed on the viewer terminal 300 is automatically switched to the viewpoint image of virtual camera C1, for example, instead of the viewpoint image of the viewer avatar, and each viewer user may be allowed to perform zooming-in and other operations to the viewpoint image of virtual camera C1.

FIG. 18 shows an example of a viewpoint image of a viewer avatar; the viewpoint image of the viewer avatar 28 participating virtually in the fourth region. As shown in FIG. 18, the viewpoint image of viewer avatar 28 includes the heads of viewer avatar 13 and viewer avatar 14, who are participating virtually in the third region, and the image will be of the performer avatar 1 viewed with the heads of these viewer avatars 13 and 14 in between.

In this case, the viewer user of viewer avatar 28 may perform a zoom-in operation to change the image area so that the upper body of performer avatar 1 is displayed on the center, as shown in FIG. 18B, whereby they are allowed to enjoy the live performance without having the viewer avatar 13 and viewer avatar 14 displayed.

In the zoomed-in state shown in FIG. 18B, the live performance progresses and the performer avatar 1 may move or make large movements. In this case, if the viewer user is not able to successfully change the viewpoint of the viewer avatar 28 in accordance with the movements of the performer avatar 1, the performer avatar 1 may not be displayed well as shown in FIG. 19D to FIG. 19F. This makes it difficult for the viewer user to concentrate on the live performance because they have to pay attention to the viewpoint operation, and may prevent the viewer user from enjoying the live performance well.

This embodiment is configured so that, when the viewer user sets the motion tracking setting as described above and the head of the performer avatar 1 enters within a specified area surrounding the display area, the motion tracking condition is met. Then, the viewpoint is automatically changed to the motion tracking viewpoint, as shown in FIG. 19A to 19C, and the viewpoint image of the motion tracking viewpoint will be displayed. This means that the viewer user no longer needs to pay attention to operating the viewpoint, and is able to concentrate on the live performance and enjoy it favorably.

Then, as the live performance progresses and the flying performance period begins, as shown in FIG. 20, the viewpoint image of each viewer avatar is automatically changed to a flying viewpoint image viewed from the aerial moving virtual camera, without any operation by the viewer user.

Specifically, before the performer avatar 1 starts the virtual flight, an image of the performer avatar 1 is displayed in which a wing object becomes large on the performer avatar 1's back. Then, as the performer avatar 1 looks up at a virtual aerial star object 50 virtually placed in the second area of the virtual live venue, the viewpoint of the viewer avatar also moves in a similar manner. At this time, a light effect 61 appears around the performer avatar 1.

Thereafter, when the performer avatar 1 shifts to virtual flight, the viewpoint image displayed on the display device 310 automatically switches from the viewpoint image of the viewer avatar in FIG. 20B to a flying viewpoint image viewed from the aerial moving virtual camera as shown in FIG. 20C.

During the flying performance period, the aerial moving virtual camera moves in the air within the second area based on the predetermined aerial trajectory, as described above, and the flying viewpoint images viewed from this aerial moving virtual camera are displayed on the display device 310 as shown in FIG. 20D.

The specific configuration is not limited to the above-described embodiment, and the present invention includes modifications and additions that do not depart from the gist of the present invention.

For example, the above embodiment describes an example of the viewer avatar that is movable freely within the third or fourth area in which they are virtually participating. This may result in problems such as errors in the virtual space data due to different viewer avatars in the fourth area colliding virtually with each other or overlapping in the same virtual position.

To solve such problems, the embodiment may be modified as in an example of FIG. 22 and FIG. 23, for example. Specifically, the third and fourth areas are each sectioned into small areas as shown in FIG. 22, and which of these sectioned areas will be used to participate in the virtual live performance is accepted from the viewer user in advance, before the live performance begins, as shown in FIG. 23. When the viewer user participates virtually with the viewer avatar, the user is allowed to participate only in the pre-selected area and move only within the selected area, thereby preventing errors in the virtual space data due to virtual collisions between viewer avatars or overlapping at the same virtual position.

When each viewer user is allowed to select the virtual participation position of the viewer avatar in advance as described above, the viewpoint image of virtual flying that is a special action may be the viewpoint image corresponding to the position (area) selected by each viewer user, depending on the position selected by the viewer user: for example, for viewer users who select A1 to C6 areas on the right of the virtual stage G in the fourth area, the viewpoint image during the flying performance period will be generated and displayed from the front right of the flying performer avatar 1, for viewer users who select D4 to H6 areas on the center of the virtual stage G in the fourth area, the viewpoint image during the flying performance period will be generated and displayed from the front center of the flying performer avatar 1, and for viewer users who select I1 to K6 areas on the left of the virtual stage G in the fourth area, the viewpoint image during the flying performance period will be generated and displayed from the front left of the flying performer avatar 1.

The above embodiment describes an example of the viewer terminal 300 generating a viewpoint image from the viewer avatar, and the present invention is not limited to this. For instance, for a live event with the small number of virtual participants, the distribution server computer 100 may generate and distribute the viewpoint image from the viewer avatar. The viewer user may be allowed to select whether to generate the viewpoint image with their viewer terminal 300 or with the distribution server computer 100, depending on the processing capacity of the terminal owned by the user and the data communication environment. The distribution server computer 100 may determine the processing capacity of the viewer terminal 300 connected for communication, and based on the determined processing capacity, the distribution server computer 100 may determine whether to generate the viewpoint image with the viewer terminal 300 or with the distribution server computer 100.

The above embodiment describes an example of the distribution server computer 100 that is installed in a studio operated by an event management organization that hosts the virtual space live event, and the present invention is not limited to this. The distribution server computer 100 may be a server computer owned by a company that leases the server computer in a data center, or may be a server computer provided by a cloud service, as described above. The server computer may be installed in any form, as long as it has the functions of the distribution server computer 100.

The above embodiment describes an example of a single performer user singing and performing alone, and the present invention is not limited to this. The performer user may include a group of performer users, and when a group of performer users holds a virtual live event, they may share a single performer terminal 200, or each of the members of the group may have a performer terminal 200 provided. When the performer user includes a group of multiple members, at least one of the distribution server computer 100 and the viewer terminal 300 may execute a process of designating a viewpoint tracking target member, allowing the viewer user to select the member in the group whose viewpoint is to be tracked.

In the above embodiment, the singer who sings and the actor who performs actions may be separate persons. In this case, different performer terminals are prepared for the singer and the actor, and the singer may sing in a location other than the studio where the actor performs the actions.

The above embodiment describes an example where the internet network is used as an example of a computer communication network connecting the distribution server computer 100, the administrator terminal 150, the performer terminal 200, and the viewer terminal 300, and the present invention is not limited to this. This communication network may be configured with a local area network that enables data communications only within a specific area, or may include a local area network and local data communications as part of the network.

The above embodiment describes an example where the performer user sings or performs singing actions (performance actions) in real time during the distribution of the virtual space live performance, so that the performer user is allowed to proceed with the live performance while checking the reactions of the viewer users who are virtually participating in the virtual space live performance. The present invention is not limited to this. Singing and singing actions (performance actions) by the performer user do not have to be performed in real time, but rather the singing and singing actions (performance actions) may be performed in advance, and the singing sound and singing actions (performance actions) may be recorded as performer avatar information in the distribution server computer 100. Then, the recorded singing sound and singing actions (performance actions) may be reproduced as the live performance progresses, thereby holding a virtual space live performance.

Instead of singing and singing actions (performance) by the performer user, singing and singing actions (performance actions) by a virtual performer created by computer graphics, for example, may be recorded in the distribution server computer as performer avatar information, and the recorded singing sound and singing actions (performance actions) may be reproduced as the live show progresses, thus holding a virtual space live performance.

In this way, singing or singing action (performance action) may be performed in advance to record the performer avatar information in the distribution server computer 100, and this performer avatar information may be reproduced to distribute a virtual space live performance. In this case, the virtual space content distribution system at the time of distribution will be configured with the distribution server computer 100, administrator terminal 150, and viewer terminal 300, and will not include the performer terminal 200, which is a performer user terminal that a performer user can use to make the performer avatar 1 act in the virtual space.

The above embodiment describes an example of the viewer terminal 300 that is a smartphone P or a computer (PC), and the present invention is not limited to this. This computer may be a portable laptop PC, or various types of information processing devices capable of outputting at least 2D images and audio, including tablet terminals, e-book readers, wearable computers, and game consoles.

The above embodiment describes an example of the performer user performing actions including singing in a studio, and the present invention is not limited to this. For instance, the performer user may perform in a virtual space live event from their home using the performer terminal 200 installed at home.

The above embodiment describes a virtual space live performance that is virtual space content, and the present invention is not limited to this. Such virtual space content may be any content that is beneficial to viewer users, such as a fan meeting where performer users gather with their fans, or such a talk session, and that is related to a virtual space in which performer avatar 1 and viewer avatars virtually participate.

The above embodiment describes an example, in which the general action (first action) is the action of the performer avatar 1 standing on the virtual stage G without moving, the special action (second action) is the action of the performer avatar 1 virtually flying, and the specific action (third action) is the action of the performer avatar 1 moving suddenly sideways. The present invention is not limited to this. The action may be in accordance with the content to be distributed: for instance, the general action (first action) may be an action (typical action) that is performed for the longest period of time by the performer avatar in the distributed content, the special action (second action) may be an action that is performed in a special period, which is the shortest period, or an action that is performed least frequently in the distributed content, and the specific action (third action) may be an action that is performed for a shorter period of time than the general action (first action) but for a longer period of time than the special action, or an operation that is executed less frequently than the general action (first action) but more frequently than the special action. The special action (second action) may include the specific action (third action).

The above embodiment describes an example having both the function of switching to the viewpoint corresponding to a special action (second action) and the function of tracking a specific action (third action), and the present invention is not limited to this. The virtual space content distribution system may have only one of these functions.

The above embodiment describes an example, in which the viewpoints of the four virtual cameras C1 to C4 as fixed (set) virtual cameras and the aerial moving virtual camera can be switched in advance by setting in the administrator terminal 150 or operating with the administrator terminal 150. The present invention is not limited to this. For instance, the administrator K may perform these viewpoint switching operations in real time with the administrator terminal 150 using a viewpoint switching controller, for example, that makes up the operation input device 161.

The above embodiment describes an example including the virtual cameras C1 to C4 that are fixed (set) in the virtual space as the virtual cameras. The present invention is not limited to this. For instance, in addition to or instead of these virtual cameras C1 to C4, a virtual moving camera that is movable may be placed within the virtual live venue, and the position and imaging direction of the virtual moving camera within the virtual space may be controlled by an administrator K or a camera crew via the operation with the administrator terminal 150 to produce the viewpoint image of the virtual moving camera.

The above embodiment describes an example, in which a viewpoint image of virtual camera C2 is displayed on the screen S to detect the facial expression of the performer user and to reflect it in the facial expression of the performer avatar. The present invention is not limited to this. For example, a sophisticated head-mounted display with a sensor function may be used to detect the facial expressions of the performer user. In this case, the performer user may perform while wearing this sophisticated head-mounted display, thereby enhancing the performer user's sense of immersion in the virtual live performance. The facial expressions of the performer avatar do not need to reflect the performer user's facial expressions in detail. In this case, the performer user may wear a typical head-mounted display for the performance.

The above embodiment describes an example, in which the viewer user's viewpoint is changed in accordance with the movements of the performer avatar and tracks the movements, and the present invention is not limited to this. For instance, changing and tracking of this viewpoint may be performed in accordance with specific stage-effects such as smoke or fireworks (pillars of fire) devices, special lighting, or deformation of stage G, which are objects for stage-effects on the stage G.

<Event Content>

(Summary of Event Content)

Referring to FIG. 13 through FIG. 23, the above explains an example of the content that is event content to perform an live event by a performer in a virtual live venue. The event content is distributed at a predetermined date and time (scheduled time on the scheduled date) in accordance with the event data. The spatial area ER in which the event content is scheduled to be provided may be provided (distribution started and opened) before the start of the event so that viewer users are allowed to enter and participate in the virtual space in which the event is held. In this case, the event data may include information to specify the date and time when the spatial area ER scheduled to provide event content is to be provided (distribution started and opened) before the scheduled date.

The following describes an example, in which a virtual space as a predetermined type of virtual space is opened before the start of the event content of a virtual live event as shown in FIG. 13. In the virtual space, a virtual live venue (event venue) as shown in FIG. 13 is constructed. This allows viewer users to enter in the virtual space to participate, thereby gradually increasing the viewer user's interest in the event before the event starts. For instance, the predetermined type of virtual space is any one of the virtual spaces in the spatial area ER of FIG. 12. The following describes one example of the predetermined type of virtual space, by way of spatial area ER5 shown in FIG. 24.

FIG. 24 is an overall overhead view of the event venue to be constructed in a spatial area ER5. In the spatial area ER5 in this embodiment, a virtual space is provided, in which objects such as buildings simulating a shrine and a town in front of the shrine are placed, for example. Note that the objects placed in the spatial area ER5 are not limited to buildings simulating a shrine, but may be objects according to various themes such as the sea, a lake, a mountain, and a school. The spatial area ER5 is made up of a plurality of sub-areas. As shown in FIG. 24A, the spatial area ER5 is made up of a sub-area ER51 corresponding to a town area, a sub-area ER52 corresponding to a shrine grounds area, and a sub-area ER53 corresponding to a worship hall area.

For instance, in the town area, multiple house objects like private houses are placed, and multiple exhibition areas are placed along the approach to the shrine grounds area to display (install) lantern objects purchased by viewers users. Lantern objects can be purchased, for example, in a lantern shop area in the town area. In the shrine grounds area, a large number of objects to be placed in the grounds of a shrine are placed, including the shrine gate (torii), gates, and ornaments. The shrine grounds area also has a game area where certain games can be played, a fortune-telling area for fortune-telling, and exhibition areas in multiple locations. For instance, in the worship hall area, a large number of objects corresponding to the worship hall of a shrine and a stage object that serves as a virtual live venue (event venue) are placed. The worship hall area also has an offering area to make offerings, and exhibition areas in multiple locations.

The exhibition areas display lantern objects purchased by users, lantern objects associated with the operator (administrator) (including lantern objects that are initially set up), and lantern objects associated with special users. The special users include a performer user, a management user, a sponsor user who is supporting the event, and other celebrities, and include users who have been authenticated as special users by the management (administrator). Information on these sponsored user and other celebrities is stored in the event data 111.

As described below, the distribution server computer 100 determines beforehand the lantern objects displayed in the exhibition areas by a method such as random drawing, each time a switching condition is met. These lantern objects are default lantern objects to be displayed commonly to all of the users. The distribution server computer 100 transmits and places these lantern objects to the viewer terminal 300 of the user who has entered the spatial area ER5. The user brings their viewer avatar close to one of the exhibition areas, so that the lantern objects displayed in that exhibition area will be displayed on the viewer terminal 300.

Various processes related to such a spatial area ER5 (a predetermined type of virtual space) and various processes related to the provision and distribution of the spatial area ER5 are performed by the distribution server computer 100, and a viewer user enters and participates in the spatial area ER5 with the viewer terminal 300 and moves the viewer avatar, thereby causing images within the spatial area ER5 to be displayed on the viewer terminal 300. Hereinafter, viewer users and viewer avatars (also, performer avatars and others) will also be simply called users and user avatars (also, performer avatars and others).

FIG. 25 is an example of an image of the spatial area ER5 displayed on the display unit 310 of the viewer terminal 300. FIG. 25A is an example of a display image when the sub-area ER52 (shrine grounds area) in FIG. 24 is viewed obliquely from the inside of the sub-area ER51 (town area). FIG. 25B shows an example of a display image of a user avatar U operated by the user, viewed from behind the user avatar U. In the image, the user avatar is within the sub-region ER52 and is moving toward the boundary with the sub-region ER53. This drawing also shows a great gate object 53c, which corresponds to a great gate leading from the sub-area ER52 to the sub-area ER53. FIG. 25C shows an example of a display image of the user avatar U, viewed from behind the user avatar U. In the image, the user avatar is moving toward below a great shrine gate object 52t corresponding to the great shrine gate in the sub-area ER52 of FIG. 24. This drawing also shows the foot of the great shrine gate object 52t and the great gate object 53c. FIG. 25D shows an example of a display image of the user avatar U, viewed from behind the user avatar U. In the image, the user avatar is moving backward from the position shown in FIG. 25C. This drawing also shows the great shrine gate object 52a and a private-house object 51d corresponding to a private house. In this way, the user enters and participates in the spatial area ER5, whereby the user is allowed to move within the spatial area ER5 in response to the user's operations and view the objects and scenery within the spatial area ER5. The user is also allowed to purchase objects, make offerings, and participate in a live event held in the worship hall area on the scheduled date.

The image shown in FIG. 25A, which is an overhead view of the virtual space, may be displayed on the display unit 310 by user operation, and it may be an image corresponding to the line of sight of the user avatar U as shown in FIG. 25B to FIG. 25D. In response to user operations, the overhead view of the image of the user avatar U as in FIG. 25B to FIG. 25D may display an image from the viewpoint of the user avatar U, without displaying the user avatar U operated by the user.

In this embodiment, a user is allowed to enter and participate (simply called enter) in the spatial area ER5 also during the period before the scheduled date, which is the period before the scheduled date when the event content is provided in the spatial area ER5. For instance, also during the period before the scheduled date, a user logs into the virtual space ER and enters and participates in the spatial area ER5. The virtual space generation program 120 then transmits data, to the viewer terminal 300, to display a generated image of the spatial area ER5 on the display device 310 of the viewer terminal 300. The period before the scheduled date refers to days before the scheduled date on which the event content is provided, and may be a specified period (e.g., one week) before the scheduled date, or may be all the days before the scheduled date. This embodiment assumes that a user is allowed to enter the spatial area ER5 from one week before the scheduled date.

Only users with the right (e.g., a ticket) to participate in the event content provided on the scheduled date are allowed to enter and participate in the spatial area ER5 during the period before the scheduled date and on the scheduled date. For instance, the right to participate is granted to the users by purchasing tickets through billing, or by completing a given game or mission.

For instance, the spatial area ER5, which is a predetermined type of virtual space, includes a first virtual space having a plurality of sub-areas connected, where a viewer user is allowed to seamlessly move and enter from one sub-area to another of the multiple sub-areas, and a second virtual space including only a sub-area that has a common (same) display mode as another sub-area. The virtual space corresponding to the spatial area ER5 in this embodiment includes a first virtual space and a second virtual space. As shown in FIG. 24A, the first virtual space includes the sub-areas ER51 to ER53 connected, and in the first virtual space, a user is allowed to seamlessly move and enter between the sub-areas ER51 and ER52 and between the sub-areas ER52 and ER53. As shown in FIG. 24B on the right, the second virtual space includes only a sub-area ER53' that has a common (same) display mode as the sub-area ER53.

For instance, until a specific period before the scheduled date of the event content (e.g., until the day before the scheduled date), the user is provided with the first virtual space shown in FIG. 24A, and when it's the specific period before the scheduled date of the event content and the open condition is met, the user is provided with the second virtual space shown in FIG. 24B in addition to the first virtual space. Then, a user is not allowed to move from some sub-areas (ER51, ER52) of the multiple sub-areas (ER51 to ER53) in the first virtual space to another area (ER53) (e.g., the gate of the great gate object 53c leading to the sub-area ER53 is closed). At the same time, a portal P is provided at a predetermined position in one of the sub-areas (a position in front of the great gate object 53c in the sub-area ER52). The user moves the user avatar U to this portal P, whereby the user becomes able to transition to the second virtual space including only the sub-area ER53' via the display of a predetermined screen (for example, a blackout screen), for example.

This embodiment provides the event content in the sub-area ER53' that has the same display mode as the sub-area ER53. This sub-area ER53' is an area where a user is not allowed to enter until the open condition is met, for example. In the sub-area ER53', a venue similar to the virtual live venue shown in FIG. 13 is constructed, with objects corresponding to a virtual stage for a live event and audience seats placed. During the live event, a performer avatar will act on the virtual stage, and the user will watch the event from the audience seats via the user avatar U.

Until the specific period before the scheduled date, the virtual live venue is gradually constructed in the sub-area ER53 of the first virtual space, such as gradually placing objects corresponding to audience seats for the live event and placing objects under construction for the virtual stage, and the user is allowed to check the status of the sub-area through the user avatar U. For instance, virtual space update data distribution process is performed every predetermined time (for example, every 24 hours) to update displayed objects. This informs the user that the event is approaching, and enhances the sense of realism and interest of the user.

If a user is staying within the sub-area ER53 when the open condition is met, they are moved out of the sub-area ER53. For instance, the user avatar U is forcibly moved to a predetermined position outside the sub-area ER53 (e.g., in front of the great gate object 53c in the sub-area ER52). After that, while the user is not able to enter the sub-area ER53, they may let the user avatar U enter the sub-area ER53' via the portal P described above.

The sub-area ER53 and sub-area ER53' have a common display mode, but they are different in that the space in which the user avatar U is movable is restricted. For instance, in the sub-area ER53, the user avatar U is able to freely move within the area, whereas in the sub-area ER53', the user avatar U is movable only within the audience area 53'k. This reduces the burden on the server to the minimum that is necessary for the processing to provide the event content. Different servers may be used to perform the process of constructing and generating the sub-area ER53 and the sub-area ER53'. This allows a server capable of handling heavy loads to perform the process of providing the event content. Note that users who are allowed to enter the sub-area ER53' may be limited to those who satisfy a predetermined condition to view the event content.
(Changes in Display Mode in Virtual Space)

In this embodiment, the display mode in the spatial area ER5 may change according to an event that occurs in the spatial area ER5 during the period before the scheduled date.

For instance, the event that occurs in the spatial area ER5 during the period before the scheduled date includes a user's action and an action of another user during the period before the scheduled date, as well as lotteries in the spatial area ER5 and changes to the settings of the virtual space performed by the manager. The user's action (or the action of another users) includes purchasing and placing a specific object (item, lantern object, and others), playing a game, such as completing a specific mission. The display mode in the spatial area ER5, which may change according to an event that occurs in the spatial area ER5 during the period before the scheduled date, includes a change in the display mode of a specific object (e.g., lantern objects, and exhibition areas in which lantern objects are placed) placed in the spatial area ER5, and a change in the display mode of stage effects during the provision of the event content.
(Change in Display Mode During the Period Before the Scheduled in Accordance with Specific Object Placement)

Referring to FIG. 26 to FIG. 32, the following describes an example of changing the display mode in the spatial area ER5 during the period before the scheduled date in accordance with an event in which a user purchases a lantern object to be placed it in the spatial area ER5 during the period before the scheduled date. For instance, the display mode in the spatial area ER5 during the period before the scheduled date may change in accordance with placing a lantern object purchased by a user in the exhibition area in the spatial area ER5, or changing a lantern object purchased by another user and placed in the exhibition area in the spatial area ER5 to a different lantern object when a switching condition is met. A lantern object can be a type of social tipping item (e.g., a flower stand) from users to the performer when providing event content, and this may be called a flower stand FS in the following.

For instance, flower stands FS may be purchased at a lantern shop 51s located along the approach to the shrine within the sub-area ER51 shown in FIG. 24. A user moves the user avatar U to the lantern shop 51s or selects and operates the lantern shop 51s, whereby the image displayed on the viewer terminal 300 changes from a screen displaying the image in the sub-area ER51 to a screen to purchase a flower stand FS. FIG. 26A is an example of the screen that appears when purchasing flower stand FS.

There are several types of flower stands FS available for purchase, as shown in FIG. 27A and FIG. 27B. FIG. 27A shows a table for each attribute (motif) of the flower stand FS. The attributes (motifs) include "plain," "cherry blossom," "demon," "white fox," "black fox," and "gorgeous." Each attribute has a designated motif color, and the flower stand FS for each attribute has the corresponding color and a design related to the attribute. Of the attributes, "cherry blossom," "demon," "white fox," and "black fox" are the attributes and colors associated with the performer avatars that appear as facilitator characters during provision of the event content. In other words, the purchasable flower stands FS are prepared to match the image motifs and image colors defined for the performer avatars that appear when the event content is provided.

The flower stands FS are also available in multiple sizes. The flower stands FS have different sizes and prices depending on the attributes. For instance, for the attribute "plain," only the size "small" is available, and the price is set at 500 coins. For the attribute "cherry blossom", two sizes are available, "large" and "small", with the price for the "large" size set at 2,500 coins and the price for the "small" size at 500 coins. A user selects one of the motifs and sizes to purchase the desired flower stand FS. For instance, a user can enjoy purchasing a flower stand FS that matches the attribute/color, image motif, and image color associated with the performer avatar they are supporting (their favorite) among the performer avatars that appear during the provision of event content.

FIG. 27B shows a table for each size of the flower stands FS. A user may decorate the flower stand FS (generate the display mode of the flower stand FS), for example, by adding letters. The font type and font color are determined according to the size of the flower stand FS, and users can select them at the time of purchase. The maximum number of letters that can be displayed is defined for each size of flower stands FS. For instance, letters may be entered for size "large" in two columns, each with a limit of 15 letters. For size "small", the limit is 10 letters.

Flower stands FS have a defined area for each size that can be displayed (placed). When a user wishes to display a purchased flower stand FS within the spatial area ER5, they are able to select (designate) the exhibition area from the multiple exhibition areas provided within the spatial area ER5 in which the flower stand FS can be displayed, and place the flower stand FS there. For instance, they may select, for the size "large," any one of the exhibition areas: the main street (west) area 51a; the main street (east) area 51b; and the great shrine gate area 52a (the area where the great shrine gate object 52t is located). For the size "small," they may select any one of the exhibition areas: the shrine grounds (west) area 52b; the shrine grounds street (east) area 52c; the front of worship hall (west) area 53a, and the front of worship hall (east) area 53b.

FIG. 26A shows a purchase screen, which displays an image 411 of the flower stand FS selected by the user. Below the image 411 of the flower stand FS, the screen displays detailed information 412 of the selected flower stand FS. The detailed information 412 includes information on size and attribute (motif). A user is able to also add textual decorations to the flower stand FS they purchase, customizing it to their preferred design. In the letter input section 413, the user is able to input letters to be displayed on the flower stand FS. The input letters are reflected in the image 411 of the flower stand FS, so that the user is able to confirm the image when the flower stand is placed. Some taboo words are defined for the letters that cannot be displayed on flower stands FS. Examples of the taboo words include violent language and language that violates public order and morals. If these taboo words are entered, the purchase icon 417 will be grayed out and the purchase operation will be disabled.

As shown in the example purchase screen of FIG. 26A, the user operates the placement position selection section 414 to select the exhibition area for the flower stand FS. The coin-related section 415 displays the number of coins the user possesses, the number of coins consumed that is the purchase price of the flower stand FS, and the number of coins remaining after the purchase. The user operates the purchase icon 417, thus confirming the purchase, and the billing process is carried out. If the purchase is to be cancelled, the user operates with the close icon 416.

After purchasing the flower stand FS, the flower stand FS will be exhibited with special effect as shown in FIG. 26B. For instance, in FIG. 26A, a user purchases flower stand FS1 with the attribute "cherry blossom," the size "small," and the textual decoration "awesome". In this case, flower stand FS1 is displayed in the exhibition area where it is placed, and the flower stand FS1 is surrounded by light (displayed and highlighted in a specific manner different from other flower stands). When a user purchases a flower stand FS and designates an exhibition area with the viewer terminal 300, the distribution server computer 100 determines an exhibition position within the designated exhibition area by lottery, for example. The distribution server computer 100 stores information including the exhibition position of the flower stand FS, and transmits information to specify the exhibition position to the viewer terminal 300 of the user who made the designation. The viewer terminal 300 performs a process of replacing the flower stand displayed at the exhibition position designated from the received information with the flower stand purchased by the user and displaying it. This encourages the user, when entering and participating in the spatial area ER5, to move to the exhibition area of the flower stand FS placed by the user to see their own flower stand FS. This also adds interest, such as checking letters on other users' flower stands FS. As shown in FIG. 24A, the exhibition area is provided in all of the sub-areas ER51 to ER53 that make up the spatial area ER5. This encourages users who have entered and participated in spatial area ER5 to move to all of the sub-areas ER51 through ER53, allowing users to enjoy themselves over the entire spatial area ER5.

Figure 28:
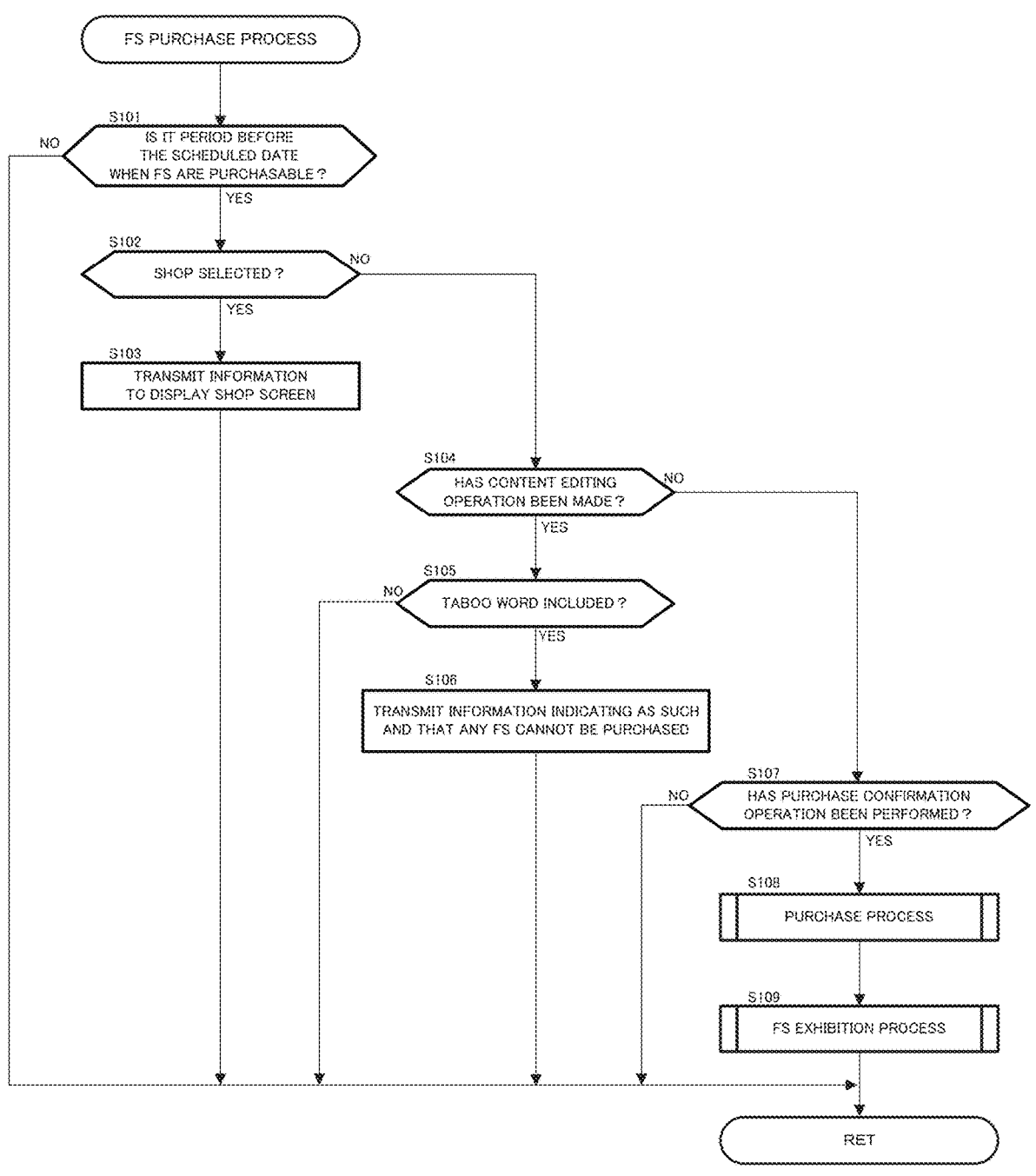
FIG. 28 is a flowchart showing an example of the purchase process of an object displayed in a virtual space according to one embodiment of the present invention.

Referring next to the flowchart of FIG. 28, the following describes the process of purchasing a flower stand FS executed by the distribution server computer 100.

In step S101, the process determines whether or not it is a period before the scheduled date when flower stands are purchasable. This purchasable period before the scheduled date may be a period that coincides with the period before the scheduled date, or may be a part of the period before the scheduled date. If it is not determined that it is the purchasable period before the scheduled date, the process ends because no flower stands can be purchased. For instance, on the day of the scheduled date, it is determined No in step S101, meaning that the user cannot purchase a flower stand FS. This motivates users to enter the spatial area ER5 at least once before the date of the event to purchase a flower stand FS.

If it is determined in step S101 that it is the purchasable period before the scheduled date, the process determines in step S102 whether or not a shop selection operation has been performed. For instance, the shop selection operation is an operation to a flower stand shop within the spatial area ER5 (e.g., lantern shops 51s, 53s in FIG. 24). The operation includes approaching a store clerk character or selecting a specified icon of the shop. Specifically, in step S102, the process determines whether or not the information to be transmitted when the store selection operation is performed with the viewer terminal 300 has been received.

If it is determined in step S102 that a shop selection operation has been performed, then the process transmits in step S103 the information, to the viewer terminal 300 with which the user operated to select the shop, to display a shop screen on the display device 310. For instance, the shop screen displays a product list to let a user select a flower stand FS to purchase, or a purchase screen for a flower stand FS, as shown in FIG. 26A. This allows the viewer terminal 300 to display the shop screen and let the user select a desired flower stand FS. After the information to display the shop screen is output in step S103, the process ends. In addition, the purchasing operation for the flower stands FS does not have to be performed within the spatial area ER5, but may be performed from a shop displayed in another space within the virtual space ER. The purchasing operation may be performed on a website other than the virtual space, which may be reflected on the virtual space (making it available for use and exhibiting).

If it is not determined in step S102 that a shop selection operation has been performed, then the process determines in step S104 whether or not a content editing operation has been performed. The content editing operation is a decoration operation such as inputting letters to a flower stand FS. Specifically, in step S104, the process determines whether or not information is received from the viewer terminal 300 to identify the letters input to the flower stand FS in response to the decoration operation on the screen shown in FIG. 26A after the flower stand FS to be purchased is selected with the viewer terminal 300. If it is determined that the content editing operation has been performed, then the process determines in step S105 whether or not a taboo word is included. If it is not determined that a taboo word is included, the process ends. If it is determined in step S105 that the letters contain a taboo word, then the process transmits in step S106 information indicating as such (that the letters contain a taboo word) and that any flower stand cannot be purchased to the viewer terminal 300 with which the user performed the content editing operation, and the process ends. This leads to a pop-up display on the viewer terminal 300 stating that "a taboo word is included", for example, or a process that prevents the user from selecting the purchase icon 417.

If it is not determined in step S104 that a content editing operation has been performed, then the process determines in step S107 whether or not a purchase confirmation operation has been performed. For instance, the purchase confirmation operation is an operation to the purchase icon 417 shown in FIG. 26A. Specifically, in step 107, the process determines whether or not the viewer terminal 300 has received information that is to be transmitted when an operation is performed on the purchase icon 417 with the viewer terminal 300 and that specifies the type of flower stand FS purchased, the letters entered, and the exhibition area selected. If it is not determined that the purchase confirmation operation has been performed, the process ends.

If it is determined in step S107 that the purchase confirmation operation has been performed, the process executes a purchase process (billing process) in step S108. After the purchase process is completed, the process executes a flower stand exhibition process in step S109, and the process ends. For instance, this process determines the exhibition position within the selected exhibition area by lottery, based on the information received when the purchase confirmation operation is performed, updates the user-related information (contained in the viewer user data 133) related to the flower stand FS, transmits information to specify the exhibition position to the viewer terminal 300 of the purchasing user, and generates the special effects shown in FIG. 26B on the viewer terminal 300 of the purchasing user.

FIG. 27C is an example table that stores information about a flower stand FS purchased by a user, which is included in the user-related information stored in the viewer user data 133. For instance, the table associates, with each user ID, information to specify the purchased flower stand FS and information on the exhibition position of the flower stand FS within the exhibition area specified by the user. In one example, the information includes a "FS ID" to individually specify the flower stand FS, "purchased FS" that is the information regarding the attribute and size of the purchased flower stand FS, "letters" that is information regarding the decoration made by the user (letters entered), "user designated area" that is information regarding the exhibition area designated by the user, "position" that is information regarding the exhibition position within the exhibition area, and "purchased date and time" that is the date and time when the user purchased the flower stand. In the flower stand exhibition process in step S109, information about the purchased flower stand FS associated with the purchasing user is newly stored. Information regarding the purchased flower stand FS is also transmitted to the viewer terminal 300 of the purchasing user, and the viewer terminal 300 performs an exhibition processing to display (exhibit) the purchased flower stand FS in place of the flower stand FS already displayed at the exhibition position. Note that when a flower stand FS is purchased, the process is not limited to exhibit the flower stand FS with special effect; instead or in addition, a notification may simply be made that the purchased flower stand FS has been exhibited in the selected exhibition area.

When any user purchases a flower stand FS, the viewer terminal 300 of this user will display the purchased flower stand FS at the exhibition position in place of the flower stand FS already exhibited there as stated above. The purchase, however, does not affect the flower stand FS in the exhibition area on the viewer terminal 300 of another user, and this viewer terminal 300 continuously exhibits the same flower stand FS as before the purchase. This means that different flower stands FS may be exhibited in the exhibition area between the user who has purchased a flower stand FS and another user.

Although in step S101, the process determines whether or not it is a purchasable period before the scheduled date when flower stands are purchasable, flower stands FS may be purchasable anytime, not just before the schedule date. For instance, flower stands FS are purchasable on the scheduled date on which the event content is provided or after the scheduled date, depending on the timing of the provision of event content related to the flower stands FS to be purchased. Note that if it is not in the purchasable period before the scheduled date in step S101, then the flower stand FS may not be used in the stage effects of the event content when it is provided.

Editing operations (e.g., inputting letter and editing content) of the display mode of the flower stand FS are not limited at the time of purchase, but instead or in addition thereto, editing may be performed after purchase. For instance, after a purchase operation of a flower stand FS, the flower stand FS may be stored in the user's item box, and the user may take it out of the item box and exhibit it or edit it at their preferred timing. The type and color of the font may be changed after purchase, not just at the time of purchase. It is not limited to letters, but it may also be possible to edit color and to add decorations as options to create a luxurious display mode.

The above describes the process of determining the exhibition position (e.g., the exhibition positions "A1", "A2" and others in the exhibition area A described later) in the exhibition area selected by the user, based on the information received in response to the purchase confirmation operation in step S107 of FIG. 28. The present invention is not limited to this, and for instance, the flower stand FS may be exhibited at a timing different from the timing of purchase of the flower stand FS, and the exhibition position may be determined at the timing of exhibition.

(Change in Display Mode During the Period Before the Scheduled Date in Response to the Fulfillment of Switching Condition)

Referring next to FIG. 29 through FIG. 32, the following describes transition of the lantern objects placed in the exhibition area (the display mode in the exhibition area). In this embodiment, lantern objects are exhibited and displayed in a plurality of exhibition areas within the area ER5 (e.g., the main street (west) area 51$a$, the main street (east) area 51$b$, and the great shrine gate area 52$a$). Each exhibition area has a set upper limit on the number of lantern objects that can be exhibited.

As described above, various flower stands FS are placed in these exhibition areas, including not only flower stands FS purchased by the user themselves (associated with the user) as described above with reference to FIG. 26 through FIG. 28, but also flower stands FS purchased by other users (associated with other users), flower stands FS associated with the management (administrator), and flower stands FS associated with special users.

In this embodiment, the exhibition area A corresponds to the shrine grounds (west) area 52$b$ of the sub-area ER52 in FIG. 24. In this area, "small"-size flower stands FS shown in FIG. 27B can be exhibited among the flower stands FS that are lantern objects. FIG. 29A shows a part of the exhibition area A that corresponds to the shrine grounds (west) area 52$b$. As shown in FIG. 29A, a plurality of flower stands FS, which are lantern objects, are exhibited vertically and horizontally in this exhibition area A. FIG. 31A is a table included in the object data 122, and is an example of a data table relating to the information that specifies the flower stands FS to be exhibited within the exhibition area A and their exhibition positions. The table in FIG. 31A associates, with each exhibition position (A1, A2, A3 . . . ) in the exhibition area A, information to specify the flower stands FS, including flower stand IDs and textual information to be displayed. The exhibit position A1 corresponds to the upper left end of FIG. 29A, for example, and is associated with the flower stand FS with the flower stand ID "a1", the attribute "cherry blossom" and "letter A" displayed. The exhibit position A2 corresponds to the position immediately right to the exhibition position A1 in the same row, and is associated with the flower stand FS with the flower stand ID "b1", the attribute "demon" and "letter B" displayed.

FIG. 31B is a table included in the object data 122, and is an example of a data table relating to the information that specifies the flower stands FS to be exhibited within the exhibition area B and their exhibition positions. The exhibition area B, in which the "large"-size flower stands FS shown in FIG. 27B can be exhibited, corresponds to the place of the sub-area ER 52 where the great shrine gate object 52$t$ is located (great shrine gate area 52$a$). Similarly to FIG. 31A, the table in FIG. 31B associates, with each exhibition position (B1, B2, B3 . . . ) in the exhibition area B, information to specify the flower stands FS, including flower stand IDs and textual information to be displayed. For instance, the position corresponding to the exhibit position B1 is associated with the flower stand FS with the flower stand ID "a2" and "letter A2" displayed. The position corresponding to the exhibit position B2 is associated with the flower stand FS with the flower stand ID "b2" and "letter B2" displayed.

As shown in FIG. 31A and FIG. 31B, the information on the flower stands FS is associated with each exhibition area, and this information is switched to information on another flower stand FS determined by random lottery, for example, each time a switching condition is met. The switching condition for information on flower stands FS in each exhibition area may include: the elapse of a predetermined time (e.g., every 30 minutes or every 2 hours); user's operation to enter and leave the virtual space (e.g., login and re-login); and user's operation to reload the display data (e.g., reload operation or after the viewpoint of user avatar U moves away from a predetermined exhibition area and then returns to that exhibition area). The probability of being selected for exhibition by random lottery is set uniformly for each flower stand FS. The present invention is not limited to this, and the probability may vary with the characteristics of each flower stand FS, as described below.

Each time a switching condition is met, the distribution server computer 100 determines the flower stands FS to be exhibited in each exhibition area, updates the table for each exhibition area stored in the object data 122 (see FIG. 31A and FIG. 31B, for example) (sets it as a default common to all users), and transmits the information that specifies the flower stands FS for each exhibition area to the viewer terminal 300 of the user who has entered the spatial area ER5. This allows the viewer terminal 300 to change the flower stands FS in each exhibition area (flower stands FS of other users, excluding the user's own flower stand FS) to other flower stands FS. The changing of flower stands FS will be done up to the maximum number that can be exhibited in each exhibition area. For instance, the maximum number of flower stands FS that can be exhibited in exhibition area A is 100. In this case, the information on the flower stands FS for exhibition area A stored in the object data 122 shown in FIG. 31A is updated so that 100 flower stands FS are selected by random drawing, for example, each time the switching condition is met, and the information is changed and updated to the data on the selected flower stands FS. For instance, when the exhibition area is opened, 10 flower stands FS may be initially placed in exhibition area A, which has the capacity of exhibiting 100 flower stands FS, and as users purchase and exhibit the flower stands FS, the number may gradually increase to 100. The time when the exhibition area is opened refers to when a user is allowed to purchase a flower stand FS and exhibit it in the exhibition area. In this case, the random lottery may be performed after the number of purchasing reaches the upper limit.

Figure 29:
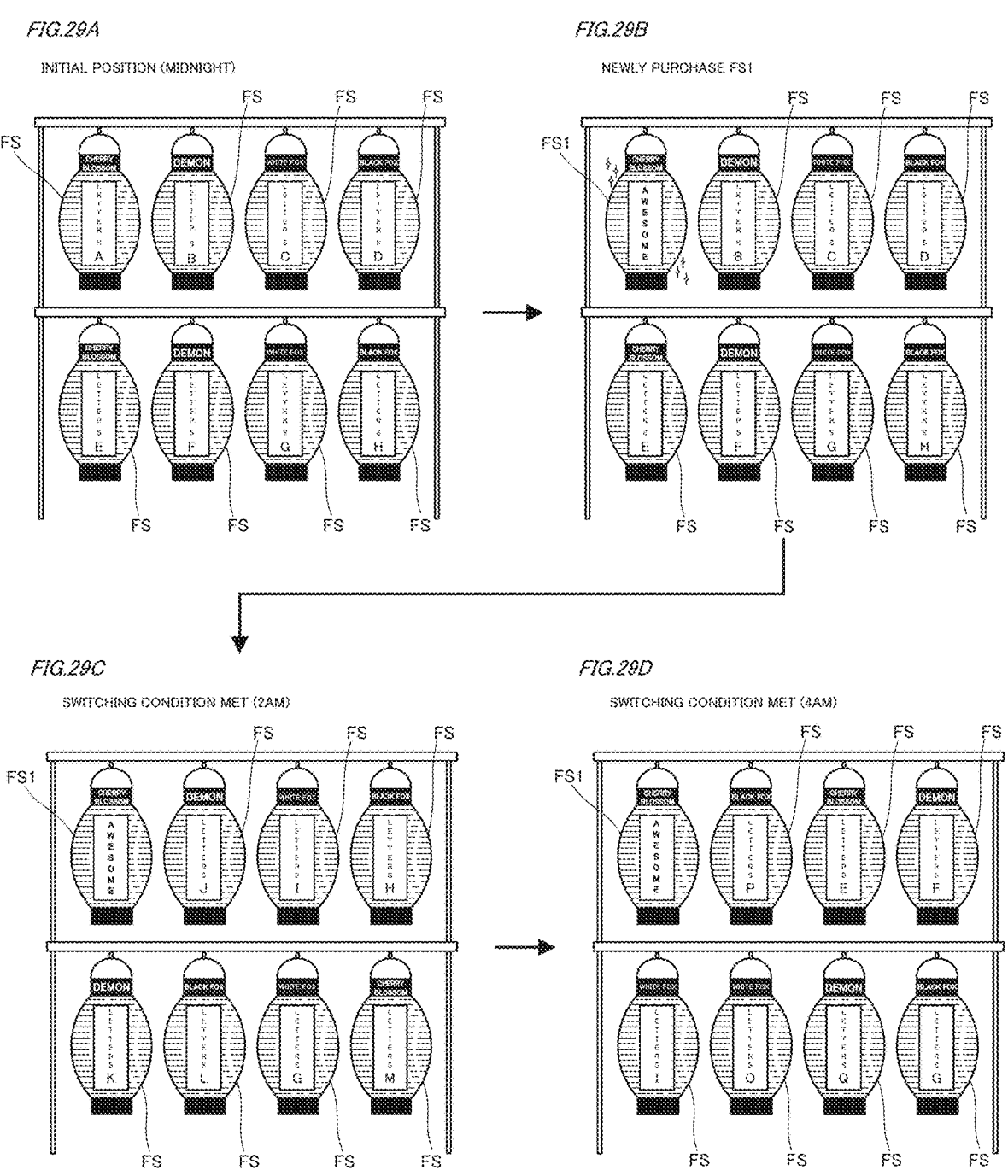
FIG. 29 shows an example transition of the display mode of objects displayed in a predetermined type of virtual space according to one embodiment of the present invention.
Figures 30, 30A, 30B, 30C, 30D:
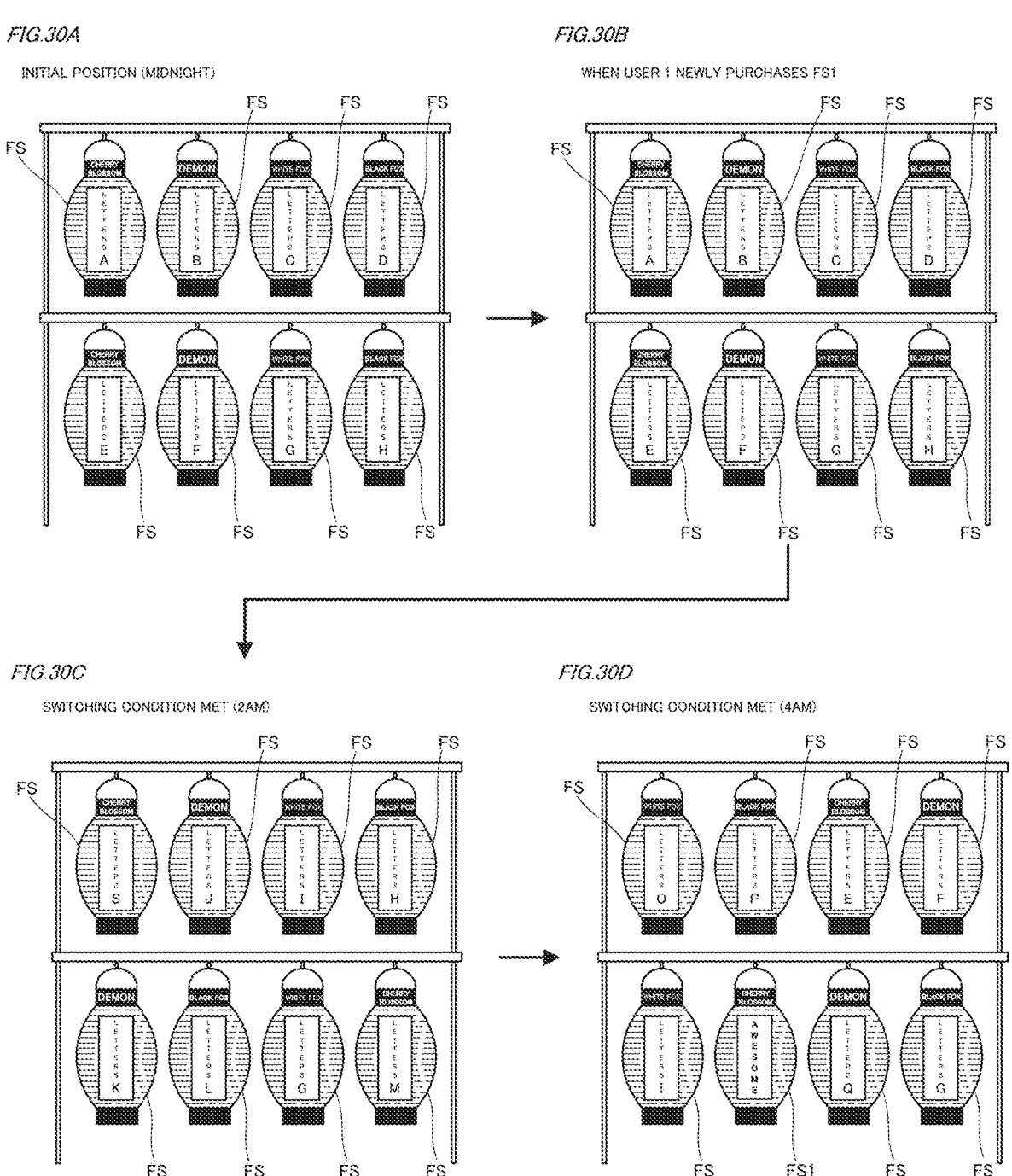
FIG. 30 shows another example transition of the display mode of objects displayed in a predetermined type of virtual space according to one embodiment of the present invention.

The information on the flower stands FS placed in the virtual space changes each time the switching condition is met. The flower stand FS that the user has purchased, however, may continue to be displayed in the exhibition area within the virtual space based on the information managed in FIG. 27C, as described above. For instance, FIG. 29 shows an example of the transition of the display mode of flower stands FS in exhibition area A displayed on the display device 310 of user 1 when user 1 newly purchases a flower stand FS. FIG. 30 shows an example of the transition of the display mode of flower stands FS in exhibition area A (the same exhibition position as in FIG. 29) displayed on the display device 310 of user 2 when user 1 newly purchases a flower stand FS. FIG. 29A and FIG. 30A are display examples of placing flower stands FS that have been determined as the default corresponding to the exhibition area A and that are specified from the flower-stand placement information of FIG. 31A. Note that at the timing of FIG. 29A and FIG. 30A, the flower stands FS purchased by users 1 and 2 are not exhibited in the exhibition area A for both users 1 and 2.

FIG. 29B and FIG. 30B are display examples at the timing when user 1 newly purchases a flower stand FS1. For instance, the flower stand FS1 purchased by user 1 has the flower stand ID "a3" shown in FIG. 27C with the attribute "cherry blossom" of size "small" and the input letters of "awesome". Assume also that user 1 selects "A" as the exhibition area at the time of purchase, and the location "A1" within the exhibition area is associated with the flower stand.

In response to the purchase of flower stand FS1 by user 1, the purchased flower stand information is distributed to user 1, and then user 1's viewer terminal 300 changes the flower stand FS placed in exhibition position A1 in exhibition area A to the flower stand FS1 that user 1 purchased and displays it. On the other hand, the display device 301 of user 2 still displays the same flower stand as in FIG. 30A, as shown in FIG. 30B.

FIG. 29C and FIG. 30C are display examples when a predetermined time has elapsed since the previous switching and the switching condition is met. As shown in FIG. 29C, the display device 301 of user 1 continuously displays the flower stand FS1 purchased by user 1 to be exhibited in exhibition area A in the same position as in FIG. 29B. However, it displays flower stands FS in other positions that have changed to other flower stands FS determined by lottery in response to the fulfillment of the switching condition. These other flower stands FS are not associated with user 1, but are associated with other users. These other flower stands FS may include flower stands FS prepared by the management, which are not associated with any other users.

Meanwhile, as shown in FIG. 30C, the display device 310 of user 2 displays flower stands FS that have changed to other flower stands FS determined by lottery in response to the fulfillment of the switching condition. FIG. 30C differs from FIG. 29C for user 1 in that a flower stand FS different from flower stand FS1 associated with user 1 is displayed in exhibit position A1 of exhibit area A. In FIG. 30C, common flower stands FS based on the default data stored in the object data 122 are displayed at all exhibition positions in the exhibition area A, including the exhibition position A1.

FIG. 29D and FIG. 30D are display examples when a predetermined time has elapsed and the switching condition is met again, so that the flower stands FS have changed in exhibition area A. Assume that the object data 122 of exhibition area A, which is determined by lottery and stored at this switching timing, happens to contain the flower stand FS1 purchased by user 1 and the exhibition position of this flower stand FS1 is A6 (the second position from the left in the bottom row in FIG. 29D and FIG. 30D). In this case, the display for user 2 shows the flower stand FS1 of user 1 in A6 based on the default data, as shown in FIG. 30D.

Meanwhile, as shown in FIG. 29D, the display device 310 of user 1 continuously displays the flower stand FS1 at position A1 in accordance with FIG. 27C. In other words, even if the object data 122 for the same exhibition area includes the flower stand FS1 purchased by user 1, the viewer terminal 300 of user 1 changes the display mode so as to place the flower stand FS1 purchased by user 1 in the exhibition position in accordance with FIG. 27C, and not in the exhibition position in accordance with the default data. The viewer terminal 300 of user 1 further performs the process of changing the position of placing the flower stand FS, which was placed at the exhibition position (A1) in the default data included in the object data 122, to the exhibition position (A6) where the flower stand FS1 purchased by user 1 is placed in the default data. As a result, the flower stand FS associated with A1 in the default data (the flower stand FS with "letter O") is displayed at A6 of user 1, instead of the flower stand FS1. This prevents the same flower stand from being placed at multiple positions in a single exhibit area.

Alternatively, if the object data 122 for the same exhibition area includes the flower stand FS purchased by user 1, the viewer terminal 300 of the user 1 may perform only the changing process to place the flower stand FS purchased by user 1 in the exhibition position in accordance with FIG. 27C, and it may keep the flower stand FS purchased by user 1 in accordance with the object data 122. This case gives the user a special feeling because the flower stand FS of user 1 is displayed at multiple positions.

Referring to FIG. 29, the above describes an example, in which the flower stand FS1 purchased by user 1 is displayed at fixed position A1 in the exhibition area A. The present invention is not limited to this, and the display position of the purchased flower stand FS may be changed each time the switching condition is met within the exhibition area A in which the user has placed the flower stand FS. For instance, at the timing of FIG. 29C, the flower stand FS1 purchased by user 1 is displayed at position A1, but at the next switching timing, it may be displayed at position A4, which corresponds to the upper right end of exhibition area A, and the default data (data of the flower stand FS associated with A1 in FIG. 31A) may be displayed at A1.

Figure 32:
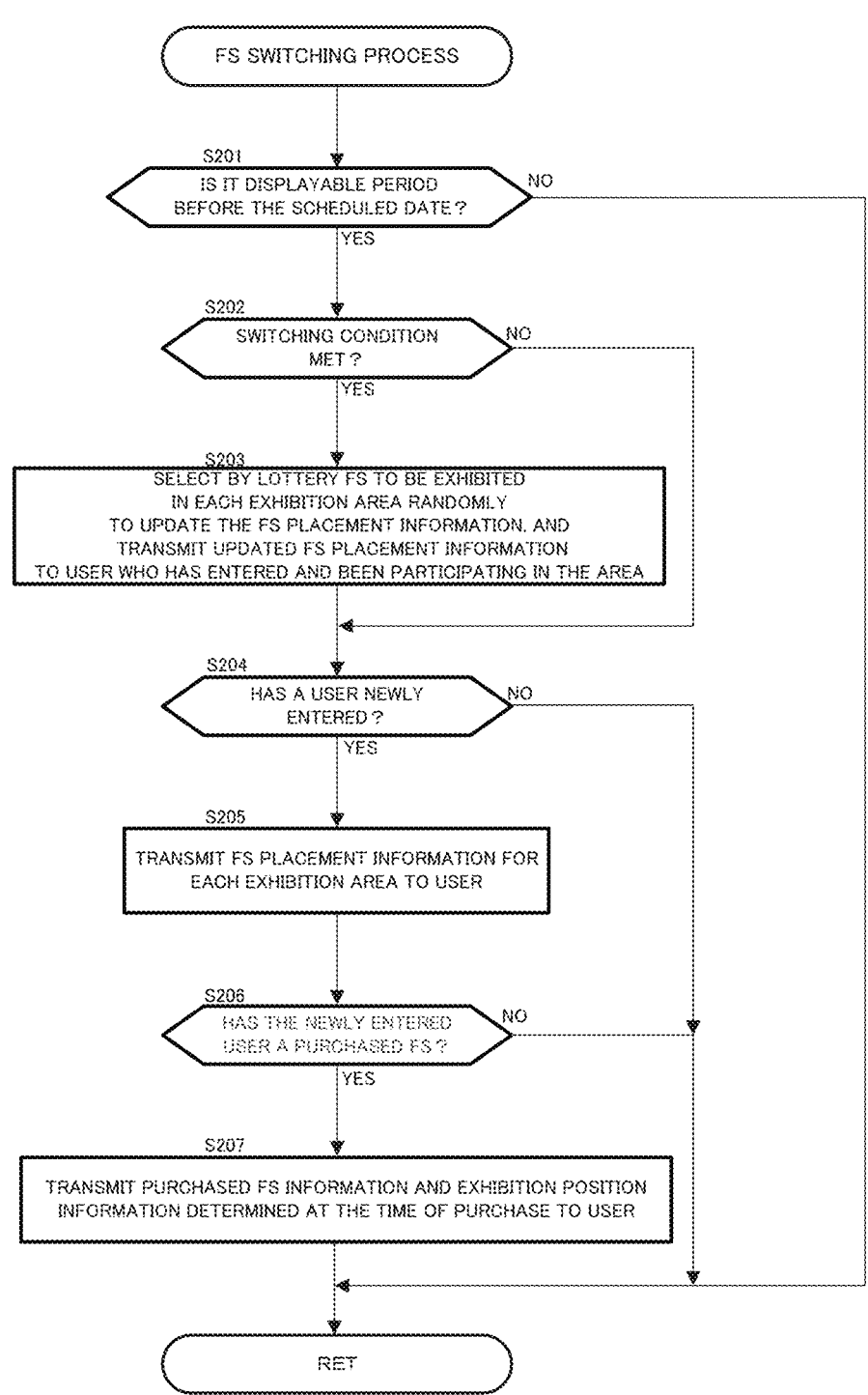
FIG. 32 is a flowchart showing an example of a switching process of objects displayed in a predetermined type of virtual space according to one embodiment of the present invention.

Referring next to FIG. 32, the following describes the switching process of the flower stands FS displayed in the exhibition area in the virtual space that is executed by the virtual space generating program 120.

In step S201, the process determines whether or not it is a displayable period before the scheduled date. The displayable period before the scheduled date may be a period that coincides with the period before the scheduled date, or may be a part of the period before the scheduled date. If it is not determined that it is the displayable period before the scheduled date, the process ends.

If it is determined in step S201 that it is a displayable period before the scheduled date, the process determines in step S202 whether or not a switching condition is met. If it is determined in step S202 that the switching condition is met, the process proceeds to step S203, where the process selects by lottery the flower stands to be exhibited in each exhibition area randomly from all the flower stands FS that are the target of the selection to update the flower stand placement information for each exhibition area in the object data 122 (e.g., FIG. 31A and FIG. 31B). Then the process transmits the updated flower stand placement information to the viewer terminal 300 of the user who has entered and been participating in the spatial area ER5. For exhibition area A, for example, the flower stand placement information for exhibition area A shown in FIG. 31A is updated to be the information of randomly selected flower stands FS for storage, and this information is transmitted to the viewer terminal 300 of the user. This updates the information on the default flower stands FS for each exhibition area, and changes the flower stands of each exhibition area to be displayed on the viewer terminal 300 of the user who has entered and is participating in the spatial area ER5.

If it is not determined in step S202 that the switching condition is met, the process determines in step S204 whether or not a user has newly entered the spatial area ER5.

If it is not determined in step S204 that a user has newly entered, the process ends. If it is determined in step S204 that a user has newly entered, the process transmits in step S205 the flower stand placement information for each exhibition area to the viewer terminal 300 of the user. This allows the user to receive information on the default flower stands FS, which is determined for each exhibit area. For instance, the process transmits the flower stand placement information on all exhibition areas including the exhibition area A that is updated in step S203.

In step S206, the process determines whether or not the newly entered user has a purchased flower stand FS, based on the information related to the purchased flower stand shown in FIG. 27C. If it is determined that the user has a purchased flower stand FS, the process transmits in step S207, to the viewer terminal 300 of the user, purchased flower stand information to specify the purchased flower stand FS and the exhibition position information determined at the time of purchase. The purchased flower stand information is about purchased flower stand FS for each user, as illustrated in FIG. 27C. For instance, assume that user 1 has newly entered the spatial area and the flower stands FS to be displayed in the exhibition area A are at the timing having the display mode shown in FIG. 29C. Then, the process transmits in step S205 the default data for exhibition area A at the time of FIG. 29C. The process then transmits in step S207 the purchased flower stand information for user 1 shown in FIG. 27C (flower stand ID "a3") and the exhibition position information determined at the time of purchase ("A1", which is the placement information for "a3"). As a result, as shown in FIG. 29C, the viewer terminal 300 of user 1 displays flower stand FS1 with flower stand ID "a3" at the exhibition position A1 and the default flower stands FS at the other exhibition positions in the exhibition area A.

The above describes an example where the process determines in step S201 whether or not it is a displayable period before the scheduled date. The present invention is not limited to this, and the process may not make such a determination as to whether it is a displayable period before the scheduled date. For instance, the process may be applicable to a spatial area ER, in which a specific object can be placed regardless of the date on which the event content is provided (e.g., the date when a live performance is held).

The above describes an example where in step S203, the process updates the flower stand placement information when the switching condition is met, and transmits the updated flower stand placement information to the user who has entered and is participating in spatial area ER5. The present invention is not limited to this, and in step S203, the process executes only the process of updating the flower stand information when the switching condition is met, and does not execute the process of transmitting the updated flower stand information to the user who has entered and is participating in the spatial area ER5. That is, the process does not change the flower stands in response to the fulfillment of the switching condition at the viewer terminal 300 of the user who has already entered and is participating in the spatial area. In step S203, the process updates the flower stand placement information when the switching condition is met, and transmits the updated flower stand placement information to the user who has entered and is participating in spatial area ER5 and who meets certain requirements. For instance, the certain requirements may be that a longer period of time has elapsed since entering/participating than the time required for the fulfillment of the switching condition, or that user's individual settings allow switching in response to the fulfillment of the switching condition. Even if the updated flower stand placement information is not transmitted to a user in step S203, the latest flower stand placement information (updated in step S203) will be sent to the user when the user re-enters the spatial area, for example, through the process of step S205 or later.

The embodiment described referring to FIG. 29 through FIG. 32 describes an example, in which even when the switching condition is met, the flower stand FS purchased by the user themselves continues to be displayed, while the flower stands FS associated with other users are changed in display. Also for the flower stands FS associated with other users, if the other user is a special user, the flower stand FS associated with the special user may be continuously displayed. As described above, the special user includes a performer user, a sponsor user who is supporting the event, and other celebrities, and includes users who have been authenticated as special users by the management (administrator).

Figure 33:
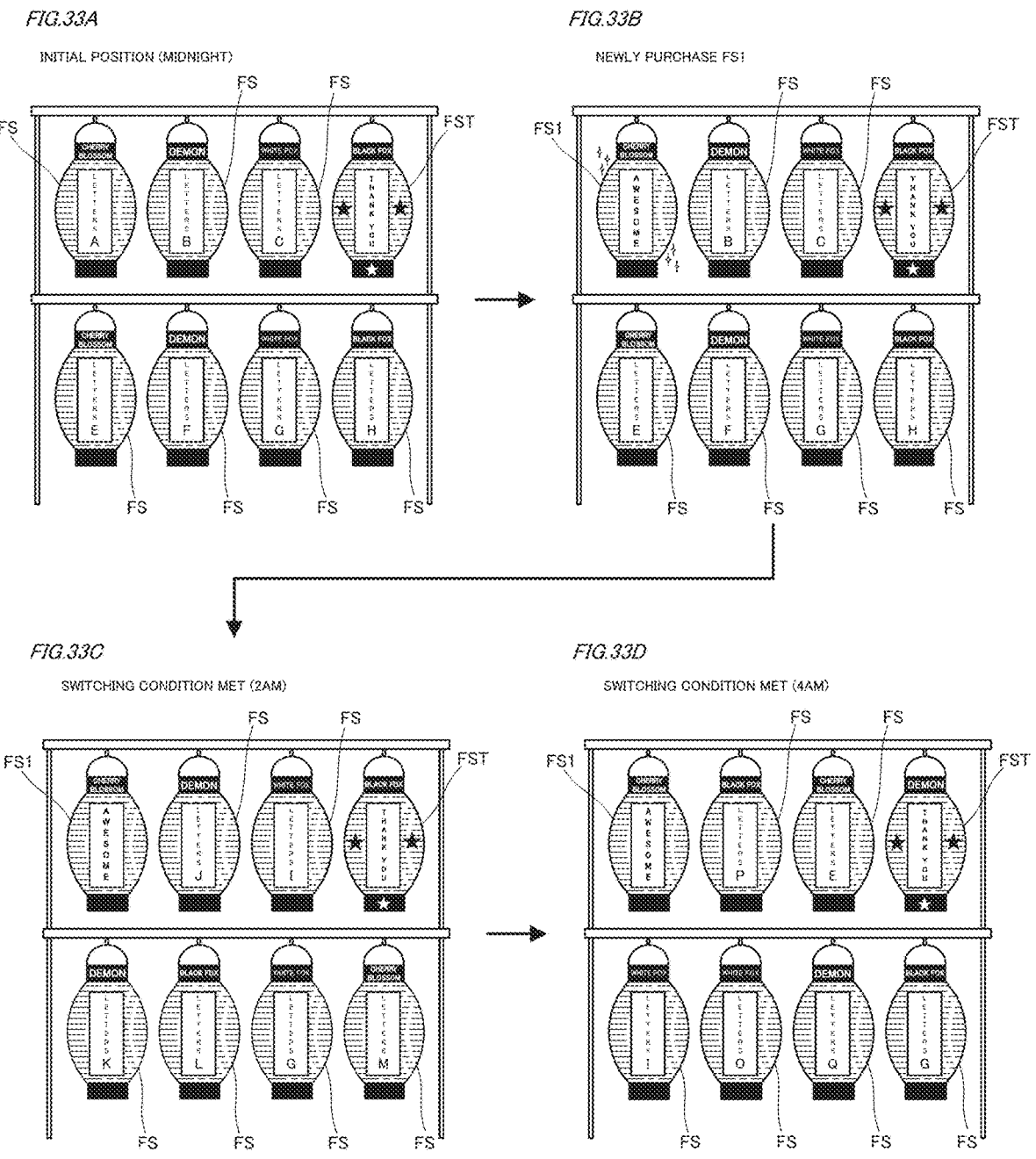
FIG. 33 shows another example transition of the display mode of objects displayed in a predetermined type of virtual space according to one embodiment of the present invention.

FIG. 33 is an example of the display on the display screen 310 of user 1 in FIG. 29, where the flower stand FST associated with a special user is further placed in the exhibition area A. The flower stand FST is a flower stand FS associated with a talent user associated with the attribute "black fox", and is a special flower stand FST prepared or purchased by the special user, for example. At the timing of FIG. 33A, the flower stand FST of the special user is displayed by default in the upper right end position A4 within the exhibition area A. In this way, the flower stand FST prepared or purchased by a special user is displayed in the exhibition area, and even if the switching condition is met, the flower stand placement information of this flower stand FST will not be changed to another flower stand.

Next, in FIG. 33B, when user 1 purchases flower stand FS1, the flower stand FS1 purchased by user 1 is displayed at exhibition position A1 in exhibition area A. When the user purchases the flower stand FS, the user selects the exhibition area and the exhibition position is determined in that exhibition area as described above. In this case, however, the exhibition position of exhibiting the special user's flower stand is excluded from the exhibition positions that are a target of the determination, as described above. This prevents the exhibition position of the flower stand purchased by the user from being determined to the display position of the special user's flower stand.

Subsequently, even after the switching timing when the switching condition is met in FIG. 33C, the special user's flower stand FST continues to be displayed at the exhibition position A4 in addition to the flower stand FS1 purchased by the user 1 themselves. Similarly, at the next switching timing shown in FIG. 33D, the flower stands FS1 and FST continue to be displayed.

Within the spatial area ER5, there may be an exhibition area (special exhibition area) where all the flower stands FS displayed are those of special users, or there may be a single area where the special users' flower stands FS are displayed individually in the form of statues or as photo spots. The flower stands to be exhibited in these special exhibition area or single area may be changed to a flower stand FS associated with another special user in response to the fulfillment of the switching condition.

In this embodiment, a user is able to purchase and own multiple flower stands FS (specific objects). This means that, the more flower stands FS a user has purchased, the higher the probability that their flower stands will be determined as the default flower stands FS when the switching condition is met, and the higher the possibility that they will be displayed in the spatial area ER5 of the viewer terminal 300 of another user. For instance, user 1 in FIG. 27C has three flower stands FS, whereas user 2 has one flower stand FS. Therefore, if the lottery is performed with a uniform probability, the probability that any of the flower stands of user 1 will be selected as the default flower stands FS is three times higher than the probability that the flower stand FS of user 2 will be selected. This motivates users to purchase more flower stands FS to appeal to other users.

Meanwhile, a certain user may own a huge number of flower stands FS (e.g., 10,000). Also in this case, if the more a user owns flower stands, the more likely their flower stands are selected as the default flower stands FS, as described above, then it is extremely likely that the user who owns a large number of flower stands will have their flower stands FS selected as the default flower stands FS and displayed. As a result, the display mode of flower stands FS exhibited in the exhibition area of other users will become less appealing because the display mode does not change well, and that the flower stands will be misused, so that other users will feel uncomfortable. To avoid these problems, this embodiment is configured so that, for a user whose number of flower stands FS purchased and owned reaches a specified number (e.g., 100), regardless of whether the user has more than the specified number, the number of flower stand FS that they have purchased and owned is considered to be the specified number. Then, the default flower stands FS are determined so that the proportion (probability) is the same as that of another user who has purchased and owned the specified number of flower stands FS. For instance, assume that the predetermined number is 100. Then, a user who purchases and owns 100 or more flower stands FS (whether they may actually own 1,000 or 10,000 flower stands FS) will have the same proportion to have the default flower stands FS determined as that of another user who purchases and owns 100 flower stands FS. This prevents a particular user's flower stands FS from being displayed too much in the exhibition area on other users' display devices 300.

(Changes in Display Mode During the Provision of Event Content)

Figures 34, 34A, 34B:
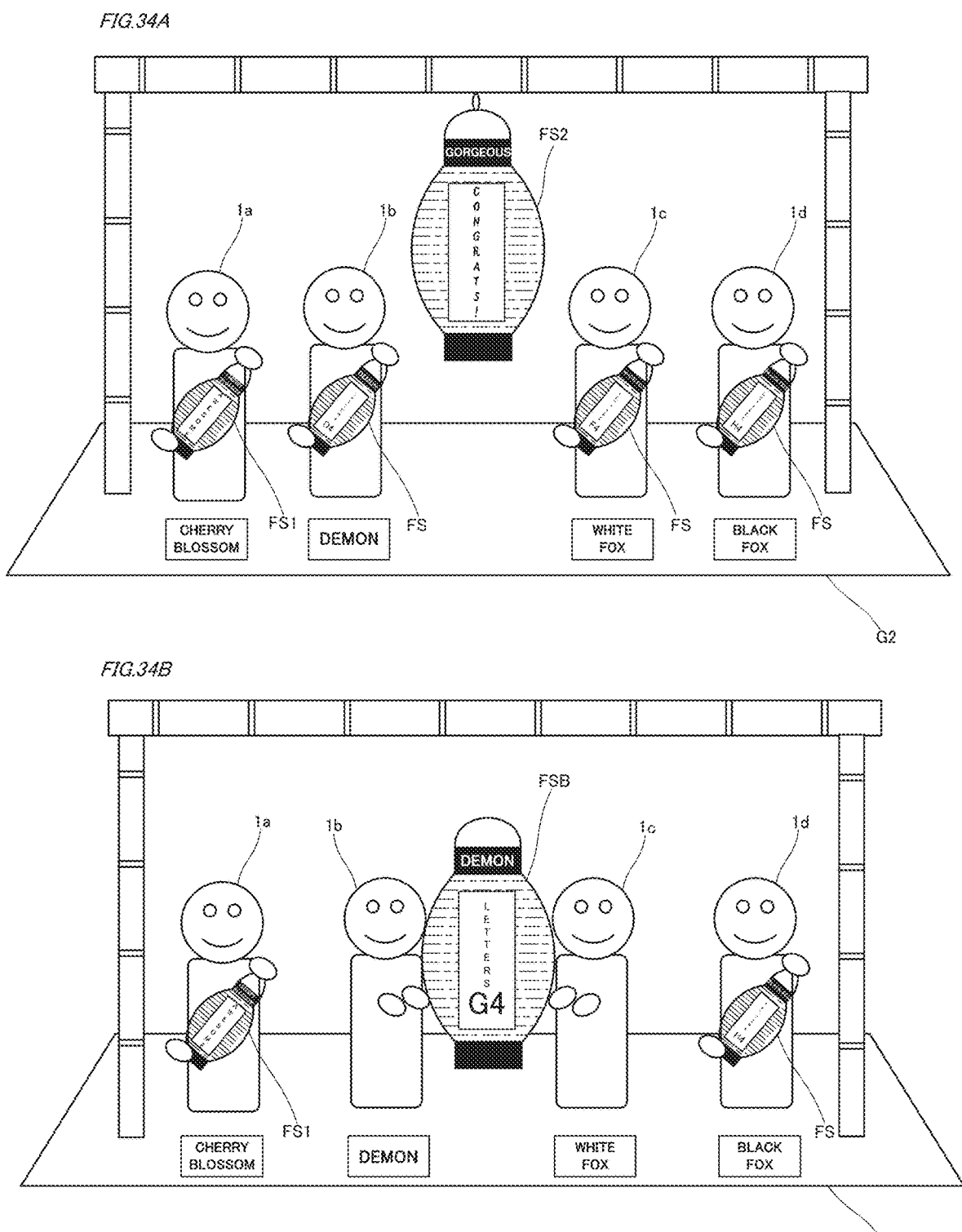
FIG. 34 shows an example of event content provided in a predetermined type of virtual space according to one embodiment of the present invention.

This embodiment is configured so that, during the provision of the event content on the scheduled date, the flower stand FS purchased by the user during the period before the scheduled date is displayed in the virtual space. An image (display mode) in the area ER53' during the liver performance that is the event content changes according to the event that occurs within the spatial area ER5 during the period before the scheduled date. For instance, the event that occurs within spatial area ER5 during the period before scheduled date includes a user's purchasing a flower stand FS to be exhibited and placed in an exhibition area in the spatial area ER5. Referring to FIG. 34 through FIG. 36, the following describes a change in display mode in the virtual space during the provision of event content.

FIG. 34 shows an example of a scene of stage effects in the event content (e.g., live performance in which the same types of stage effects as those in FIGS. 13 to 24 are executed) provided in the worship hall of the sub-area ER53' in FIG. 24 that functions as the virtual stage G. The virtual stage G in FIG. 34 will be referred to as a virtual stage G2 in the following description. Performer avatars 1a to 1d are appearing on virtual stage G2. The performer avatars 1a to 1d are associated with the attributes "cherry blossom," "demon," "white fox," and "black fox," respectively. These attributes correspond to the attributes associated with the flower stands FS shown in FIG. 27A.

During the provision of event content, as shown in FIG. 34, the stage effects are given, in which the performer avatars 1a to 1d hold the flower stands FS in their hands to show them to the audience. In this embodiment, if a viewer user has purchased a flower stand FS during the period before the scheduled date, the performer avatars 1a to 1d are shown holding the flower stand FS purchased by that user. FIG. 35 is an example of a data table that specifies the flower stands FS used in the stage effects of the event content of FIG. 34. FIG. 35A shows default event flower-stand information common to all users, which is managed by the distribution server computer 100 (e.g., gift data 134). The flower stands FS displayed on the display device 310 for each user while the event content is being provided is specified based on the event flower-stand information in FIG. 35A and the purchased flower stand related information for each user in FIG. 27C.

In this embodiment, a total of nine flower stands FS is used to give the event content the stage effects: flower stands FS of sizes "large" and "small" for each of the attributes "cherry blossom," "demon," "white fox," and "black fox," as well as a flower stand FS of the attribute "gorgeous." Between the end of the period before the scheduled date and the start of the event content, the default flower stands FS in FIG. 35A are determined by randomly selecting a flower stand FS for each attribute and size from among the flower stands FS purchased by any user during the period before the scheduled date. As shown in FIG. 35A, information that specifies a default flower stand FS to be used for the stage effects is associated with each attribute and size of the flower stand FS. For instance, a flower stand FS with the attribute "cherry blossom" of size "large" is associated with the flower stand FS with the flower stand ID "a4" whose displayed letter is "character A4". Not all types of flower stands FS that can be purchased before the scheduled date illustrated in FIG. 27A are used in the stage effects of event content, but some of them may be used. For instance, the attribute "plain" is not used for the stage effects of event content in this embodiment.

The distribution server computer 100 transmits the event flower stand information of FIG. 35A and purchased flower-stand related information for each user of FIG. 27C to the viewer terminal 300 of the participating users at the start of the event content (at login) or at a specified timing during the content provision.

Based on the user's purchased flower stand related information, the viewer terminal 300 of each user specifies a flower stand having the same attribute and size as those of their purchased flower stand from among the flower stands specified from the received event flower stand information. The viewer terminal 300 then changes the specified flower stand to the flower stand specified from the user's purchased flower stand related information, and updates the event flower stand data to the event flower stand data shown in FIG. 35B. In this embodiment, if a user has purchased and owns a plurality of flower stands FS with the same attribute and size, the last (most recently) purchased flower stand FS is set as the event flower stand information (associated with the table). As shown in FIG. 27C, user 1 owns one flower stand FS with the flower stand ID "a3", attribute "cherry blossom" and size "small". This means that, although the default information in FIG. 35A shows that the flower stand FS with the attribute "cherry blossom" and size "small" is associated with the flower stand ID "b4", this flower stand is associated with "a3" in the event flower stand information for user 1, as shown in FIG. 35B. As shown in FIG. 27C, user 1 owns two flower stands FS with the attribute "gorgeous", flower stand IDs "b3" and "c3". User 1 purchased "c3" later than "b3", so that "c3" is associated with the attribute "gorgeous" in FIG. 35B. As a result, default event flower stand information is maintained for a user who has not purchased a flower stand during the period before the scheduled date, whereas the event flower stand information is updated for a user who has purchased a flower stand during the period before the scheduled date, from the default information to the one in which the flower stand with the same attribute and size as those in the purchased flower stand is replaced with the purchased flower stand.

The viewer terminal 300 of each user gives stage effects to the user during the provision of event content as illustrated in FIG. 34, in accordance with the set event flower stand information. FIG. 34 is an example of a display mode displayed on the display device 310 of user 1, and is displayed in accordance with the event flower stand information stored as in FIG. 35B. FIG. 34A shows an example in which the performer avatars 1*a* to 1*d* have a flower stand FS of size "small" corresponding to each of their attributes. The flower stand FS1 that the performer avatar 1*a* holds displays flower stand FS1 with flower stand ID "a3" purchased by user 1. FIG. 34A shows flower stand FS with the attribute "gorgeous" displayed on the center, on which flower stand FS2 with flower stand ID "c3" that was last purchased by user 1 is displayed. In FIG. 34B, performer avatar 1*b* and performer avatar 1*c* have flower stand FS of size "large" with attribute "demon". User 1 has not purchased flower stand FS of size "large" with attribute "demon". Thus, the flower stand FS with flower stand ID "g4", which is defined by default in FIG. 35A, is displayed. The display mode of the virtual live venue is not limited to the set illustrated in FIG. 34, and various objects may be displayed.

The stage effects illustrated in FIG. 34 are implemented by transmitting stage-effects information from the distribution server computer 100, the stage-effects information including information that controls the display actions of the performer avatars 1*a* to 1*d* and information that specifies the attributes and size of a flower stand to be held in the hands of each of the performer avatars 1*a* to 1*d* or to be exhibited at a predetermined position in the virtual space (hanging from the ceiling). The viewer terminal 300 of each user controls the display mode in the virtual space including the performer avatars 1*a* to 1*d* based on the stage-effects information, and places the flower stands that match the information for specifying the attributes and size of the flower stand from among the flower stands FS specified from the event flower stand information (see FIG. 35B) updated in each viewer terminal 300. This implements the stage effects illustrated in FIG. 34.

Referring next to FIG. 36A, the following describes event flower stand determination process executed by the distribution server computer 100. In step S301, the process determines a flower stand to be used in the stage effects during the provision of the event content randomly by lottery for each of the attributes and sizes of the flower stand described above. In step S302, the process transmits the event display flower stand information (see FIG. 35A) capable of specifying the result of the determination to the viewer terminal 300. For instance, as shown in FIG. 35A, event flower stand information, which is stored in association with information specifying the flower stands FS determined by lottery for each attribute and size, is transmitted to the viewer terminal 300 of the user who is going to participate or is currently participating in the event content.

In step S303, the process specifies users with purchased flower stands, based on the purchased flower stand related information for each user shown in FIG. 27C, and transmits the purchased flower stand related information for each identified user to the viewer terminal 300 of the user. After that, the event flower stand determination process ends.

Referring next to FIG. 36B, the following describes event flower stand specifying process executed by the viewer terminal 300.

In step S311, the process stores the event flower stand information (see FIG. 35A) transmitted from the distribution server computer 100 in step S302 in FIG. 36A as default data to specify default flower stands FS to be used for the stage effects. In step S312, the process determines whether or not the purchased flower stand related information (the user information in FIG. 27C transmitted from the distribution server computer 100 in step S303 in FIG. 36A) has been received. If it is not determined in step S312 that the purchased flower stand related information has been received, the event flower stand determination process ends.

If it is determined in step S312 that purchased flower stand related information has been received, the process proceeds to step S313, in which the process stores, as update data, information for specifying the flower stand FS purchased by the user for each attribute and size based on the received purchased flower stand related information. In this step, if a plurality of flower stands are specified as having the same attribute and size, the last (most recently) purchased flower stand is specified and stored based on their purchase date and time.

For a flower stand with the same attribute and size as the flower stand specified from the update data among the flower stands specified based on the default data, the process in step S314 rewrites information on the flower stands used for stage effects with the flower stand specified from the update data.

As described above, the process associates a performer avatar with the flower stand purchased by the user who has the purchased flower stand FS in the flower stands displayed during the event and displays it to the user. This embodiment is configured so that, if there are multiple purchased flower stands with the same attributes and size, the most recently purchased flower stand FS will be displayed. This enables the display of a more elaborately prepared flower stand FS by the scheduled date for the event content to be provided. Note that, instead of using the most recently purchased flower stand FS, the process may determine the flower stand by lottery from the flower stands with the same attribute and size, and use it for stage effects.

In the above-described event flower stand determination process in FIG. 36A, the information is determined and stored in advance before the event content is provided, and the present invention is not limited to this. The process may be executed during the provision of event content, for example, at predetermined time intervals (e.g., every 10 minutes) to update the event flower stand information. Alternatively, if the singing part and the MC part are repeated during the provision of event content, the event flower stand information for each part may be updated before the next part begins. During the provision of the event content, the display mode of the stage effects may be changed in accordance with the event flower stand information updated during the provision of the event content.

Note that the flower stands FS that are a target of lottery and are determined as the event flower stand information illustrated in FIG. 35A may exclude a flower stand FS associated with a special user. This allows the flower stands FS to be selected by lottery from those associated with fan users (general users) for the performer avatar, for example, and increases the consistency in the stage effects for the event content between the displayed flower stands FS and messages to the fans such as "Thank you for your support with the flower stand!"

(Processing Related to Event Content)

That is the descriptions on the example in which the display mode in spatial area ER5 is changeable in accordance with an event that occurs in the spatial area ER5 during the period before the scheduled date to provide the event content. Instead of or in addition to this, this embodiment may be configured so that the process related to the event content is performed in accordance with the degree of user's displaying an image in the spatial area ER5 on the display device 310 of the viewer terminal 300 during the period before the scheduled date to provide the event content. This may be performed by entering or participating in the spatial area ER5 during the period before the scheduled date.

The process related to the event content includes the process of changing the display mode of the stage effects while the event content is being provided, and the process of giving the user an object that the user can use while the event content is being provided. For instance, the degree of user's displaying is the number of times the user enters the spatial area ER5 during the period before the scheduled date. The number of entering times into spatial area ER5 may be the number of days so that multiple entries on the same day are counted as one entry, or it may be the number of times when the user has entered the area for a specified period of time (e.g., 10 minutes) or longer. The degree of user's displaying is not limited to this, and it may also be the period of time spent in the spatial area ER5 during the period before the scheduled date, or the degree (e.g., the number of times displayed, the displayed period of time) of displaying a specific area within the spatial area ER5. The specific area may include an exhibition area or a money-offering area, or any other area that is determined in advance in the spatial area ER5.

The following describes an example in which the "degree" of displaying images in spatial area ER5 is "the number of times a user has entered spatial area ER5 where the event content can be held on a scheduled date (hereinafter simply referred to as the number of entering times)," and "process related to event content" is "process to change the content of the stage effects during the provision of event content" and "process to give an object that can be used by the user during the provision of event content".

The distribution server computer 100 (e.g., the event data 111 and the gift data 134) counts and stores the number of times each user entered the area during the period before the scheduled date. FIG. 37 is an example of a data table to specify the "items" to be given according to the number of entering times, and the "stage-effects content" to be changed during the provision of event content according to the number of entering times.

"Items" that are given (made available) according to the number of entering times are objects that the user can use while the event content is being provided. For instance, it may be a limited item that can only be used in the event content (e.g., a live performance) held after the period before the scheduled date ends, or it may be an item that can be used not only in the event content held after the period before the scheduled date ends, but also in content other than the event content. If the item can be used in content other than the event content held after the end of the period before the scheduled date period, the item may be subject to certain restrictions in terms of performance, such as the functionality and efficacy (e.g., certain functions may not be available, effectiveness may be reduced). Alternatively, instead of or in addition to this, the item may be a limited item related to the image theme of the event content to be held after the end of the period before the scheduled date, for example.

As shown in FIG. 37, "items" can be used during the provision of event content to liven up the event, for example. For instance, if the number of entering times is once during the period before the scheduled date, the user will be given limited cracker A that can be used in the event content; if it is twice, they will be given limited cracker B; if it is three times, they will be given limited cracker C. If the number of entering times is four times, the user will be given limited edition fireworks, if it is five times, they will be given a limited edition glow stick, if it is six times, they will be given a limited edition stamp, and if it is seven times, they will be given a limited edition item set. The stamp can be used in chats and when exchanging messages within the virtual space. The item set is a collection of multiple items. Note that the items shown in FIG. 37 are not limited to these items and may be any items that can be used while the event content is being provided and that will liven up the event. They may be social tipping items, for example. The items given to a user may be not only the item corresponding to the actual number of entering times the user has entered the space, but also items corresponding to the number of times that is less than the actual number of entering times the user has entered the space (e.g., a user who has actually entered the space three times may be given the limited cracker B, which corresponds to the two entry times, or the limited cracker A, which corresponds to the one entry time, in addition to the limited cracker C, which corresponds to the actual number of entering times).

As shown in FIG. 37, the "stage effects" will be normal one if the number of entering times during the period before the scheduled date is between 1 and 3 times, for example, meaning that the stage effects do not change. If the number of entering times is four or more times, the stage effects may change; for four times, the user will be given a special room A, for five times, special room B, and for six times, special room S. A special room given means that the user can obtain the right to participate in the event content in a virtual live venue with animation (display mode) that is different from the normal one. For instance, the sub-area ER53' may be prepared, where only target users can access, who have obtained the right to participate in the live event in a special room, and the event content may be provided in the special room. Alternatively, the target users may receive a replaced image of a live venue set that is distributed during the provision of the event content.

If the number of entering times is seven, the user will be given the performance in secret costume. The secret costume is a costume (costume object) of the performer avatar that is displayed corresponding to the performer avatar when the event content is provided. The target users, who have obtained the right to be given the performance in the secret costume, will receive a replaced data that is different in costume data of the performer avatar from the data distributed to normal users.

Figure 38:
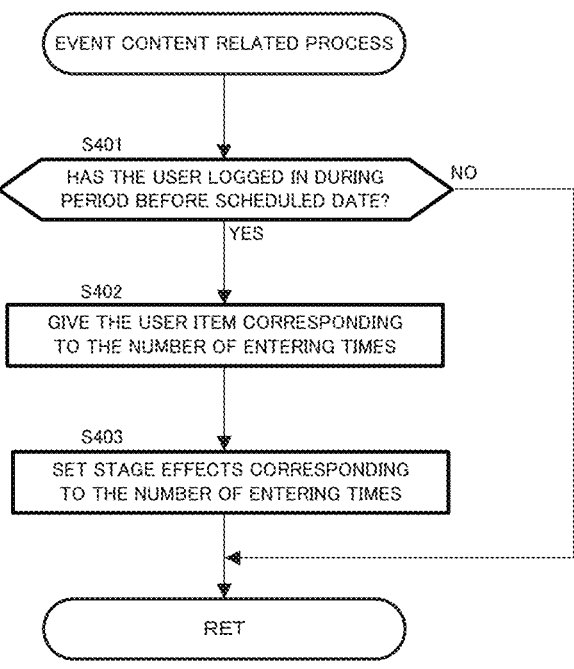
FIG. 38 is a flowchart showing an example of the process related to event content provided in a predetermined type of virtual space according to one embodiment of the present invention.

Referring to FIG. 38, the following describes an example of the event content-related process executed by the distribution server computer 100 in accordance with the number of entering times shown in FIG. 37. For instance, the event content-related process is executed for each user who is scheduled to participate in the event content (e.g., in the ascending order of user ID), from the end of the period before the scheduled date to the start of the event content.

In step S401, the process determines whether or not the user's number of entering times during the period before the scheduled date is one or more. If it is not determined that the user's number of entering times during the period before the scheduled date is one or more, the process ends. For a user who is determined in step S401 not to have the number of entering times during the period before the scheduled time that is one or more, the process distributes event content in accordance with the data stored as default in the event data 111.

If it is determined in step S401 that the user's number of entering times during the period before the scheduled date is one or more, the process proceeds to step S402, where the process gives the user an item corresponding to the number of entering times. This allows an item given to an item box owned by the user in the virtual space ER to be displayed, for example. The item may be put in the box in advance before the start time of the event content being provided, and it may be grayed out and unavailable until the start time of the provision, and it may be available in the virtual live venue that is open from the start time of the content provided.

In step S403, the process sets the stage-effects content corresponding to the user's number of entering times, and the process ends. For instance, if the user's number of entering times is four, limited edition fireworks will be displayed in the item box, and the process stores information to configure the design of the virtual live venue as special room A in association with the target user.

<Example of Specific Configuration and Effects>

(1-1) As described with reference to FIG. 1 through FIG. 25, the above-mentioned embodiment is configured so that the distribution server computer 100 follows a stored program (e.g., a program stored in a non-transitory computer-readable storage medium) and a method of controlling a computer with the program (hereinafter they may be simply referred to as a program) to perform the process of generating a virtual space ER and transmitting information that displays an image in the virtual space ER in response to a user operation, and the viewer terminal 300 follows a stored program to perform the process of displaying an image in response to a user operation in accordance with the information from the distribution server computer 100. As described with reference to FIG. 26 through FIG. 28, the distribution server computer 100 follows a stored program to perform the process of placing and updating objects such as flower stands FS that are purchased in response to a purchase operation by the user within the virtual space ER, and the viewer terminal 300 follows a stored program to perform the process of placing and displaying the objects that are placed and updated by the distribution server computer 100 and purchased in response to a purchase operation by the user within the virtual space ER. As described with reference to FIG. 13 through FIG. 23 and FIG. 34, the distribution server computer 100 follows a stored program to perform the process of constructing a space in the spatial area ER5 within the virtual space ER to provide the event content on the scheduled date, and the viewer terminal 300 follows a stored program to provide the event content on the scheduled date in the spatial area ER5 constructed by the distribution server computer 100.

The present embodiment is configured so that, also during the period before the scheduled date of the event, the distribution server computer 100 and the viewer terminal 300 each follow a stored program to perform the process of enabling the entrance into the spatial area ER5 and displaying an image in the spatial area ER5 in response to a user's operation and perform the process of enabling placement and display of the object purchased in response to a purchase operation in the spatial area ER5. As shown in FIG. 26, FIG. 29, FIG. 30, FIG. 33, and FIG. 34, the distribution server computer 100 and the viewer terminal 300 each follow a stored program to perform the process of changing the display mode in the spatial area ER5, in response to the placement and display of the object such as a flower stand FS in the spatial area ER5 during the period before the scheduled date. This shares and provides a user with the spatial area ER5 in which event content is to be provided and events that can change the display mode in the spatial area ER5 during the period before the scheduled date, thereby gradually increasing the interest in the event content before the event content is provided.

(1-2) The distribution server computer 100 and the viewer terminal 300 each follow a stored program to perform the process of changing the display mode of each exhibition area in the spatial area ER5 from the timing of purchase until the end of the period before the scheduled date, as shown in FIG. 26, FIG. 28, and FIG. 29, in accordance with the user's purchase of the flower stand FS in the period before the scheduled date as shown in FIG. 27C. This allows users to focus on whether a flower stand FS will be purchased by users during the period before the scheduled date, what attributes the purchased flower stand FS will have, how it will be decorated, and where it will be displayed, and how the display mode of each exhibition area within the spatial area ER5 will change accordingly.

(1-3) The display mode of each exhibition area within spatial area ER5, which may change during the period before the scheduled date, may be different from the user to another user. This may change with whether the user has purchased and placed a flower stand FS during the period before the scheduled date, as described while comparing FIG. 29 and FIG. 30, for example. This enables customization of the display mode of each exhibition area in the spatial area ER5 for each user during the period before the scheduled date, thus giving each user a special feeling.

(1-4) As shown in FIG. 34, the distribution server computer 100 and the viewer terminal 300 each follow a stored program to perform the process of changing the display mode for stage effects of the live event to be performed in the spatial area ER5 during the provision of the even content, in response to the user's purchase and placement of a flower stand FS during the period before the scheduled date. This allows users to focus on whether a flower stand FS will be purchased by users during the period before the scheduled date, what attributes the purchased flower stand FS will have, how it will be decorated, and how the display mode for stage effects of the live event performed in the spatial area ER5 during the provision of the event content will change accordingly.

(1-5) The stage effects for the live event performed in spatial area ER5, which may change during the provision of the event content, may be different from the user to another user. This may change with whether the user has purchased and placed a flower stand FS during the period before the scheduled date, as described with reference to FIG. 27C, FIG. 34 and FIG. 35, for example. This enables customization of the display mode of the stage effects for the live event performed in the spatial area ER5 for each user during the provision of the event content, thus giving each user a special feeling.

(1-6) An event that changes the display mode in the spatial area ER5 may be an action in response to a user's purchase operation of a flower stand FS. The action displays and places the purchased flower stand FS in an exhibition area within the spatial area ER5, thus reflecting the purchased flower stand FS there. For instance, this is an example of the action in step S107 of FIG. 28 in which a user purchases a flower stand FS and the action in step S109 where the flower stand FS is placed in a predetermined exhibition area A of the spatial area ER5. This generates an event that changes the display mode within the spatial area ER5 in response to the user's own operation, thereby encouraging the user to operate and improving the user's awareness of participation.

(1-7) One example of the event that changes the display mode within spatial area ER5 is the purchase operation of a flower stand FS, which is an action in response to an operation from another user (e.g., user 1 who is another user for user 2 in FIG. 29 and FIG. 30), and is the action reflected by the display and placement of the flower stand FS in the exhibition area within spatial area ER5. This shows an example of the action that is the purchasing by another user 1. That is, as shown in an example in FIG. 30D, the display device 310 of user 2 displays the flower stand FS1 that would not be displayed unless another user 1 purchased it, and this flower stand FS1, which is a result of the purchase action of another user 1, can be determined randomly by lottery as one of the default flower stands FS to be displayed, and can be displayed in a specified exhibition area A. In this way, another user's operation and action can be an event that changes the display mode in the spatial area ER5. This adds interest to the change in display mode, and thus enhances the interest of the user.

(1-8) An example of the event that changes the display mode in the spatial area ER5 is the fulfillment of a switching condition. The distribution server computer 100 and the viewer terminal 300 each follow a stored program to perform the process of keeping the exhibition of a flower stand FS related to a special user in the spatial area ER5 even if an event occurs that changes the display mode in the spatial area ER5. For instance, the exhibition position of a flower stand FS purchased by a user is determined by lottery from the positions other than the exhibition position of the special user's flower stand FS. Even if the switching condition is met, the exhibition and display of the flower stand FST associated with the special user continues, as shown in FIG. 33. This allows the display mode related to the special user to continue without change, thereby maintaining and improving the convenience and priority of the special user. This also makes it possible to use an object such as a flower stand of a special user for advertising and PR activities. Thus, the management will be able to more easily solicit investments from sponsors who could be an example of special users.

(1-9) As shown in FIG. 24, spatial area ER5 has the sub-area ER53' that is a second virtual space used to provide event content on the scheduled date and the sub-area ER53 that is a part of a first virtual space and has a common (same or similar) display mode with the sub-area ER53'. The distribution server computer 100 and the viewer terminal 300 each follow a stored program and do not display a portal P to restrict the entry into the sub-area ER53', while permitting the entry into the sub-area ER53 during the period before the scheduled date (e.g., until the day before the scheduled date of the event) and the display of an image of the sub-region ER53 in response to an operation from the user. On the day before the scheduled event date and after the open condition is met, the distribution server computer 100 and the viewer terminal 300 close the great gate object 53c leading to the sub-area ER53 to restrict the entry into the sub-area ER53, while displaying the portal P to permit the entry into the sub-area ER53' of the second virtual space to allow an image of the sub-area ER53' to be displayed in response to the user's operation. This allows the area used to be switched depending on whether the open condition is met; before the open condition is met, this configuration provides a virtual space that is an area suitable for the user's action before the provision of the event content, and after the open condition is met, it provides a virtual space that is an area suitable to provide the event content.

(1-10) As shown in FIG. 24, the spatial area ER5 has the sub-areas ER51 and ER52, which are part of the first virtual space, and the user avatar can be seamlessly moved between the sub-area ER51, the sub-area ER52, and the sub-area ER53 in FIG. 24A in the first virtual space (the user avatar is movable between the sub-areas from one sub-area to another in response to the user operation). In contrast, the sub-area ER53' as the second virtual space is formed separately from the sub-areas ER51 and ER52 as part of the first virtual space, and as shown in FIG. 24B, the user avatar is movable between the first virtual space and the second virtual space through the portals P of the sub-area ER53' and sub-area ER52 via a blackout display. This improves the convenience of traffic between the sub-areas ER51, ER52, and ER53 of FIG. 24A, which are in the first virtual space, before the open condition is met. After the open condition is met, the display is darkened before the avatar moves to the sub-area ER53' in the second virtual space, thus giving the user a special feeling or a feeling of tension, and increasing the user's interest.

(1-11) The open condition may be met on the day before the scheduled date of the event content to be provided. This forms a period before the open condition is met, a period after the open condition is met but before the event content is provided, and a period during which the event content is being provided, thereby enhancing the user's interest more gradually.

(1-12) The changeable display mode in spatial area ER5 includes a flower stand FS exhibited in an exhibition area in spatial area ER5, and an event that changes the display mode in spatial area ER5 includes an event in which a user purchases a flower stand FS in the period before the scheduled date to be placed the flower stand FS associated with the user in the selected exhibition area within the spatial area ER5. This makes the user purchase a flower stand FS so that the flower stand FS is placed in their selected exhibition area, thus changing the display mode of the exhibition area during the period before the scheduled date, thereby increasing the user's interest.

(1-13) An event that changes the display mode in the spatial area ER5 includes an event that generates the display mode (decoration such as letters) of the flower stand FS in response to a user operation when placing the flower stand FS. This allows each user to change the display mode of the flower stand FS to be placed in their own original way, thus increasing the user's interest.

(1-14) The changeable display mode within the spatial area ER5 includes a flower stand FS held by a performer avatar that is displayed within the spatial area ER5 while event content is being provided and that is able to act and facilitate the event content, as shown in FIG. 34. This allows the flower stand FS, which can be displayed corresponding to the performer avatar, to change in accordance with the event that occurs during the period before the scheduled date, thus increasing the user's interest due to the event.

(1-15) As shown in FIG. 38, the distribution server computer 100 and the viewer terminal 300 each follow a stored program to perform the process of changing the display mode in the spatial area ER5, in accordance with the number of entering times into the spatial area ER5, which is an example of the degree of displaying an image in the spatial area ER5 in the period before the scheduled date. This allows the display mode within the spatial area ER5 to change with the number of entering times into the spatial area ER5 during the period before the scheduled date, thereby increasing user's motivation and encouraging the user to enter the spatial area ER5 during the period before the scheduled date.

(1-16) The distribution server computer 100 and the viewer terminal 300 each follow a stored program to perform the process of providing the event content to a user on the scheduled date, if the user meets a predetermined condition, such as by purchasing a ticket to participate in the event content, and to allow the user who meets the predetermined condition to enter the spatial area ER5 during the period before the scheduled date and to view a displayed image within the spatial area ER5. This improves user's motivation and encourages user to meet the predetermined condition.

(2-1) The present embodiment is configured so that, also during the period before the scheduled date of the event, the distribution server computer 100 and the viewer terminal 300 each follow a stored program (e.g., a program stored in a non-transitory computer-readable storage medium) to perform the process of enabling the entrance into the spatial area ER5 and displaying an image in the spatial area ER5 in response to a user's operation. As shown in FIG. 37 and FIG. 38, the distribution server computer 100 and the viewer terminal 300 each follow a stored program to perform the process related to the event content in accordance with the number of entering times that is an example of the degree of entering the spatial area ER5 of the virtual space ER where the event content is provided on the scheduled date and displaying an image in the spatial area ER5. The number of entering times does not include the number of entering spatial areas ER other than the spatial area ER5 after logging into the virtual space ER. This allows the spatial area ER5 in which the event content is provided to be shared and provided to users during the period before the scheduled date, and processing related to the event content is performed in accordance with the number of entering times into the spatial area ER5 during the period before the scheduled date. This increases the user's motivation to enter the spatial area ER5 rather than other spatial areas within the virtual space ER to display images within the spatial area ER5, thereby gradually increasing the user's interest in the event content before the event content is provided.

(2-2) The process related to the event content includes, as shown with the stage effects in FIG. 37, the process of changing the display mode within the spatial area ER5 while the event content is being provided in accordance with the number of entering times during the period before the scheduled date. This increases user's motivation to enter the spatial area ER5 during the period before the scheduled date, and also draws the user's attention to how to change the display mode in the spatial area ER5.

(2-3) The process related to event content changes the display mode in the spatial area ER5 during the provision of event content according to the number of entering times; as shown with the stage effects of FIG. 37, the process sets a different stage-effects content in accordance with the number of entering times. This means that the display mode may be different from one user to another according to their number of entering times. This enables customization of the display mode in the spatial area ER5 for each user during the provision of the event content, thus giving the user a special feeling.

(2-4) The changeable display mode in the spatial area ER5 during the provision of event content includes a secret costume of a performance avatar, which is a displayed costume for the performer avatar that is displayed and acts in the spatial area ER5 during the provision of event content, the performer avatar being able to facilitate the event content. That is, the costume of the performer avatar may change during the provision of the event content, in accordance with the number of entering times into the spatial area ER5 during the period before the scheduled date. This enhances the user's motivation to enter the spatial area ER5 during the period before the scheduled date, thereby increasing user's interest.

(2-5) The process related to event content includes, as shown in step S402 in FIG. 38, the process of giving a user one of the items in accordance with their number of entering times. These items are one example of an object that the user can use during the provision of the event content. This enhances the user's motivation to enter the spatial area ER5 during the period before the scheduled date, and draws the user's attention to the items to be given.

(2-6) These items given to a user through the process related to event content can be different from one user to another because different items are set according to their number of entering times as shown with the items of FIG. 37. This allows the users to use different items during the provision of the event content, thereby enhancing the user's interest in the event content.

(3-1) In this embodiment, the distribution server computer 100 and the viewer terminal 300 each follow a stored program (e.g., a program stored in a non-transitory computer-readable storage medium) to perform the process of placing the flower stand FS that has been associated with the user who purchased it in the exhibition area within the spatial area ER5, and the process of changing, of the flower stands FS shown in FIG. 29A, those associated with other users (e.g., other than user 1) and placed in the exhibition area within spatial area ER5 to other flower stands FS in step S203 of FIG. 32 when a switching condition is met, while continuously displaying the flower stand FS associated with the user themselves (e.g., user 1) even if the switching condition is met, as described with reference to FIG. 27C. This allows the flower stands FS to be appropriately reflected within the spatial area ER5 even if there are a large number of flower stands FS to be exhibited and the number of exhibition positions available in the exhibition area is limited. This also allows the flower stands FS associated with other users to be exhibited and displayed relatively evenly within the spatial area ER5, and changes the display mode of these flower stands in the exhibition area within the spatial area ER5, thus increasing the user's interest, while enhancing the user's satisfaction because they can check the flower stands FS associated with themselves.

(3-2) The switching condition may be met when a predetermined time has elapsed, or when a user logs in or enters or leaves the spatial area ER5. This changes a flower stand FS associated with another user to a different flower stand FS without requiring user's previous knowledge (e.g., about the switching method). Thus, this increases the interest of all users in the flower stands FS that can be exhibited and displayed in the exhibition area within the spatial area ER5.

(3-3) As shown in FIG. 27, multiple types of flower stands with different attributes and sizes are provided, and each of the flower stands FS has a defined exhibition area in the spatial area ER5 where it can be placed and exhibited, depending on the type. This allows the appropriate type of flower stand FS to be placed in the exhibition area so as to fit the design, taste, and world view of the spatial area ER5. This also creates a sense of unity in the types of flower stands FS placed in each exhibition area.

(3-4) Flower stands FS can be exhibited and displayed up to the maximum number defined for each exhibition area within the spatial area ER5. The distribution server computer 100 and the viewer terminal 300 each follow a stored program to keep the number of flower stands FS exhibited within the possible upper limit of exhibition, while changing the flower stands FS associated with other users in the display when the switching condition is met, as shown in FIG. 29C and FIG. 29D. This allows the flower stands FS associated with other users to be evenly exhibited in the exhibition area within the upper limit number, and changes the display mode of the exhibition area and the spatial area ER5, thus increasing the user's interest.

(3-5) As shown in FIG. 24, the spatial area ER5 has multiple exhibition areas, in each of which flower stands FS can be placed for exhibition. The distribution server computer 100 and the viewer terminal 300 each follow a stored program to perform the process of placing and exhibiting the user's flower stand FS in the exhibition area designated in response to the user's operation from these exhibition areas, as shown in FIG. 26. This allows the user to place and exhibit their own flower stand FS in the exhibition area to suit their liking, thereby increasing the user's interest.

(3-6) The distribution server computer 100 and the viewer terminal 300 each follow a stored program to perform the process of changing the display mode of the flower stands FS exhibited by decorating them with letters, for example, in response to the user's operation, and exhibiting and displaying them, as shown in FIG. 26. This allows each user to change the display mode of the flower stand FS exhibited in their own original display mode, thus increasing the user's interest.

(3-7) The distribution server computer 100 and the viewer terminal 300 each follow a stored program to exhibit and display flower stands FS while giving a higher percentage of being selected as default flower stands to the users who have purchased more flower stands FS than those who have purchased fewer (e.g., 11 rather than 10, 40 rather than 30). However, for users who have reached a predetermined number of purchased flower stands, regardless of their purchased number more than the predetermined number, the same percentage (e.g., the same percentage as users who have purchased a predetermined number of flower stands) will be used for determination of the default flower stands FS by lottery, and their flower stands will be exhibited and displayed. This encourages a user to purchase an appropriate number of flower stands FS (less than the predetermined number), and also prevents the flower stands FS of a user who has purchased them more than the predetermined number from excessively occupying the default flower stands FS.

Modified Examples

The following is a list of modification examples of the embodiment (including modifications and additions) described above with reference to FIG. 1 through FIG. 38.

(Replay Data)

The distribution server computer 100 may store data on the event content (event data 111) provided in this embodiment so that it can be provided later to the user. The distribution server computer 100 may perform the process of, even after the event content has been provided, providing the data again upon a request from the user (e.g., an operation to purchase replay data, and view the data second time). For instance, while the event content is provided on the scheduled date, the distribution server computer 100 stores, in the storage 103, information to display images in the sub-area ER53' containing performer information such as animation data including motion data of the performer avatar and audio data (e.g., performer avatar information and performer audio distributed in FIG. 10) and that are in response to user operations, event flower stand information illustrated in FIG. 35, and item and stage-effects content information that can be configured in FIG. 38, as the replay data for the event data, and transmits it to the viewer terminal 300 of the user who made a request.

The event flower stand information includes the default information of FIG. 35A determined by lottery for each event content, and information on the flower stand FS purchased by the user who requested re-provision based on the user-related information of FIG. 27C. The item and stage-effects content information includes information that specifies the items to be given and the stage-effects content to be set by the event content-related processing in FIG. 38, in accordance with the number of entering times during the period before the scheduled date for the user who requested provision again.

Receiving the replay data, the viewer terminal 300 replays the data of the event content provided on the scheduled date based on the replay data at any timing selected by the user. The event content is replayed to have the display mode in accordance with the event occurs during the period before the scheduled date. To this end, the viewer terminal 300 specifies a flower stand having the same attribute and size as those of the user's purchased flower stand from among the flower stands specified from the received event flower stand information. The viewer terminal 300 then changes the specified flower stand to the flower stand purchased by the user, and provides stage effects for the event content. In other words, the display mode of the flower stands FS that can be displayed based on the replay data may be different from one user to another depending on their flower stand FS purchased during the period before the scheduled date. This allows the event content to be provided in the display mode that corresponds to the event that occurs in the period before the scheduled date even after the provision of the event content on the scheduled date, thereby increasing user's convenience and interest. Specifically, if a user who was unable to participate in the event content on the scheduled date, they are allowed participate in the event content even after the scheduled date, and if the user purchased a flower stand FS during the period before the scheduled date, they are able to experience the stage effects in accordance with the flower stand FS.

Also for replay of event content, the process related to the event content may be performed in accordance with the number of entering times, which is one example of the degree of displaying an image in the spatial area ER5 during the period before the scheduled date. To this end, the stage-effects content is set to be specified from the item and stage-effects content information that is received as the stage-effects content of the event content, for example, and the item specified from the received item and stage-effects content information is given so that the user can use during the replay event. That is, the display mode of event content based on replay data may be made different from one user to another in accordance with their number of entering times during the period before the scheduled date. This allows the event content to be provided in the display mode that corresponds to the degree that is the number of entering times in the period before the scheduled date, even after the provision of the event content on the scheduled date, thereby increasing user's convenience and interest. Also, the process is performed, which allows the user to use the item in accordance with the user's number of entering times during the period before the scheduled date from among the items available in the event content based on the replay data. This increases the convenience and interest of the user.

(Right to Enter Spatial Area ER5)

The above embodiment describes an example, in which only a user who has the right (e.g., a ticket) to participate in the event content to be provided on the scheduled date is permitted to enter and participate in the spatial area ER5 during the period before the scheduled date. The present invention is not limited to this. Even if a user does not have the right to participate in the event content to be provided on the scheduled date, they may be permitted to enter spatial area ER5 during the period before the scheduled date and be able to act freely within spatial area ER5, such as purchasing flower stands FS and viewing the exhibition area. Although the user is not allowed to participate in the event content unless they have the right to participate (e.g., entry into the sub-area ER53' is restricted), they are allowed to enter the spatial area ER5 during the period before the scheduled date, and walk around and experience the spatial area ER5, for example. This increases the user's interest in the event content and motivates the user to acquire the right to participate in the event content. There is no right to participate in the event content, and any user who is able to participate in the virtual space ER may be able to participate in the event content on the scheduled date and may also be able to enter the spatial area ER5 in the period before the scheduled date.

(Display Balance of Flower Stand Attributes in Exhibition Area)

The above embodiment describes an example, in which the flower stands FS to be changed when the switching condition is met in step S202 of FIG. 32 are determined randomly by lottery. The present invention is not limited to this, and the flower stands FS to be exhibited in the spatial area ER5 may be determined by lottery so that the number of attributes associated with the flower stand FS is approximately equal among the attributes. As mentioned above, the attributes "cherry blossom," "demon," "white fox," and "black fox" are the attributes and colors associated with the performer avatars that appear as facilitator characters during the provision of event content. Assume the example, in which there are 80,000 positions within the spatial area ER5 where flower stands with the attributes "cherry blossom," "demon," "white fox," and "black fox" can be displayed. In this case, the number of positions where each attribute can be displayed is calculated to be 20,000. This means that when the switching condition is met, the flower stands FS may be changed by lottery so that 20,000 flower stands are determined for each attribute. That is, a flower stand FS has one of the motifs (attributes) associated with it, as shown in FIG. 27, and the distribution server computer 100 and the viewer terminal 300 each may follow a stored program to perform the process of determining by lottery the default flower stands FS so that the number of attributes associated with the exhibited flower stands FS is approximately equal among the attributes. Thus, the flower stands of the four attributes may be approximately evenly exhibited in the entire spatial area ER5. This allows the attributes of the flower stands exhibited in the spatial area ER5 to be displayed in a well-balanced manner, preventing an excessive emphasis on any one attribute. Also focusing on each exhibition area, the number of attributes associated with the flower stands FS exhibited in one exhibition area may be substantially equal among the attributes. In other words, the number of the flower stands of the four attributes may be substantially equal for each exhibit area.

Exhibition areas with a predetermined upper limit may be provided in number corresponding to the number of attributes, and an attribute may be associated with each exhibition area; for instance, in the first exhibition area, flower stands may be determined by lottery from only those with the attribute "cherry blossom", in the second exhibition area, they may be determined by lottery from only those with the attribute "demon", in the third exhibition area, they may be determined by lottery from only those with the attribute "white fox", and in the fourth exhibition area, they may be determined by lottery from only those with the attribute "black fox." This allows the flower stands FS associated with each attribute (especially the attribute of the performer avatar appearing during the provision of event content) to be displayed in a well-balanced manner in the spatial area ER5. In addition, the user will browse the exhibition area of flower stands related to the attributes of their favorite performer avatar, so that they are allowed to efficiently browse the flower stands related to the attributes of the favorite performer avatar. The above describes an example, in which the number of only certain attributes (attributes "cherry blossom", "demon", "white fox", and "black fox") is substantially equal. The present invention is not limited to this, and all the attributes, including plain and gorgeous, may be substantially equal in number. Note that the flower stands FS purchased and placed by a user may increase the number of attributes associated with the flower stands FS purchased by the user in the virtual space. In this case, taking into consideration the attributes of the flower stands FS purchased by the user, a lottery may be conducted for each user so that the display balance can be substantially uniform among the attributes within the range of the upper limit of the flower stands FS that can be exhibited in the exhibition area (or in the spatial area ER).

The ratios that are determined by lottery and displayed may be predetermined for each attribute. For instance, the ratio of displaying the attribute "plain" shown in FIG. 27A in the spatial area ER5 may be 5%, while the ratio for "gorgeous" may be 15%, and those for "cherry blossom", "demon", "white fox", and "black fox" may each be 20%. (Probability of being Determined as Default Flower Stands)

Figure 39:
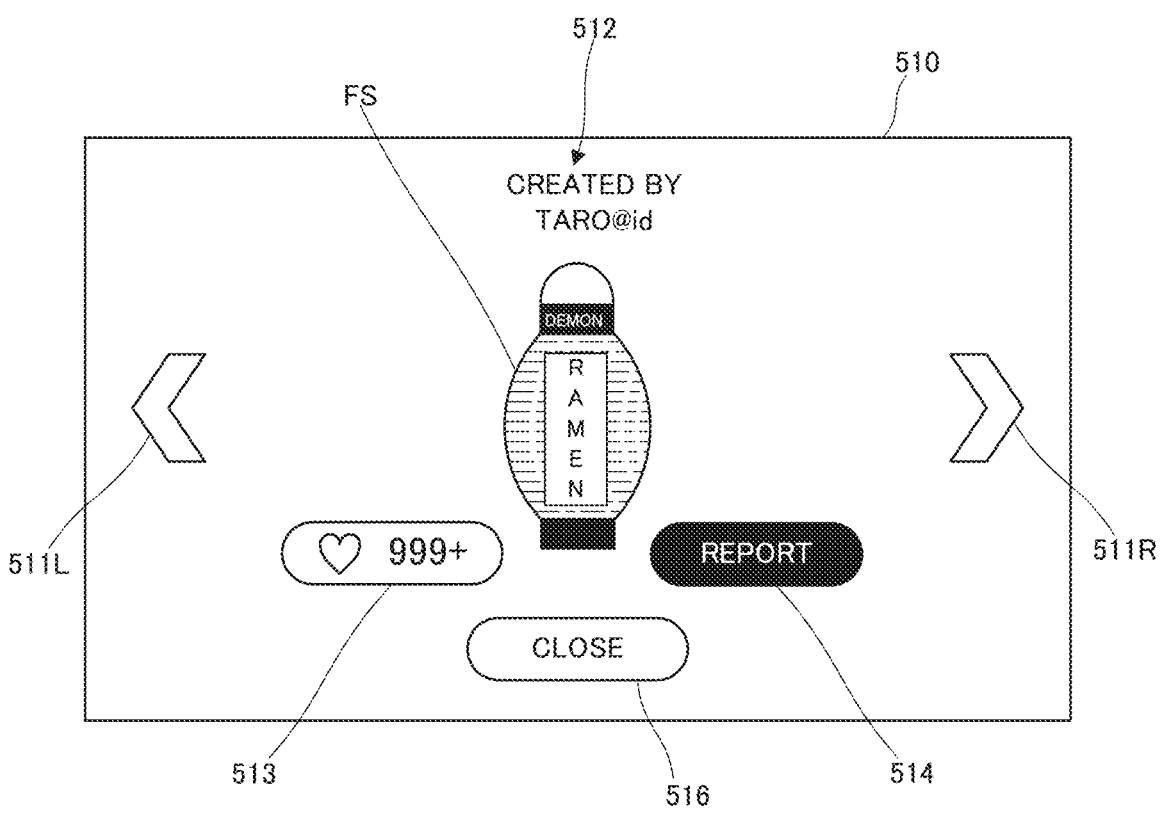
FIG. 39 shows an example screen with which a user performs an action on an object displayed in a predetermined type of virtual space according to one embodiment of the present invention.

The above embodiment describes an example, in which when the switching condition is met, the probability of being determined randomly by lottery at step S203 of FIG. 32 as default flower stands F is uniform among the flower stands FS. The present invention is not limited to this, and the probability of being determined as the default flower stands FS may be varied with a parameter specific to a flower stand FS, or a flower stand FS may not be selected as the default flower stands FS when the switching condition is met (e.g., it may be excluded from the target of lottery). Referring to FIG. 39, the following describes an example of changing the probability for each flower stand FS that is determined as default flower stands FS. Each user may be allowed to perform a like action or a report action on the flower stand FS associated with another user displayed in the spatial area ER5. The like action is to express favorable impressions, for example, operating an icon such as "Like" (heart mark) to indicate favorable impressions of another user's flower stand FS. The report action is to express the opinion that something to be displayed in the spatial area ER5 is inappropriate. For instance, this reports offensive words (comments) displayed on another user's flower stand FS to the management.

FIG. 39 is an example of a close-up image 510 of a flower stand FS. The close-up image 510 is an image displayed on the display device 310, and is triggered by approaching or operating the flower stand FS exhibited in the exhibition area with the viewer terminal 300, for example. This image is displayed based on the information transmitted from the distribution server computer 100, and is capable of displaying the details of each flower stand FS. The close-up image 510 in FIG. 39 displays one of the flower stands FS placed within the exhibition area, and other flower stands FS within the exhibition area can be displayed by operating the left and right buttons 511 (511L, 511R). This close-up image 510 displays a like button 513 for a like action, a report button 514 for a report action, and a close button 516 to close the close-up image 510. The close-up image 510 also displays creator information 512 (user information) as the detailed information. This may motivate a user to take a like action, if the flower stand FS was purchased and created by a celebrity or friend's account. It may also motivate a user to take a like action toward a flower stand FS that has a funny or interesting message.

In response to the operation with the like button 513, the viewer terminal 300 transmits a like information to the distribution server computer 100, where the like information specifies the flower stand FS that is the target of the like action. Receiving the like information, the distribution server computer 100 updates and stores the number of likes (like history) of the flower stand FS as the target of the like action, among the flower stands FS stored in the object data 122. In response to the updating of the number of likes, the close-up image 510 adds one to the number of likes of the flower stand FS for updating and displays it.

The distribution server computer 100 may refer to the number of likes for each flower stand FS to determine the default flower stands FS to be exhibited by lottery when the switching condition is met, and may change the probability to choose the flower stands FS in accordance with the number of likes. For instance, if there are 1 million flower stands FS that are a target of the lottery, the probability of choice would normally be 1 in 1 million, but the probability of choice may be gradually increased with the number of likes. For instance, the probability may increase to 10/1 million if the number of likes is between 100 and 999, and to 100/1 million if the number of likes is between 1,000 and 2,999.

That is, the distribution server computer 100 and the viewer terminal 300 each follow a stored program to perform the process of receiving like information that specifies like actions from users to a flower stand FS, thus updating the like history for the flower stand FS and, based on the like history for each flower stand FS, adding the number of likes by 1 when displaying the flower stand FS, and making the flower stand FS to be more likely displayed as default flower stands. This provides the user with an interesting experience in that the display of the flower stand can be controlled based on the like history. This also provides the user with the fun of acquiring like actions, and also improves the user's interest because they can experience reactions from other users.

If there is any flower stand FS for which a restriction condition has been met, then the distribution server computer 100 may exclude this flower stand FS from the target of lottery in step S203 of FIG. 32. This restricts this flower stand FS from being chosen and exhibited as default flower stands FS (i.e., restricts the flower stand from being displayed to users other than the user having this flower stand FS). For instance, this restriction condition is met when the management checks the number of report actions and the text of the flower stand, and they determine that the flower stand should be non-displayed. When the user operates the report button 514, the viewer terminal 300 transmits report information to the distribution server computer 100 to identify the flower stand FS that is to be reported. Receiving this report information, the distribution server computer 100 updates and stores the number of reports (report history) of the flower stand FS that is to be reported among the flower stands FS stored in the object data 122. The restriction condition may be met when the management sets it to be non-displayed according to the updated number of reports, or the distribution server computer 100 may determine whether or not the number of reports has reached a predetermined number, and if it reaches the predetermined number, non-display setting may be made automatically and the condition may be met. This restricts any flower stand FS associated with another user for which the restriction condition is met from being determined as the default flower stand and displayed, thus preventing this flower stand FS from being exhibited in the exhibition area and providing a comfortable spatial area ER5 for users.

Even if there is any flower stand FS for which the restriction condition is met, the display device 310 of the user who purchased and has this flower stand FS may still display this flower stand continuously in the exhibition area within the spatial area ER5 (this may be called a "shadow-ban"). This prevents the user who purchased the flower stand FS from losing their interest, and also makes it difficult for the user to tell that the restriction condition is met for their flower stand FS. In addition to or instead of reporting, the viewer terminal 300 of the user who has reported about the flower stand may not display the flower stand even before the restriction condition is met. If there is any action of non-displaying, the distribution server computer 100 may accumulate the number of non-displaying, and when the number of non-displaying reaches a predetermined number, it may set not to display the flower stand for all users. If there is any action performed for non-displaying, the distribution server computer 100 and viewer terminal 300 each follow a stored program to determine by drawing another flower stand to be exhibited instead.

Note that the target of lottery in step S203 of FIG. 32 may include only the flower stands FS that have passed the screening to determine whether they contain taboo-word comments or inappropriate comments, and flower stands FS that are determined to contain such comments may be excluded from the target of lottery. For instance, the screening may be carried out by visual inspection by an administrator, and any flower stand FS that is determined to contain these comments may be flagged so that it is not eligible for the lottery; alternatively, the text may be extracted and the screening may be carried out automatically, and any flower stand FS that is determined inappropriate may be flagged as such. Not only in the lottery when the switching condition is met, but also in the lottery in step S301 of FIG. 36A, the probability of being determined as the default flower stands may vary with the parameter specific to the flower stand FS (e.g., the number of likes), or a flower stand FS for which the restriction condition is met may not be determined as default flower stands FS.

(Event that Changes Display Mode in Virtual Space)

The above embodiment describes purchase and placement of a flower stand FS in response to user's operation that is an example of an event that changes the display mode in spatial area ER5 (the display mode of a flower stand FS in the exhibition area during the period before the scheduled date and of a flower stand FS that the performer avatar holds during the provision of event content). Specific objects used for an event that change the display mode in the virtual space are not limited to flower stand FS, and may be an object that imitates a light-emitting glow stick or a fan, or an object that can be placed (installed) within the spatial area ER5. Examples include an object that imitates flowers, a clock, a hedge, a fence, a signboard, or a notice-board within a shrine. The above describes an example of these specific object that is an object that the performer avatar can hold in their hand while the event content is being provided, and the specific object is not limited to this. They may be an object that a user avatar (viewer avatar) can use, or an object that can be placed (installed) within the spatial area (sub-area ER53') where the event content is provided.

Events that change the display mode within the virtual space are not limited to those that occurs due to the placement of specific objects. Instead or in addition to this, various activities may be prepared within the spatial area ER5 and may occur depending on the result of activities played by the user during the period before the scheduled date. Such an activity may be playable for a limited period of time before the scheduled date (or until the event content is provided at the event time). Examples of the activity include a game, a mission, and a test of luck that are carried out within the spatial area ER5. For instance, they include the activities performed in the game area of FIG. 24, including a game that can be played in a short time, such as lottery games, search missions to find specified items, and tests of luck such as fortune telling and offerings. Depending on the results of the games, search missions, and tests of luck during the period before the scheduled date, certain right (benefit) may be associated with the user who experienced the activity, where the right (benefit) includes granting of the above-mentioned flower stand FS or the items shown in FIG. 37, or a change in the stage effects when the event content is provided. The items acquired as a result of the activity may be saved in an item box, for example. For instance, the right (benefit) is not limited to objects, and may include voice data of the performer avatar. Depending on the results of the games, search missions, and tests of luck during the period before the scheduled date, the display mode within the spatial area ER5 may be changed on the display terminal 300 of the user who experienced the activity. In this way, experiences of various activities may be prepared in the predetermined type of virtual space where the event content is provided in the period before the scheduled date. This generates an event in the virtual space in the period before the scheduled date and thus enhances the mood of users until the scheduled date when the event content is provided.

Events that change the display mode within the virtual space are not limited to those that occur in response to operations from the user. Instead or in addition, they may be the events that occur when the user is in the virtual space and the occurrence condition is met, regardless of operations from the user. For example, an event may occur when a user who has entered spatial area ER5 is given a specific object after a predetermined time has passed since entering and the user places the object within spatial area ER5, or the event may occur when a predetermined time has passed since entering, or an event may occur for a user who has entered spatial area ER5 and wins a random lottery, for example, at predetermined time intervals (it is not considered an event has occurred for users who do not win the lottery).

(Target of Display Mode Change During Period Before Scheduled Date in Accordance with Event that has Occurred)

The above embodiment describes an example in which the display mode of a flower stand FS placed in the exhibition area in the spatial area ER5 during the period before the scheduled date changes in accordance with an event that occurs during the period. The target of change is not limited to this, as long as they may be in the spatial area ER5. For instance, the target of change in accordance with an event occurs during the period before the scheduled date may be the type or number of objects such as buildings and ornaments placed within the spatial area ER5 during the period, the positions of buildings and ornaments placed within the spatial area ER5 during the period, or the number of areas in the spatial area ER5 during the period (e.g., a sub-area ER54 connected to the sub-area ER51 may be added, making it possible for the user to enter the sub-area ER54). Note that, in this case, only sub-areas ER51 and ER52 among the multiple sub-areas in spatial area ER5 may be subject to the change, and the display mode of sub-area ER53, which is associated with the area where event content is provided, may not be changed in accordance with an event. Even in this configuration, the display mode will change only on the viewer terminal 300 of the user who generated the event during the period before the scheduled date. This means that the display mode may be different from that for other users in accordance with the events that they generated during the period.

(Target of Display Mode Change During Provision of Event in Accordance with Event that has Occurred)

The above embodiment describes an example in which the display mode of the flower stand that the performer avatar holds in their hand, which is one of the stage effects during the provision of event content, changes in accordance with the event occurs during the period before the scheduled date. The target of change is not limited to this, as long as they may be in the spatial area ER5. For instance, the target of change in accordance with an event occurring during the period before the scheduled date may be a costume object of the performer avatar, as illustrated by the "secret costume" stage effect that is set at the seventh entry in FIG. 37. The target of change in accordance with an event that occurs during the period before the scheduled date may be display of the name of a user who purchased a flower stand FS during the period before the scheduled date in the ending credits at the end of the event content. In this case, the users may be displayed in order of the amount of purchases by them or the number of purchases made by them, and the size of the user name displayed in the ending credits may vary with the amount of purchases or the number of purchases (the larger the amount of purchases by them or the number of purchases, the larger the size of the user name displayed). The target of change in accordance with an event that occurs during the period before the scheduled date may be a stage effect of displaying a large number of flower stands FS in the virtual live venue. For instance, flower stands FS in large quantities, which will double in number all the flower stands FS purchased by users during the period before the scheduled date (for users who have not purchased, the default flower stands FS will be displayed), are made float like jet balloons. This makes the event content have a more exciting stage effect. Also in this configuration, the display mode will change only on the viewer terminal 300 of the user who generated the event during the period before the scheduled date. This means that the display mode may be different from that for other users in accordance with the events that they generated during the period.

(Degree of Displaying an Image in a Predetermined Type of Virtual Space During Period Before the Scheduled Date)

The above embodiment describes an example of the degree of performing the event content related process that is the number of entering times into the spatial area ER5 where the event content may be held on the scheduled date. The present invention is not limited to this, and the degree may be the time spent in the spatial area ER5, the ratio of the number of days spent in the spatial area ER5 to the number of days before the scheduled date, the ratio of the time spent in spatial area ER5 to the total time of the period before the scheduled date, the ratio of the number of entering times into the spatial area ER5 or the time spent there to the number of entering times into the virtual space ER or the time spent there during the period before the scheduled date, the length of time taken from the previous entry to the current entry during the period before the scheduled date.

(Event Content Related Process in Accordance with Degree of Displaying)

The above embodiment describes an example, as shown in the stage effects of FIG. 37, of the process to change the display mode in the spatial area ER5 according to the degree, and the stage effects such as images of a live venue set and costumes of performer avatars are changed. The target of the process of changing the display mode in the spatial area ER5 according to degree is not limited to this. For instance, the name of a user who entered the area during the period before the scheduled date may be displayed in the ending credits at the end of the event content. In this case, the users may be displayed in the descending order of the number of entering times, and the size of user name displayed in the ending credits may vary with their number of entering times (the larger the number of entering times, the larger the size of user name displayed). It may be a stage effect of displaying a large number of flower stands FS in the virtual live venue. For instance, flower stands FS in number corresponding to the number of entering times (for users who have purchased, the purchased flower stands FS, while for users who have not purchased, the default flower stands FS) are made float like jet balloons. In this way, the display mode of stage effects and jet balloons may be changed in a different manner from one user to another. This means that the display mode on the viewer terminal 300 may be different from one user to another in accordance with their degree. For another stage effect, a room with a different display mode may be associated with each number of entering times, and the type of room set may be different with the number of entering times (e.g., there are several different types of special rooms with different display modes, and event content is provided in a special room according to the number of entering times). For another stage effect, a costume of performer avatar in a different display mode may be associated with each number of entering times, so that a different type of costume (display mode) can be set for each number of entering times.

The above embodiment describes an example of a target of the process to change the display mode in the spatial area ER5 in accordance with the degree. In this example, an item that a user can use during the event content is given as an object in accordance with the degree, as shown with the items of FIG. 37. The target of an object given in accordance with the degree is not limited to this, and may be an object that imitates a light-emitting glow stick or a fan, or an object that can be installed within the spatial area ER5. Examples include an object that imitates flowers, a clock, a hedge, a fence, a signboard, or a notice-board within a shrine. The object may be the one that the performer avatar can hold in their hand while the event content is being provided, may be the one object that a user avatar or viewer avatar can use, or may be the one that can be installed within the spatial area (sub-area ER53') where the event content is provided.

(Display Mode Transition of Specific Object in Virtual Space)

In the above embodiment, the flower stand switching process illustrated in FIG. 29 through FIG. 32 is not limited to the process that is performed during the period related to the event content to be provided on the scheduled date. The process may be applied to the case where a specific object associated with a user or a specific object associated with another user is placeable in a virtual space, regardless of whether or not there is event content to be provided on the scheduled date. For instance, a virtual space may be provided, where creative content (e.g., art, derivative works, in-game works, links to original virtual spaces (e.g., where user-created buildings exist)) created by a user and creative content created by another user can be shared and displayed, and the flower stand switching process illustrated in FIG. 29 through FIG. 32 may be executed in such a virtual space. Thereby, the creative content created by another user may be displayed by switching when the switching condition is met. This allows users to view and experience the creative content created by various users without prior knowledge, thus increasing interest in the virtual space. Note that the objects placed in the exhibition area in response to the operation with the view terminal 300 of the user may include an object with pre-determined designs that the user is not allowed to edit (to edit the content). This allows the user to view their own specific object at any time even when the number of specific objects that can be placed and displayed in the virtual space is limited, thereby enhancing the user's satisfaction. Meanwhile, this allows the specific objects associated with other users to be displayed evenly in the virtual space, and changes the display mode of the virtual space to enhance the user's interest, and reflects a large number of specific objects appropriately.

(Area to Place Specific Objects)

The above embodiment describes an example in FIG. 27, where flower stands FS, which are an example of the specific objects, have determined areas to be placed in accordance with their sizes. The flower stands FS have several types of attributes defined as well as sizes. Therefore, the areas of placing the flower stands FS may be determined differently for each attribute of the flower stands FS, instead of or in addition to the size of the flower stands FS. This further enhances the sense of unity for each area.

(Another Form of Data Transmitted to Viewer Terminals)

The above embodiment describes an example of transmitting the default flower stand information (step S205 in FIG. 32, step S302 in FIG. 36A) in the flower stand switching process of FIG. 32 and the event flower stand determination process of FIG. 36, and information for specifying the flower stand FS associated with each user based on the user-related information of FIG. 27C (step S207 of FIG. 32, step S303 of FIG. 36A) to the user, and rewriting the flower stand information used in the exhibition area and for the stage effects of the event content on the viewer terminal 300. The present invention is not limited to this, and the distribution server computer 100 may transmit, to each user, default flower stand information that is updated for each user based on FIG. 27C. That is, the distribution server computer 100 may generate and transmit different information for each user according to the user's flower stand FS, and the viewer terminal 300 may display the flower stand FS corresponding to the user based on the information.

(Items that can be Used During the Provision of Event Content)

As illustrated in FIG. 37, the above embodiment describes an example of the items (objects) that can be used during the provision of event content, including crackers, fireworks, glow sticks, and stamps. These items, whether used or not, may be displayed in the virtual space ER, for example, in a room of a house built by the user. Alternatively, these items may be displayed as a memento in an item box displayed in the virtual space ER even after it has been used. This allows users to keep the limited items and other items corresponding to the event content provided (held) as memories, increasing their attachment to the event content.

(Other Effects on Event Content from Events Occurring in the Period Before Scheduled Date)

The above embodiment describes a change in display mode of a specific object that is an example of the display mode that changes in the virtual space during the provision of event content in accordance with an event that occurs in the predetermined type of virtual space during the period before the scheduled date. The present invention is not limited to this. For instance, a user who purchased a flower stand FS during the period before the scheduled date and places it within the spatial area ER5 may be given a certain right (privilege) in accordance with the purchase amount or the number purchased (number of placement). For instance, the certain right (privilege) may be the right to extend the time of the event content provided (e.g., the right to participate in a talk after the event), the right to watch the event content live from a dedicated virtual camera that the user can operate, or the right to participate in a special area.

(Example of Scheduled Date)

The above embodiment describes an example of the event content that is distributed (provided) at the scheduled time on the scheduled date (predetermined date and time) according to the event data. For instance, the scheduled date may be the entire date on which a live event is scheduled to be held (e.g., from midnight to 23:59 on April 5th), or a period of several days (e.g., from 9:00 on May 1st to 21:00 on May 5th). The event content may be scheduled for a period of several days and may be comprehensive event content where multiple pieces of content (e.g., live events, talk shows) are provided (e.g., festival events over several days). In this case, the display mode in a predetermined type of virtual space that provides the multiple pieces of content may change in accordance with an event that occurs during the period before the scheduled date for each of the multiple pieces of content to be provided during the comprehensive event content.

(Period Before the Scheduled Date)

The above embodiment describes an example of the period before the scheduled date that is the period until the day before the scheduled date when the event content is provided. The period before the scheduled date is not limited to this as long as it is any period before the event content is provided. For instance, it may be two days or a predetermined number of days before the scheduled date, or it may be a timing during the scheduled day when the event content is provided, including one hour, 10 minutes or 1 minute before the scheduled time. For instance, the display mode in a predetermined type of virtual space may change in accordance with an event that occurs in the predetermined type of virtual space up to several hours before the event content is provided. For instance, a flower stand FS purchased by a user up to two hours before the start of a live event in the spatial area ER5 (e.g., 7 PM) can be displayed in the spatial area ER5, and the purchased flower stand FS may be used in the stage effects during the event shown in FIG. 34.

(Portal P)

The above embodiment describes an example in which when it is a specific period of time before the scheduled date of the event content, and thus the open condition is met, the transition to the sub-area ER53' is allowed via portal P in FIG. 24B. For instance, this portal P may appear in front of the great gate object 53c in the sub-area ER52 when it is a specific period before the scheduled date (the day before the scheduled date during the period before the scheduled date) (when the open condition is met). Alternatively, the portal P may exist prior to the specific period (e.g., prior to the day before the scheduled date), but may not function as the portal P to allow the transition to another area until it is the timing at the specific period before the scheduled date (e.g., on the day before the scheduled date). When returning to the sub-area ER52 after transitioning to the sub-area ER53', the user avatar U may be able to transition to the sub-area ER52 via the portal P close to the sub-area ER53' in FIG. 24B, for example, so that the user avatar U is allowed to move back and forth between the first virtual space and the second virtual space.

The above embodiment describes an example in which a user who has been in sub-area ER53 is moved out of sub-area ER53 a specific period before the scheduled date (the day before the scheduled date) (e.g., user avatar U is forcibly moved out of sub-area ER53). The present invention is not limited to the case where all users are moved out of sub-area ER53 without exception a specific period of time before. It may control so that a user who is in a predetermined state is moved out of sub-area ER53 (an image of the virtual space other than sub-area ER53 is displayed) after the termination condition is met. For instance, a user whose flower stand FS is displayed in the exhibition area within sub-area ER53 (e.g., displaying the screen of FIG. 39) may be considered to be in the predetermined state, and when the display of screen such as FIG. 39 ends, the termination condition may be met and the user may be moved out of sub-region ER53.

(Open Condition and Specific Period)

The present embodiment describes an example in which the open condition is met when it is a specified period before the scheduled date when the event content is provided, and describes the day before the scheduled event date that is an example of the specified period. The specific period before the scheduled date when the open condition is met is not limited to this, and may be a period of two days or a specific number of days before the scheduled date. The specific period is not limited to a period related to the number of days or time. For instance, it may be a period after the timing when the number of users who have entered the spatial area ER5 reaches a specified number, or a period after the timing set by the management taking into consideration the situation.

(Second Virtual Space after Event Content Ends)

The above embodiment describes an example of the event content that is provided in sub-area ER53', which shares the same display mode as sub-area ER53. This sub-area ER53' may be set so that a user avatar U is not allowed to enter after the event content ends or after a predetermined time has elapsed since the end of the event content. For instance, if a live event is held in sub-area ER53' and 30 minutes have passed since the live event ended, a user avatar U still existing in area sub-ER53' may be forcibly transitioned (moved) out of sub-area ER53' (e.g., moved in front of the great gate object 53c in sub-area ER52 with a blackout effect). The sub-area ER53' may be managed by a server supporting heavy loads of the event content provided. In this case, this configuration prevents the server being used more than necessary, and enabling cost reduction. After a predetermined amount of time has elapsed (e.g., until 30 minutes or one hour has passed) since the end of the event content provision, the user avatar U may be moved. This provides time for the user to feel the lingering effects of the event.

Sub-area ER53 has been inaccessible since the specified period before the scheduled date when the event content is provided. This sub-area ER53 will be accessible again after the provision of event content ends. For instance, when sub-area ER53' becomes inaccessible (e.g., 30 minutes after the end of a live event), the portal P leading to sub-area ER53' disappears, making it impossible to move to sub-area ER53', and the virtual space (sub-areas ER51, ER52, ER53) before the specific period returns to the state in which seamless movement therebetween is possible (the gate of the great gate object 53c leading to sub-area ER53 is open). Even if a specific period has elapsed since the end of the event content, portal P may not be displayed in sub-area ER52 to a user who left sub-area ER53'. For instance, the gate of the great gate object 53c leading to sub-area ER53 may be opened to the user.

(Event Venue after Event Content Ends)

The above embodiment describes an example in which sub-area ER53 has a stage and others (e.g., virtual stages G, G2) displayed in the same manner as the virtual live venue of FIG. 13 and FIG. 34 that is constructed in sub-area ER53', and reflects the virtual live venue that is gradually constructed during the period before the scheduled date. In addition to or instead of this, after the event content ends, the virtual live venue in sub-area ER53 may appear in a completed state in which the event content has been provided. For instance, it may be in an unfinished mode before the event content is provided, but after the event content ends, it may display the objects at the venue where the live event was held, such as in FIG. 34. This allows users to feel the lingering effects of the event content even after the event content has ended. The objects of the virtual live venue may not be displayed in sub-area ER53 during the period before the scheduled date, and data may be distributed to users every predetermined time to display the state of gradually increasing venue objects in sub-area ER53' between the specific period before the time of the event and the event starting time. That is, the venue objects are not placed (displayed) in sub-area ER53, and the venue objects are placed (displayed) only in sub-area ER53'.

(Example of Switching for Specific Objects in Exhibition Area)

The above embodiment describes, as illustrated in FIG. 29D and FIG. 30D, an example in which when the default flower stands FS for exhibition area A, which are determined by lottery and stored when the switching condition is met, happens to include the flower stand FS1 purchased by user 1 at position A6 in the exhibition area A, priority is given to the user related information in FIG. 27C and flower stand FS1 is continuously displayed at position A1 on user 1's display device 310 as shown in FIG. 29D, and the flower stand FS at position A6 is changed to the flower stand FS that was determined by default at position A1. The present invention is not limited to this, and if the default flower stands FS include flower stand FS1 purchased by user 1, the flower stands FS determined by default may be displayed (i.e., the flower stand FS1 purchased by user 1 is displayed at position A6 determined by default). Also, while continuing to display the flower stand FS1 at position A1, the flower stand FS1 may also be displayed at position A6 that has been determined as the default. This allows the user to view the flower stand FS at multiple positions that they have purchased, thereby improving the user's satisfaction.

The above embodiment describes, in step S203 of FIG. 32, an example of determining default flower stands FS for each exhibition area randomly by lottery from among all the flower stands FS that are a target of the lottery. In this case, the flower stands FS that are a target of the lottery include a flower stand FS that was determined as the default flower stand FS and was on display before the switching, and thus as shown in FIG. 29C, the flower stand FS with the letter G that was displayed before the switching may by chance be displayed also after the switching. In another embodiment, if the same flower stand FS happens to be chosen both before and after the switching, then lottery was conducted again for the flower stand FS in question so as not to display the same flower stand FS before and after the switching, and the table of the default flower stand information in the object data 122 of FIG. 31A and FIG. 31B may be updated. Alternatively, the flower stand FS that was determined and exhibited as the default flower stand FS before the switching may be excluded from the lottery target, and after the switching, all the flower stands FS may be changed to different ones from those before the switching.

The above embodiment describes an example, in which a determination is made in step S101 of FIG. 28 whether or not it is a purchasable period before the scheduled date at the time of purchase of a flower stand FS, and a determination is made in step S201 of FIG. 32 whether or not it is a displayable period before the scheduled date for the flower stand FS. These purchasable period and displayable period may or may not coincide with each other. For instance, the purchasable period may be set as from 7 days to 4 days before the scheduled date, and the displayable period of the flower stand FS purchased during the purchasable period may be set as from 3 days to the day before the scheduled date.

[Addendum 1]

A system that distributes content via a network has been known. For instance, JP 2012-120098 A discloses a distribution system that allows a performer to hold an event such as a live performance in a virtual space on the web, while allowing a viewer to operate a viewer avatar (to move, give gifts, perform social tipping, and perform other actions) so that the viewer is able to participate in the event.

The conventional distribution system is configured to allow performers and viewers to generate an event while the live event is being held, thus livening up the live event and raising the participant's awareness of the participation. This enhances their interest in the live event. This system, however, does not take measures to enhance the viewers' interest in the live event before it begins. This has resulted in problems such as the inability to gradually increase the interest in event and other activities.

In view of the above, the present invention described in the above embodiment and modified examples provides a method and a system that are capable of increasing the interest in live event gradually, and may have the following configuration.

(1) A computer control method according to one aspect of the present invention controls a computer (e.g., distribution server computer 100 and viewer terminal 300) that is configured to provide a virtual space to a user, and the method includes:

a displaying step of displaying an image in a generated virtual space, the image being in accordance with an operation by the user (e.g., a virtual space update data distribution process, a viewer's viewpoint image output process);

a providing step of providing event content in a predetermined type of virtual space (e.g., in spatial area ER5) of the virtual space on a scheduled date (e.g., virtual space update data distribution process using event data 111, viewer's viewpoint image output process), wherein also during a period before the scheduled date (e.g., the period up to the day before the scheduled date of the event), the displaying step displays an image in the predetermined type of virtual space in response to an operation by the user (e.g., the user is allowed to enter the spatial area ER5 and view a displayed image in spatial area ER5), and the method further includes a step of performing an event-content related process (e.g., changes the stage effect of the live event in step S403 in FIG. 38 in accordance with the stage effect of FIG. 37, or gives an item object of FIG. 37 that can be used in the live event in step S402 in FIG. 38) in accordance with a degree (e.g., the number of entering times into spatial area ER5 (e.g., number of days) or the duration of stay, the time of displaying spatial area ER5, and the number of displaying times of spatial area ER5) to which an image in the predetermined type of virtual space is displayed by the displaying step during the period before the scheduled date.

This configuration shares the predetermined type of virtual space in which event content is to be provided with the user during the period before the scheduled date, and performs the event content related process in accordance with the degree to which an image in the predetermined type of virtual space in the virtual space is displayed during the period before the scheduled date. This increases the user's motivation to display an image in the predetermined type of virtual space, thereby gradually increasing the user's interest in the event content before the event content is provided.

(2) In (1), the event content related process includes a process of changing the display mode in the predetermined type of virtual space while the event content is being provided in accordance with the degree (e.g., the stage effects of the live event is changed to the stage effects in FIG. 37 in accordance with the number of user's entering times in step S403 in FIG. 38).

This configuration changes the display mode in the predetermined type of virtual space while the event content is being provided in accordance with the degree to which an image in the predetermined type of virtual space is displayed during the period before the scheduled date. This increases the user's motivation to display an image in the predetermined type of virtual space, and also draws the user's attention to how the display mode in the predetermined type of virtual space changes.

(3) In (2), the display mode in the predetermined type of virtual space while the event content is being provided, the display mode being changed by the event content related process in accordance with the degree, may be different from the display mode for another user in accordance with the degree (e.g., a different stage effect is associated with the corresponding number of entering times as shown in FIG. 37, meaning that a stage effect may differ from one user to another in accordance with their number of entering times).

This configuration enables customization of the display mode for each user in the predetermined type of virtual space during the provision of event content, thus giving each user a special feeling.

(4) In (2), the display mode in the predetermined type of virtual space that is changed by the event content related process during provision of the event content includes the display mode of a specific object (e.g., flower stands FS held by performer avatars 1*a* to 1*d* in FIG. 34 and an operator avatar, or a costume object worn by the performer avatar that is the stage effects corresponding to the number of entering times of 7 days shown in FIG. 37) that is displayed corresponding to a facilitator character (e.g., performer avatars 1*a* to 1*d* in FIG. 34), the facilitator character facilitating the event content and being displayed and acting in the predetermined type of virtual space while the event content is being provided.

This configuration changes the display mode of a specific object that can be displayed corresponding to a facilitator character during provision of the event content in accordance with the degree to which an image in the predetermined type of virtual space is displayed during the period before the scheduled date, thereby improving the user's motivation to display images in the predetermined type of virtual space during the period before the scheduled date, and thus enhancing the user's interest.

(5) The method in (2) includes a storing step of storing information that enables the event content provided by the providing step to be provided again (e.g., storing, in storage 103, event data 111 that enables the event provided on the scheduled date to be replayed), wherein the providing step provides the event content provided on the scheduled date based on the information stored by the storing step in response to a request from the user, even after the event content has been provided (e.g., even on a date after the scheduled date) (e.g., distributing replay data of the event content to the user when the user purchases replay data of the event content), and the event content related process includes a process of changing the display mode of the event content provided by the providing step after the event content has been provided in accordance with the degree (e.g., the stage effect of the virtual space distributed in the replay data will differ for each user or for each piece of event content depending on the number of user's entering times during the period before the scheduled date. See (Replay data) in (Modified Examples)).

This configuration allows the event content to be provided in the display mode that corresponds to the degree to which an image in the predetermined type of virtual space is displayed in the period before the scheduled date even after the provision of the event content on the scheduled date, thereby increasing user's convenience and interest.

(6) In (1), the event content related process includes a process of allowing a user to use an object in accordance with the degree among objects that can be used during provision of the event content (e.g., in step S402 in FIG. 38, to give (to be available) a user an item in FIG. 37 that can be used in the live event in accordance with the number of user's entering times).

This configuration gives a user an object that can be used during provision of the event content in accordance with the degree to which an image in the predetermined type of virtual space is displayed during the period before the scheduled date. This increases the user's motivation to display an image in the predetermined type of virtual space, and also draws the user's attention to an object that can be used.

(7) In (6), the object that the user is allowed to use by the event content related process may be different from an object given to another user in accordance with the degree (e.g., as shown in FIG. 37, a different item object is associated with each number of entering times. Thus, different item objects will be given to the users whose number of entering times are different).

This configuration may give a user an object that can be different from an object given to another user in accordance with the degree to which an image in the predetermined type of virtual space is displayed during the period before the scheduled date. This allows the users to use different items during the provision of the event content, thereby enhancing the user's interest in the event content.

(8) The method in (6) includes a storing step of storing information that enables the event content provided by the providing step to be provided again (e.g., storing, in storage 103, event data 111 that enables the event provided on the scheduled date to be replayed), wherein the providing step provides the event content provided on the scheduled date based on the information stored by the storing step in response to a request from the user, even after the event content has been provided (e.g., even on a date after the scheduled date) (e.g., distributing replay data of the event content to the user when the user purchases replay data of the event content), and the event content related process includes a process of allowing a user to use an object in accordance with the degree among objects that can be used in the event content provided by the providing step after the event content has been provided (e.g., the limited edition glow stick of FIG. 37, which is given to a user in accordance with the user's number of entering times before the scheduled date, is allowed to use during the distribution of replay data. See (Replay data) in (Modified Examples)).

This configuration allows the user to use an object given in accordance with the degree to which an image in the predetermined type of virtual space is displayed in the period before the scheduled date even after the provision of the event content on the scheduled date, thereby increasing user's convenience and interest.

(9) In (1), the predetermined type of virtual space has a first area (e.g., sub-area ER53' in FIG. 24 that is the second virtual space) that is used to provide event content on the scheduled date and a second area (e.g., sub-area ER53 that is a part of a first virtual space and has a common display mode with sub-area ER53') that has a common display mode with the first area, and the displaying step is such that, until an open condition is met during the period before the scheduled date (e.g., the day before the scheduled date of the event), entry into the first area is restricted (e.g., the user avatar U is not allowed to enter sub-area ER53' in FIG. 24), while entry into the second area is allowed and an image of the second area is displayed in response to an operation by the user (e.g., the user avatar U is allowed to enter sub-area ER53), and after the open condition is met, entry into the second area is restricted, while entry into the first area is allowed and an image of the first area is displayed in response to an operation by the user (e.g., the user avatar U is not allowed to enter sub-area ER53 but is allowed to enter sub-area ER53').

This allows the area used to be switched depending on whether the open condition is met; at least after the open condition is met, it provides a virtual space that is an area suitable to provide the event content.

(10) In (9), the predetermined type of virtual space has a third area (e.g., sub-areas ER51 and ER52, which are part of the first virtual space), and the second area and third area are connected to enable seamless entrance (e.g., a user avatar U is allowed to seamlessly move back and forth between sub-areas ER51, ER52, and ER53 of FIG. 24A that is in the first virtual space), and the first area and the third area are separate from each other (e.g., the areas in different virtual space) and are allowed to be entered from one area to another via display of a predetermined screen (e.g., as shown in FIG. 24B, the user avatar is allowed to move back and forth between the first and second virtual spaces via the portals P in the sub-region ER53' and ER52).

This configuration improves the convenience of traffic between the second area and the third area before the open condition is met, and after the open condition is met, a predetermined screen is displayed before the avatar moves to the first area, thus giving the user a special feeling or a feeling of tension, and increasing the user's interest.

(11) In (9), the open condition may be met on a specific period before the scheduled date of the event content to be provided (e.g., the day before the scheduled event date).

This configuration forms a period before the open condition is met, a period after the open condition is met but before the event content is provided, and a period during which the event content is being provided, thereby enhancing the user's interest more gradually.

(12) In (1), the providing step provides the event content on the scheduled date to a user who meets a predetermined condition (e.g., purchasing a ticket to participate in the event content), and the displaying step allows a user who meets the predetermined condition to view a displayed image in the predetermined type of virtual space during the period before the scheduled date (e.g., a user who has purchased a ticket to participate in event content is allowed to enter spatial area ER5).

This configuration improves user's motivation and encourages the user to meet the predetermined condition.

(13) In (1), the providing step provides the event content on the scheduled date to a user who meets a predetermined condition (e.g., purchasing a ticket to participate in the event content), and the displaying step allows a user, regardless of whether the user meets the predetermined condition, to view a displayed image in the predetermined type of virtual space during the period before the scheduled date (e.g., a user is allowed to enter spatial area ER5, regardless of whether the user has purchased a ticket to participate in the event content. See (Right to enter spatial area ER5) in (Modified Examples)).

This configuration allows a user who does not meet the predetermined condition also to view a displayed image in the predetermined type of virtual space. This increases interest in the event content when the user views images in the predetermined type of virtual space, thereby improving the user's motivation to meet the predetermined condition.

(14) A system (virtual space content distribution system) according to one aspect of the present invention includes a computer (e.g., distribution server computer 100 and viewer terminal 300) that is configured to perform a process of providing a virtual space to a user, and the system includes: the computer including a processor and a memory, wherein the processor causes to:

display an image in a generated virtual space, the image being in accordance with an operation by the user (e.g., a virtual space update data distribution process, a viewer's viewpoint image output process); and provide event content in a predetermined type of virtual space (e.g., in spatial area ER5) of the virtual space on a scheduled date (e.g., virtual space update data distribution process using event data 111, viewer's viewpoint image output process), wherein also during a period before the scheduled date (e.g., the period up to the day before the scheduled date of the event), the processor causes to display an image in the predetermined type of virtual space in response to an operation by the user (e.g., the user is allowed to enter the spatial area ER5 and view a displayed image in spatial area ER5), and the processor causes to perform an event-content related process (e.g., changes the stage effect of the live event in step S403 in FIG. 38 in accordance with the stage effects of FIG. 37, or gives an item object of FIG. 37 that can be used in the live event in step S402 in FIG. 38) in accordance with a degree (e.g., the number of entering times into spatial area ER5 (e.g., number of days) or the duration of stay, the time of displaying spatial area ER5, and the number of displaying times of spatial area ER5) to which an image in the predetermined type of virtual space is displayed during the period before the scheduled date.

This configuration shares the predetermined type of virtual space in which event content is to be provided with the user during the period before the scheduled date, and performs the event content related process in accordance with the degree to which an image in the predetermined type of virtual space in the virtual space is displayed during the period before the scheduled date. This increases the user's motivation to display an image in the predetermined type of virtual space, thereby gradually increasing the user's interest in the event content before the event content is provided.

[Addendum 2]

A system that distributes content via a network has been known. For instance, JP 2012-120098 A discloses a distribution system that allows a performer to hold a live event such as a live performance in a virtual space on the web, while allowing a viewer to operate a viewer avatar (to move, give gifts, perform social tipping, and perform other actions) so that the viewer is able to participate in the live event.

In the conventional distribution system, viewers place objects such as decorations and social tipping in the virtual space during a live event, making those objects visible also to other viewers. However, the virtual space is a finite space, and thus there is a limit to the number and amount of objects that can be placed by the viewers, and the distribution system described in Patent Literature 1 does not take this point into consideration at all. This causes a problem in that objects from users such as viewers cannot be properly reflected in the virtual space.

In view of the above, the present invention described in the above embodiment and modified examples provides a method and a system that are capable of appropriately reflecting objects from a user in a virtual space, and may have the following configuration.

(1) A computer control method according to one aspect of the present invention controls a computer (e.g., distribution server computer 100 and viewer terminal 300) that is configured to provide a virtual space to a user, and the method includes:

a displaying step of displaying an image in the virtual space, the image being in accordance with an operation by a user (e.g., a virtual space update data distribution process, a viewer's viewpoint image output process);

a placing step of placing a specific object associated with a user in a predetermined area (e.g., a predetermined exhibition area in the spatial area ER5) in the virtual space (virtual space update data generation process); and a process of placing a purchased object in the virtual space for updating in accordance with virtual space update data (virtual space update process), wherein the displaying process changes (e.g., step S203 and step S205 in FIG. 32, flower stand FS displayed in exhibition area is changed to another flower stand FS for displaying) a specific object (e.g., a flower stand FS displayed in exhibition area A and associated with another user shown in FIG. 29A) associated with another user and placed in the virtual space to another specific object when a switching condition (e.g., passage of a predetermined time, user's logging in or entry or leaving the spatial area ER5) is met (e.g., switching condition is met (YES) in step S202 in FIG. 32), while continuously displaying a specific object (e.g., flower stand FS purchased by a user themselves and stored in FIG. 27C) associated with a user themselves in the area placed by the placing step (e.g., even if switching condition is met (YES) in step S202 in FIG. 32, flower stand FS1 purchased by user 1 themselves can be continuously displayed in the exhibition area A as shown in FIG. 29C).

This configuration may change a specific object associated with another user when the switching condition is met, while continuously displaying a specific object associated with the user themselves. This allows the specific objects to be appropriately reflected in the virtual space. This also allows the specific objects associated with other users to be displayed evenly within the virtual space, and changes the display mode in the virtual space, thus increasing the user's interest, while enhancing the user's satisfaction because they can check the specific objects associated with themselves.

(2) In (1), the switching condition may be met at least one of: when a predetermined time has elapsed (e.g., every two hours has elapsed); and when the displaying step displays an image in the virtual space (e.g., a user logs in or enters or leaves the spatial area ER5).

This changes a specific object associated with another user to a different specific object without requiring user's previous knowledge. Thus, this increases the interest of all users in the specific objects that can be displayed in the virtual space.

(3) In (1), the other user includes a special type of user (e.g., sponsor user, performer user, and special users), the displaying step continuously displaying a specific object associated with the special type of user of specific objects associated with other users even if the switching condition is met (e.g., as shown in FIG. 33, flower stand FST associated with a special type of user is continuously displayed as in FIG. 33A through FIG. 33D).

This configuration allows the specific object associated with a special type of user not to be changed even if the switching condition is met, thereby improving the convenience of the special user.

(4) In (1), the specific object has multiple types (e.g., size types such as small and large as shown in FIG. 27A and FIG. 27B), each type of which has a designated area in which the specific object can be placed within the virtual space (e.g., as shown in FIG. 31A, a small size can be placed in exhibition area A, and as shown in FIG. 31B, a large size can be placed in exhibition area B).

This configuration allows an appropriate type of specific object to be placed in the area so that the specific object matches the design and taste of the virtual space. This also creates a sense of unity in the types of specific objects placed in each area.

(5) In (1), the specific objects can be displayed up to the maximum number specified for the area in the virtual space where the specific objects can be placed (e.g., up to 100 flower stands FS can be displayed in exhibition area A), and the displaying step displays specific objects placed in number to be within the upper limit (e.g., up to the upper limit of 100 flower stands FS for exhibition area A are determined by random lottery), while changing a specific object associated with the other user to a different specific object when the switching condition is met (e.g., as in the switching display from FIG. 29B to FIG. 29C, for user 1, flower stands FS other than user 1's flower stand FS1 are changed for displaying).

This allows the objects associated with other users to be evenly displayed within the upper limit in number in the virtual space, and changes the display mode of the virtual space, thus increasing the user's interest.

(6) In (1), the specific object is associated with one of a plurality of types of attributes (e.g., a motif (attribute) in FIG. 27A), and the displaying step displays specific objects so that the numbers of attributes associated with the specific objects to be displayed are approximately equal among the attributes (e.g., if the number of places where the flower stands FS with the attributes "cherry blossom", "demon", "white fox" and "black fox" can be displayed is 80,000, the number of places where the flower stands FS of one attribute can be exhibited is calculated to be 20,000. See (Display balance of flower stand attributes in exhibition area) in (Modified Examples)).

This configuration allows specific objects associated with different attributes to be displayed in a well-balanced manner in the virtual space.

(7) In (1), the displaying step may control (e.g., not display) display of a specific object associated with another user for which a restriction condition (e.g., non-display setting by an administrator, or non-display setting because a certain number of reports from users have been received) is met. See (Probability of being determined as default flower stands) in (Modified Examples).

This configuration controls the display of a specific object associated with another user for which the restriction condition is met, thus providing a comfortable virtual space for users.

(8) In (7), the displaying step may continuously display a specific object (e.g., flower stand FS purchased and owned by a user themselves) associated with the user themselves, regardless of whether the restriction condition is met (e.g., even if a flower stand FS is set as non-display for other users, the display device 310 of the user who has purchased and owns the flower stand FS continuously displays the flower stand FS. See (Probability of being determined as default flower stands) in (Modified Examples)).

This configuration prevents loss of the interest of a user associated with a specific object with which a restriction condition is met, while making it difficult to identify that the restriction condition is met.

(9) The method in (1) includes a step of receiving like information that specifies like actions (e.g., operation with like icon 513) from users to a specific object and thus updating a like history for the specific object (e.g., updating and storing the number of likes for each flower stand FS stored in the object data 112), and the displaying step controls display of a specific object in accordance with a like history for the specific object (e.g., the flower stand FS with a larger number of likes has a higher probability of being chosen by lottery as a default flower stand data in FIG. 31A, FIG. 31B and FIG. 36A). See (Probability of being determined as default flower stands) in (Modified Examples)).

This configuration provides the user with an interesting experience in that the display of a specific object is controlled based on the like history.

(10) In (9), the displaying step may display a specific object associated with other users, based on the like history for specific object, with a higher proportion of specific objects that have a predetermined number or more of like actions (e.g., 1000 to 2999 likes) than specific objects that have less than the predetermined number of liking actions (e.g., 100-999 likes) (e.g., while the probability of winning is 10/million when the number of likes is 100-999, it is increased to 100/million when the number of likes is 1000-2999. See (Probability of being determined as default flower stands) in (Modified Examples)).

This provides the user with the fun of acquiring like actions, and also improves the user's interest.

(11) In (1), the virtual space has multiple areas where specific objects can be placed (e.g., multiple exhibition areas such as the main street (west) area 51a and the shrine grounds (west) area 52b in FIG. 24), and the placing step places a specific object in an area among the multiple areas that is designated in response to an operation by a user (e.g., exhibition area designated by an operation with the placement position selection section 414 in FIG. 26A).

This configuration allows a user to place a specific object in their preferred area, thus increasing the user's interest.

(12) In (1), when placing the specific object, the displaying step may change the display mode of a specific object associated with a user in response to an operation by the user (e.g., when or after purchasing a flower stand FS by the user, decorations such as letters are added by an operation with the letter input section 413 of FIG. 26A, and then the flower stand FS is placed in the spatial area ER5).

This configuration allows a user to change the display mode of a specific object in their own original display mode, thus increasing the user's interest.

(13) In (1), the displaying step may display specific objects associated with other users at a higher rate for users with a number of associated specific objects equal to or greater than a first number (e.g., a predetermined value of 99 or less) than for users with a number less than the first number (e.g., 11 rather than 10, or 40 rather than 30) (e.g., the rate at which the default flower sands FS in FIG. 31A and FIG. 31B is chosen by lottery is set higher for a flower stand FS owned by user 1 with three associated flower stands FS than for a flower stand FS owned by user 2 with one associated flower stand FS as shown in FIG. 27C), and for a user who has reached a second number (e.g., 100), which is greater than the first number, a specific object associated with the user may be displayed at the same rate (e.g., the number of flower stands FS owned is considered 100) regardless of whether their number reaches more than the second number (e.g., they may own 10,000 flower stands).

This configuration encourages users to associate specific objects up to an appropriate number (less than the second number) therewith, while preventing the rate of specific objects owned by a user whose associated objects in number has reached the second number from increasing indefinitely.

(14) A system (virtual space content distribution system) according to one aspect of the present invention includes a computer (e.g., distribution server computer 100 and viewer terminal 300) that is configured to perform a process of providing a virtual space to a user, and the system includes: the computer including a processor and a memory, wherein the processor causes to:

display an image in the virtual space, the image being in accordance with an operation by a user (e.g., a virtual space update data distribution process, a viewer's viewpoint image output process); and place a specific object associated with a user in a predetermined area (e.g., a predetermined exhibition area in the spatial area ER5) in the virtual space (virtual space update data generation process); and a process of placing a purchased object in the virtual space for updating in accordance with virtual space update data (virtual space update process), wherein the processor causes to change (e.g., step S203 and step S205 in FIG. 32, flower stand FS displayed in exhibition area is changed to another flower stand FS for displaying) a specific object (e.g., a flower stand FS displayed in exhibition area A and associated with another user shown in FIG. 29A) associated with another user and placed in the virtual space to another specific object when a switching condition (e.g., passage of a predetermined time, user's logging in or entry or leaving the spatial area ER5) is met (e.g., switching condition is met (YES) in step S202 in FIG. 32), while continuously displaying a specific object (e.g., flower stand FS purchased by a user themselves and stored in FIG. 27C) associated with a user themselves in the area placed (e.g., even if switching condition is met (YES) in step S202 in FIG. 32, flower stand FS1 purchased by user 1 themselves can be continuously displayed in the exhibition area A as shown in FIG. 29C).

This configuration changes a specific object associated with another user when the switching condition is met, while continuously displaying a specific object associated with the user themselves. This allows the specific objects to be appropriately reflected in the virtual space. This also allows the specific objects associated with other users to be displayed evenly within the virtual space, and changes the display mode in the virtual space, thus increasing the user's interest, while enhancing the user's satisfaction because they can check the specific objects associated with themselves.

[Examples of Software Implementation]

The various control blocks of the controller of a computer such as a server or terminal in the above-mentioned embodiments may be implemented by a logic circuit (hardware) formed in an integrated circuit (IC chip), or may be implemented by software using a central processing unit (CPU). When the control blocks are implemented by software using a CPU, the computer having the controller includes a CPU that executes the instructions of a program, which is software that implements various functions, a read only memory ROM) or storage device (these are referred to as "recording media") in which the program and various data are recorded so as to be readable by the computer (or CPU), and a random access memory (RAM) in which the program is expanded. Then, when the computer (or CPU) reads and executes the program from the above recording medium, the aim of the present invention is achieved. The recording medium may be a "non-transitory tangible medium" such as a tape, a disk, a card, a semiconductor memory, or a programmable logic circuit. The program may be supplied to the computer via any transmission medium (e.g., a communication network or broadcast waves) capable of transmitting the program. One aspect of the present invention can also be implemented in the form of a data signal embedded in a carrier wave, in which the above program is embodied by electronic transmission.

The embodiments disclosed in this description are to be considered in all respects as illustrative and not restrictive. The scope of the present invention is defined by the claims, rather than the above description, and is intended to include any modification within the meaning and scope equivalent to the terms of the claims.

REFERENCE SIGNS LIST

1 Performer avatar
100 Distribution server computer
150 Administrator terminal
200 Performer terminal
300 Viewer terminal

What is claimed is:

1. A computer control method that controls a computer configured to provide a virtual space to a viewer user, comprising:

a displaying step of displaying an image in a generated virtual space;

a generating step of generating an event in the virtual space which is displayed; and a providing step of providing event content in which a performer participates in a predetermined type of virtual space of the virtual space to the viewer user on a scheduled date, which is not a period before the scheduled date, wherein also during the period before the scheduled date, the displaying step displays an image in the predetermined type of virtual space corresponding to a current time before the scheduled date in response to an entering operation by the viewer user, and the generating step generates an event in the predetermined type of virtual space corresponding to the current time before the scheduled date, and the displaying step changes a display mode in the predetermined type of virtual space corresponding to the current time before the scheduled date in accordance with the event that is generated in the predetermined type of virtual space corresponding to the current time before the scheduled date, the predetermined type of virtual space being displayed by the entering operation of the viewer user.

2. The method according to claim 1, wherein the display mode in the predetermined type of virtual space that is changeable in the period before the scheduled date is different from the display mode for another viewer user in accordance with an event that occurs in the period before the scheduled date.

3. The method according to claim 1, wherein the displaying step changes the display mode in the predetermined type of virtual space during provision of the event content in accordance with an event that occurs in the period before the scheduled date.

4. The method according to claim 3, wherein the display mode in the predetermined type of virtual space that is changeable during provision of the event content is different from the display mode for another viewer user in accordance with an event that occurs in the period before the scheduled date.

5. The method according to claim 1, wherein an event that changes the display mode in the predetermined type of virtual space includes an action in response to an operation by the viewer user, the action being reflected in the predetermined type of virtual space.

6. The method according to claim 5, wherein an event that changes the display mode in the predetermined type of virtual space includes an action in response to an operation by another viewer user, the action being reflected in the predetermined type of virtual space.

7. The method according to claim 1, wherein the displaying step keeps a display mode associated with a special type of user in the predetermined type of virtual space even if an event that changes the display mode in the predetermined type of virtual space occurs.

8. The method according to claim 1, wherein the predetermined type of virtual space has a first area that is used to provide event content on the scheduled date and a second area that has a common display mode with the first area, and the displaying step is such that, until an open condition is met during the period before the scheduled date, entry into the first area is restricted, while entry into the second area is allowed and an image of the second area is displayed in response to an operation by the viewer user, and after the open condition is met, entry into the second area is restricted, while entry into the first area is allowed and an image of the first area is displayed in response to an operation by the viewer user.

9. The method according to claim 8, wherein the predetermined type of virtual space has a third area, and the second area and third area are connected to enable seamless entrance, and the first area and the third area are separate from each other and are allowed to be entered from one area to another via display of a predetermined screen.

10. The method according to claim 8, wherein the open condition is met on a specific period before the scheduled date of the event content to be provided.

11. The method according to claim 1, wherein the display mode in the predetermined type of virtual space to be changed by the displaying step includes the display mode of a specific object placed in the predetermined type of virtual space, and an event that changes the display mode in the predetermined type of virtual space includes an event that places the specific object in a designated area in the predetermined type of virtual space during the period before the scheduled date, the specific object being associated with the viewer user.

12. The method according to claim 11, wherein an event that changes the display mode in the predetermined type of virtual space includes an event that generates a display mode of the specific object in response to an operation by the viewer user when placing the specific object.

13. The method according to claim 1, wherein the display mode in the predetermined type of virtual space that is changed by the displaying step includes the display mode of a specific object that is displayed corresponding to a facilitator character, the facilitator character facilitating the event content and being displayed and acting in the predetermined type of virtual space while the event content is being provided, and the facilitator character is the performer.

14. The method according to claim 1, wherein the computer functions to perform a storing step of storing information that enables the event content provided by the providing step to be provided again, wherein the providing step provides the event content provided on the scheduled date based on the information stored by the storing step in response to a request from the viewer user, even after the event content has been provided, and the display mode of the event content provided by the providing step after the event content has been provided differs with an event that occurs during the period before the scheduled date.

15. The method according to claim 1, wherein the displaying step further changes the display mode in the predetermined type of virtual space in accordance with a degree to which an image in the predetermined type of virtual space is displayed during the period before the scheduled date.

16. The method according to claim 1, wherein the providing step provides the event content on the scheduled date to a viewer user who meets a predetermined condition, and the displaying step allows a viewer user who meets the predetermined condition to view a displayed image in the predetermined type of virtual space during the period before the scheduled date.

17. The method according to claim 1, wherein the providing step provides the event content on the scheduled date to a viewer user who meets a predetermined condition, and the displaying step allows the viewer user, regardless of whether the viewer user meets the predetermined condition, to view a displayed image in the predetermined type of virtual space during the period before the scheduled date.

18. A system including a computer being configured to perform a process of providing a virtual space to a viewer user, the system comprising:

the computer including a processor and a memory, wherein the processor causes to:

display an image in a generated virtual space;

generate an event in the virtual space which is displayed; and provide event content in which a performer participates in a predetermined type of virtual space of the virtual space to the viewer user on a scheduled date, which is not a period before the scheduled date, wherein also during the period before the scheduled date, the processor causes to display an image in the predetermined type of virtual space corresponding to a current time before the scheduled date in response to an entering operation by the viewer user, and causes to generate an event in the predetermined type of virtual space corresponding to the current time before the scheduled date, and the processor causes to change a display mode in the predetermined type of virtual space corresponding to the current time before the scheduled date in accordance with the event that is generated in the predetermined type of virtual space corresponding to the current time before the scheduled date, the predetermined type of virtual space being displayed by the entering operation of the viewer user.

19. A method for controlling a computer including a processor and a memory, the computer being configured to perform a process of providing a virtual space to a viewer user, the method comprising:

displaying an image in a generated virtual space;

generating an event in the virtual space which is displayed; and providing event content in which a performer participates in a predetermined type of virtual space of the virtual space to the viewer user on a scheduled date, which is not a period before the scheduled date, wherein also during the period before the scheduled date, an image is displayed in the predetermined type of virtual space corresponding to a current time before the scheduled date in response to an entering operation by the viewer user, and an event is generated in the predetermined type of virtual space corresponding to the current time before the scheduled date, and a display mode is changed in the predetermined type of virtual space corresponding to the current time before the scheduled date in accordance with the event that is generated in the predetermined type of virtual space corresponding to the current time before the scheduled date, the predetermined type of virtual space being displayed by the entering operation of the viewer user.

* * * * *